United States Patent
Katz et al.

(10) Patent No.: US 12,238,262 B2
(45) Date of Patent: *Feb. 25, 2025

(54) CREATION AND USER INTERACTIONS WITH THREE-DIMENSIONAL WALLPAPER ON COMPUTING DEVICES

(71) Applicant: Snap Inc., Santa Monica, CA (US)

(72) Inventors: Sagi Katz, Yokneam Ilit (IL); Guy Melamed, Haifa (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,355

(22) Filed: Nov. 8, 2023

(65) Prior Publication Data

US 2024/0073397 A1    Feb. 29, 2024

Related U.S. Application Data

(63) Continuation of application No. 17/529,429, filed on Nov. 18, 2021, now Pat. No. 11,843,758, which is a
(Continued)

(51) Int. Cl.
*H04N 13/183* (2018.01)
*G06F 3/01* (2006.01)
(Continued)

(52) U.S. Cl.
CPC ........... *H04N 13/183* (2018.05); *G06F 3/012* (2013.01); *G06F 3/04815* (2013.01);
(Continued)

(58) Field of Classification Search
CPC .............. H04N 13/183; H04N 13/128; H04N 13/156; H04N 13/332; H04N 13/371;
(Continued)

(56) References Cited

U.S. PATENT DOCUMENTS 8,584,043 B2    11/2013   Cho et al.
8,667,423 B2 *   3/2014   Damale .............. G06F 3/04883
                                                    715/788
(Continued)

FOREIGN PATENT DOCUMENTS

KR           101867212 B1    6/2018

OTHER PUBLICATIONS

Extended European Search Report received in European Application No. 19903048.7, dated Sep. 15, 2022, 8 pages.
(Continued)

*Primary Examiner* — Richard A Hansell, Jr.
(74) *Attorney, Agent, or Firm* — CM Law; Stephen J. Weed

(57) ABSTRACT

A wallpaper system presents a first wallpaper image of a wallpaper video to a user and receives, via a user input device, one or both of: (i) a spatial user input selection, and (ii) a time user input selection from the user to apply to the wallpaper video. In response to detecting one or both of: (i) the spatial user input selection, and (ii) the time user input selection, the wallpaper system determines one or both of: (i) a respective spatial movement parameter within a wallpaper video associated with the spatial user input selection, and (ii) a respective time coordinate within the wallpaper video associated with the time user input selection. Wallpaper system presents, via the image display, a second wallpaper image associated with one or both of: (i) the respective spatial movement parameter, and (ii) the respective time coordinate.

15 Claims, 45 Drawing Sheets

Related U.S. Application Data continuation of application No. 16/704,592, filed on Dec. 5, 2019, now Pat. No. 11,240,481.

(60) Provisional application No. 62/784,914, filed on Dec. 26, 2018.

(51) Int. Cl.
| | | |
|---|---|---|
| *G06F 3/04815* | (2022.01) | |
| *G06F 3/04883* | (2022.01) | |
| *H04N 13/128* | (2018.01) | |
| *H04N 13/156* | (2018.01) | |
| *H04N 13/332* | (2018.01) | |
| *H04N 13/371* | (2018.01) | |
| *H04N 13/38* | (2018.01) | |

(52) U.S. Cl.
CPC ....... *G06F 3/04883* (2013.01); *H04N 13/128* (2018.05); *H04N 13/156* (2018.05); *H04N 13/332* (2018.05); *H04N 13/371* (2018.05); *H04N 13/38* (2018.05)

(58) Field of Classification Search
CPC .... H04N 13/38; H04N 13/239; H04N 13/254; H04N 13/271; H04N 13/344; H04N 13/366; H04N 21/239; G06F 3/012; G06F 3/04815; G06F 3/04883; G06F 2200/1637; G06F 1/1626; G06F 1/163; G06F 1/1643; G06F 1/1656; G06F 1/1686; G06F 1/169; G06F 1/1694; G06F 1/1698; G06F 3/04845; G06F 3/0488; G06F 3/013; G06F 3/03547; G06F 3/0346; G02B 2027/0138; G02B 2027/014; G02B 27/017; G02B 27/04
See application file for complete search history.

(56) References Cited

U.S. PATENT DOCUMENTS

| | | | |
|---|---|---|---|
| 9,348,488 | B1 | 5/2016 | Renema |
| 11,240,481 | B2 | 2/2022 | Katz et al. |
| 2004/0088656 | A1* | 5/2004 | Washio ............ H04M 1/72439 715/273 |
| 2008/0052945 | A1* | 3/2008 | Matas ................ H04N 1/00411 34/173 |
| 2008/0106531 | A1* | 5/2008 | Hullot ............... H04M 1/72427 455/566 |
| 2011/0102556 | A1 | 5/2011 | Kim et al. |
| 2012/0013553 | A1* | 1/2012 | Kim ................. H04M 1/72448 345/173 |
| 2012/0131459 | A1* | 5/2012 | Ilama-Vaquero ..... G06F 3/0485 715/716 |
| 2013/0009955 | A1 | 1/2013 | Woo et al. |
| 2013/0058019 | A1* | 3/2013 | Lee .................... G06F 3/04883 361/679.01 |
| 2013/0069942 | A1 | 3/2013 | Woo et al. |
| 2013/0307792 | A1* | 11/2013 | Andres ............. G06F 3/04847 345/173 |
| 2014/0118482 | A1 | 5/2014 | Noh et al. |
| 2014/0132637 | A1* | 5/2014 | Yang ...................... G06T 11/60 345/649 |
| 2014/0165007 | A1 | 6/2014 | Heo et al. |
| 2015/0067555 | A1* | 3/2015 | Joo .................... G06F 3/04842 715/765 |
| 2017/0115998 | A1* | 4/2017 | Fang .................... H04M 1/724 |
| 2018/0012330 | A1* | 1/2018 | Holzer ................ H04N 13/111 |
| 2018/0247440 | A1 | 8/2018 | Heo et al. |
| 2019/0101758 | A1* | 4/2019 | Zhu ........................ G06T 3/00 |
| 2019/0114021 | A1* | 4/2019 | Oliver ................ G06F 3/04883 |

OTHER PUBLICATIONS

International Search Report and Written Opinion received in Patent Cooperation Treaty Application No. PCT/US2019/064679, dated Mar. 27, 2020, 12 pages.

\* cited by examiner

CREATION AND USER INTERACTIONS WITH THREE-DIMENSIONAL WALLPAPER ON COMPUTING DEVICES

CROSS-REFERENCE TO RELATED APPLICATIONS

This application is a Continuation of U.S. application Ser. No. 17/529,429 filed on Nov. 18, 2021, which is a Continuation of U.S. application Ser. No. 16/704,592 filed on Dec. 5, 2019, now U.S. Pat. No. 11,240,481, which claims priority to U.S. Provisional Application Ser. No. 62/784,914 filed on Dec. 26, 2018, the contents of all of which are incorporated fully herein by reference.

TECHNICAL FIELD

The present subject matter relates to wearable devices, e.g., eyewear devices, and mobile devices and techniques to create and allow a user to interact with three-dimensional wallpaper videos and images.

BACKGROUND

A wallpaper or background (e.g., a desktop wallpaper, desktop background, desktop picture or desktop image on computers) is a two-dimensional (2D) digital image (photo, drawing etc.) used as a decorative background of a graphical user interface on the screen of a computer, mobile communications device or other electronic device. On a computer, it is usually for the desktop, while on a mobile phone it is usually the background for the "home" or "idle" screen. Though most devices come with a default picture, users can usually change it to custom files of their choosing.

Computing devices, such as wearable devices, including portable eyewear devices (e.g., smartglasses, headwear, and headgear); mobile devices (e.g., tablets, smartphones, and laptops); and personal computers available today integrate image displays and cameras. Currently, users of computing devices can utilize photo lenses or filters to create effects on two-dimensional (2D) photographs. Various photo decorating applications feature tools like stickers, emojis, and captions to edit two-dimensional photographs.

With the advent of three-dimensional (3D) image and video content, more sophisticated manipulations and interactions to transform three-dimensional image and video content (e.g., videos, pictures, etc.) are needed. For example, being able to manipulate and interact with the three-dimensional image and video content to create graphical effects on three-dimensional images and videos is desirable. Thus far, user interactions with wallpaper have been very limited. Accordingly, a need exists to enhance video and image graphical effects available for three-dimensional image and video wallpaper content to allow for more interesting user interaction experiences.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
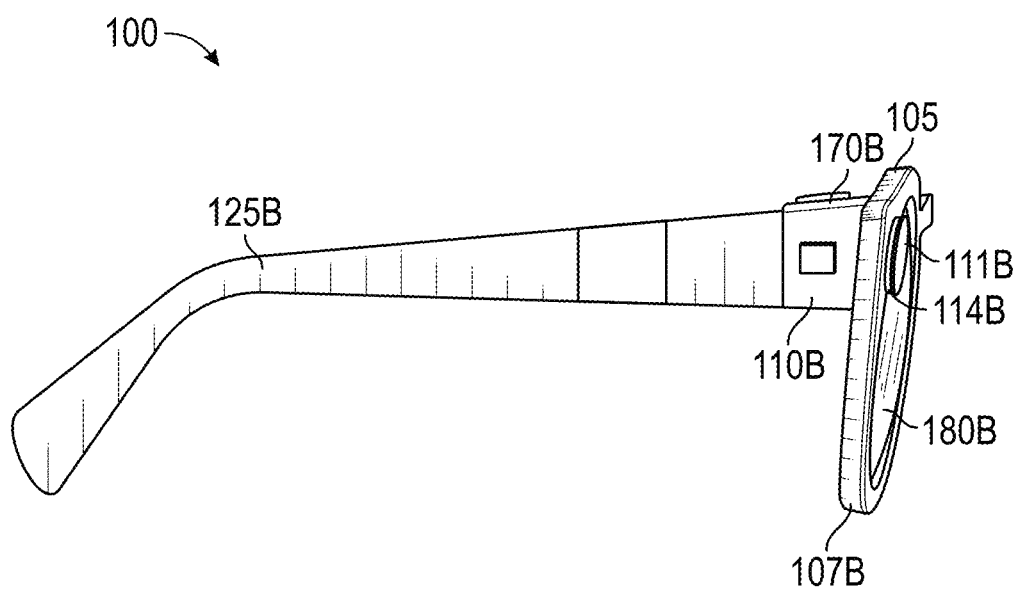
FIG. 1A is a right side view of an example hardware configuration of an eyewear device utilized in a wallpaper system, in which one or both of: (i) a spatial user input selection, and (ii) a time user input selection from a user are applied to interact with wallpaper images.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

As used herein, the term "wallpaper" means a computer generated effect applied to an original image or sequence of original images that manipulates a spatial movement parameter of the original image to change a field of view or change a time coordinate of the sequence of original images. As described herein, a first way to manipulate the spatial movement parameter is via a "light field effect" and a second way to manipulate the spatial movement parameter is processing in three-dimensional space to create a depth image (e.g., a mesh of vertices, which are texture mapped) by rotating through the mesh of vertices.

Generally, the term "light field" means radiance at a point in a given direction. The term "light field effect" means rendering a different view of a scene of image(s) to provide an appearance of spatial movement or rotation as if the observer is viewing the scene from a different angle or perspective. Light field effect cameras can capture light from different directions and move around to create a scene in three or four dimensions (e.g., using multiple lenses). However, such processing in three-dimensional (X, Y, and Z) and four-dimensional space (X, Y, Z, and time) is relatively complex and can be computationally intensive. Two visible light cameras 114A-B can be used to create a simplified light field effect from two images by operating in two-dimensional space only, which is less computationally intensive.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for wallpaper creation and user interaction, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a right side view of an example hardware configuration of an eyewear device 100 utilized in a wallpaper system, which shows a right visible light camera 114B of a depth-capturing camera to generate a depth image. As further described below, in the wallpaper system, one or both of: (i) a spatial user input selection, and (ii) a time user input selection are received from a user. To present a high degree of user interaction, the received spatial and time user input selections are applied to an original image or an original video that includes a sequence of original images selected as wallpaper. For example, the wallpaper system can vary one or both of: (i) the spatial movement parameter (e.g., field of view) of the original images (e.g., a raw image or a processed raw image), and (ii) the time coordinate of the original video. Both two-dimensional (2D) techniques, such as light field effects, and three-dimensional (3D) techniques, such as depth processing, can be applied to vary the spatial movement parameter. In one example, the spatial user input selection and the time user input selection can be received via a user input device, such as a movement tracker (e.g., accelerometer, gyroscope, or inertial measurement unit) or a touch sensor of a mobile device. Tilting the mobile device left or right manipulates the spatial movement parameter of the original image and scrolling upwards or downwards on the touch sensor manipulates the time coordinate to move the original video forward or backwards in time.

Figure 1B:
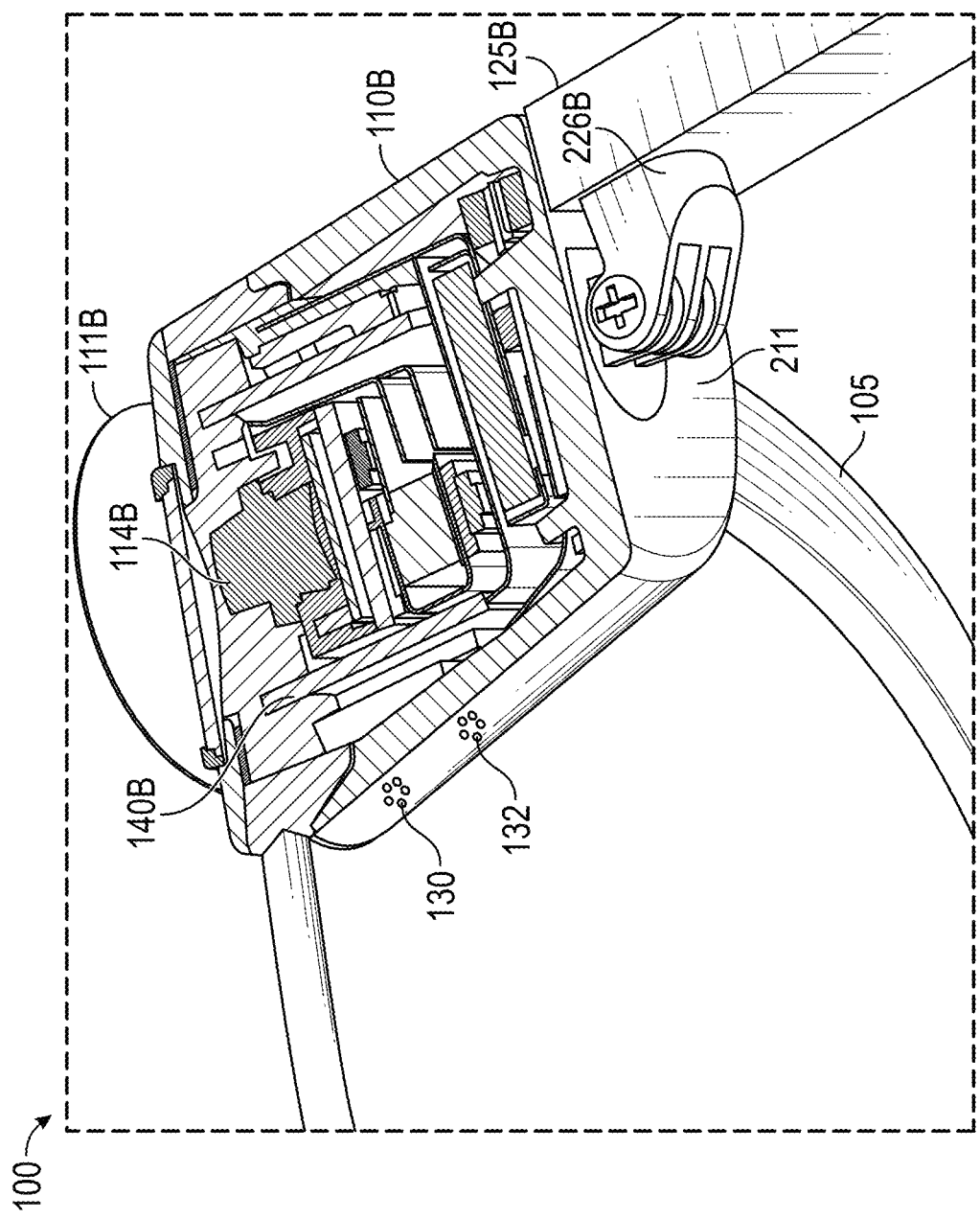
FIG. 1B is a top cross-sectional view of a right chunk of the eyewear device of FIG. 1A depicting a right visible light camera of a depth-capturing camera, and a circuit board.
Figure 1C:
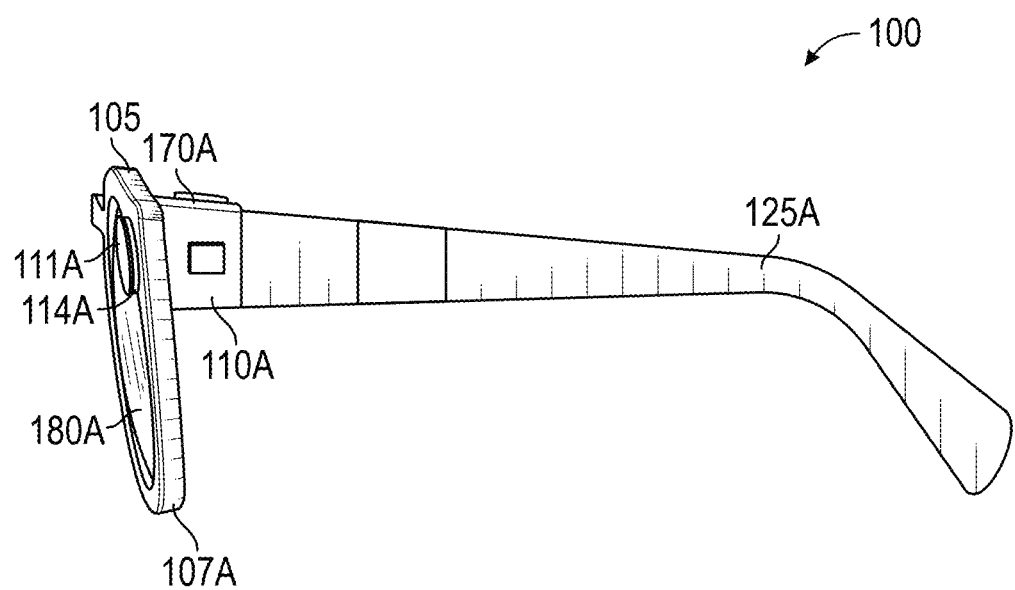
FIG. 1C is a left side view of an example hardware configuration of an eyewear device of FIG. 1A, which shows a left visible light camera of the depth-capturing camera.
Figure 1D:
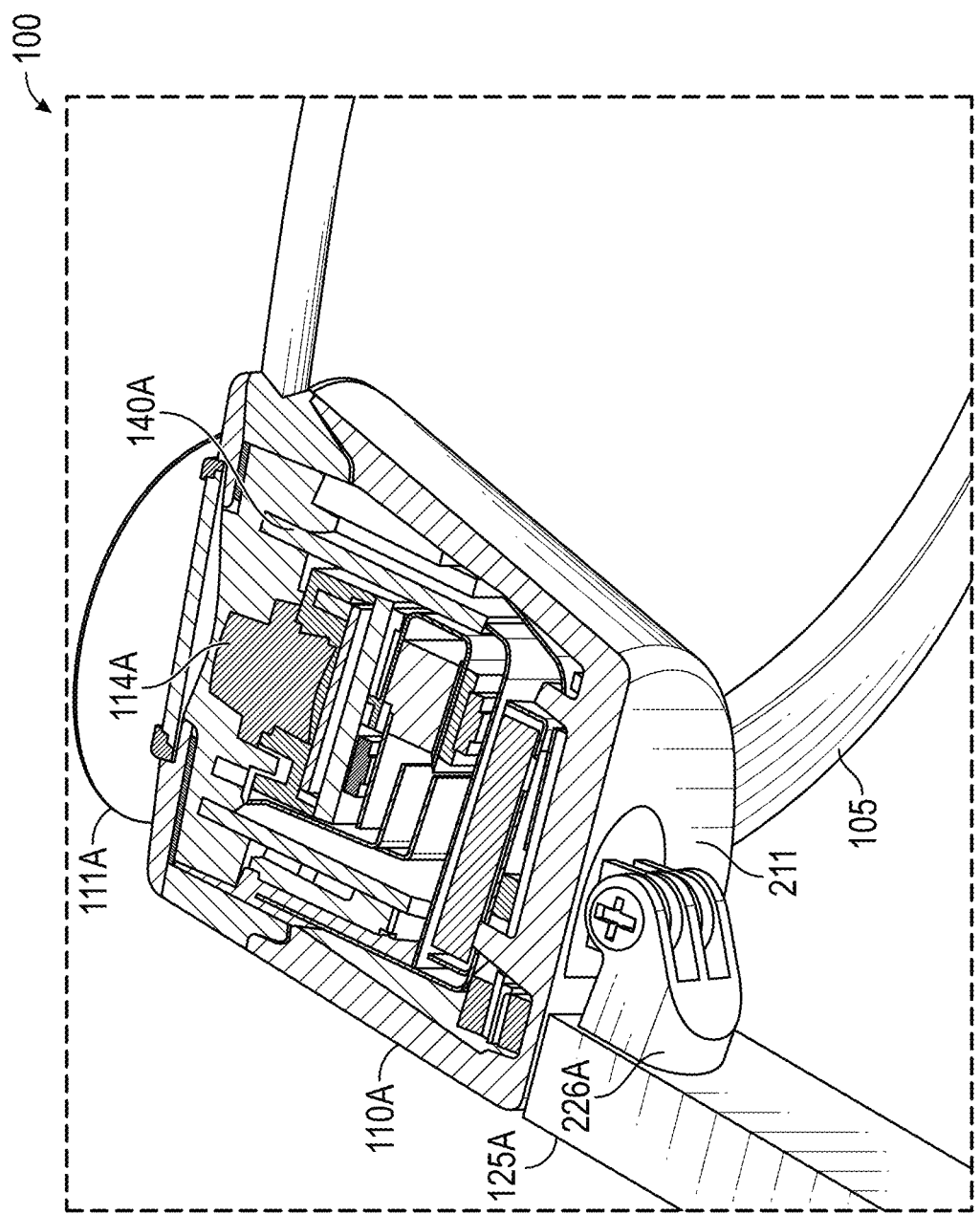
FIG. 1D is a top cross-sectional view of a left chunk of the eyewear device of FIG. 1C depicting the left visible light camera of the depth-capturing camera, and the circuit board.

Eyewear device 100, includes a right optical assembly 180B with an image display to present images, such as an original image (e.g., based on a left raw image, a processed left image, a right raw image, or a processed right image) and a wallpaper image. As shown in FIGS. 1A-B, the eyewear device 100 includes the right visible light camera 114B. Eyewear device 100 can include multiple visible light cameras 114A-B that form a passive type of depth-capturing camera, such as stereo camera, of which the right visible light camera 114B is located on a right chunk 110B. As shown in FIGS. 1C-D, the eyewear device 100 can also include a left visible light camera 114A. Alternatively, in the example of FIG. 2A, the depth-capturing camera can be an active type of depth-capturing camera that includes a single visible light camera 114A and a depth sensor (see element 213 of FIG. 2A).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480x480 pixels. The "angle of coverage" describes the angle range that a lens of visible light cameras 114A-B or infrared camera 220 (see FIG. 2A) can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

Rectification is applied so that each captured image or video is modified so that corresponding pixels lie on the same raster line (row). Once this is done, the image disparity computation algorithm, such as Semi-Global Block Matching (SGBM) is applied. The disparity computation algorithm finds a corresponding pixel for each pixel in the left image in the right image. And for each pixel in the right image, finds a corresponding pixel in the left image. Usually the same disparity is found from left to right and right to left for non-occluded pixels (pixels seen from both cameras); however, occluded pixels are treated separately, typically by neighbor pixel blending techniques.

For stereoscopic vision, a pair of raw red, green, and blue (RGB) images are captured of a scene at a given moment in time—one image for each of the left and right visible light cameras 114A-B (e.g., stereo pairs). When the pair of captured raw images from the frontward facing left and right field of views 111A-B of the left and right visible light cameras 114A-B are processed (e.g., by the image processor), depth images are generated. Depth images can be based on a three-dimensional model that can include a three-dimensional mesh (e.g., triangulated mesh) and textures, which are uploaded to a graphics processing unit (GPU) as vertices along with texture mapping. Usually, the depth is not actually seen, but the effect of depth can be seen in the rendered and displayed two-dimensional images. The generated depth images can be transformed to be perceived by a user on the optical assembly 180A-B or other image display(s) (e.g., of a mobile device) by transforming those depth images into various viewpoints that are two-dimensional images for display. The generated depth images are in the three-dimensional space domain and can comprise a mesh of vertices on a three-dimensional location coordinate system that includes an X axis for horizontal position (e.g., length), a Y axis for vertical position (e.g., height), and a Z axis for depth (e.g., distance). Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A-B. Disparity is the difference in image location of the same 3D point when projected under perspective of the visible light cameras 114A-B ($d=x_{left}-x_{right}$). Correlation of the left and right pixels in the respective left and right raw images can be achieved with Semi-Global Block Matching (SGBM), for example. For visible light cameras 114A-B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used. Generation of three-dimensional depth images and wallpaper images is explained in more detail later.

In an example, a wallpaper system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A-B and a depth sensor (element 213 of FIG. 2A). In one example, the depth-capturing camera includes a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

Wallpaper system further includes a computing device, such as a host computer (e.g., mobile device 990 of FIGS. 9-10) coupled to eyewear device 100 over a network. The wallpaper system further includes an image display (optical assembly 180A-B of eyewear device; image display 1080 of mobile device 990 of FIG. 10) for presenting (e.g., displaying) a sequence of images. The sequence of images includes the original images, raw images or processed raw images in two-dimensional space (e.g., after rectification), and wallpaper images. Wallpaper system further includes an image display driver (element 942 of eyewear device 100 of FIG. 9; element 1090 of mobile device 990 of FIG. 10) coupled to the image display (optical assembly 180A-B of eyewear device; image display 1080 of mobile device 990 of FIG. 10) to control the image display to present the sequence of images. The sequence of images can include the original images, such as the raw images or processed raw images in two-dimensional space (e.g., after rectification), and wallpaper images.

Wallpaper system further includes at least one user input device to receive one or both of: (i) a spatial user input selection, and (ii) a time user input selection. Examples of user input devices include a touch sensor (element 991 of FIG. 9 for the eyewear device 100), a touch screen display (element 1091 of FIG. 10 for the mobile device 1090). User input devices also include a movement tracker such as an accelerometer, gyroscope, and inertial measurement unit (element 981 in FIGS. 9-10 for both the eyewear device and the mobile device 1090); and a computer mouse for a personal computer or a laptop computer. Wallpaper system further includes a processor (element 932 of eyewear device 100 of FIG. 9; element 1030 of mobile device 990 of FIG. 10) coupled to the eyewear device 100 and the depth-capturing camera. Wallpaper system further includes a memory (element 934 of eyewear device 100 of FIG. 9; elements 1040A-B of mobile device 990 of FIG. 10) accessible to the processor, and wallpaper programming in the memory (element 945 of eyewear device 100 of FIG. 9; element 945 of mobile device 990 of FIG. 10), for example in the eyewear device 100 itself, mobile device (element 990 of FIG. 9), or another part of the wallpaper system (e.g., server system 998 of FIG. 9).

As explained below to provide spatial movement by applying 2D processing using light field effects, the wallpaper system takes a left image and a right image as input viewpoints, but no images with viewpoints in between. To generate the light field effect, where a character jumps and the camera rotates around the character at different angles as that moment is frozen in time, interpolation is performed between the left and right images captured by the left and right cameras 114A-B. Light field effect images from several different viewpoints can be stitched together as a sequence of images in a video to provide spatial movement. For example, the spatial movement parameter may vary between 0 and 1 in increments of 0.1, for a total of eleven viewpoints based on, for example, a tilt angle of a mobile device. When the spatial movement parameter is set to 0.0, the field of view skews entirely to the left camera perspective. When the spatial movement parameter is set to 0.5, the field of view is in the middle of the left and right camera perspective. When the spatial movement parameter is set to 1.0, the field of view skews entirely to the right visible light camera perspective.

In a 2D image processing implementation, two left and right images are interpolated to generate the wallpaper image and the interpolation is based on the disparity maps generated from the two original RGB images. This provides an appearance of a 3D world sensation by rotating images that are not even real, but only requires two modified two-dimensional images (frames) to produce the light field effect. Disparity maps determine how many pixels to move between pixels in the left image to obtain a corresponding pixel in the right image, and vice versa. Disparity is calculated between a stereo pair of corresponding pixels, which corresponds to depth, in order to interpolate between two images and blend the left and right images together to provide an appearance of rotation or movement in the created wallpaper image.

FIG. 1B is a top cross-sectional view of a right chunk 110B of the eyewear device 100 of FIG. 1A depicting the right visible light camera 114B of the depth-capturing camera, and a circuit board 140B. FIG. 1C is a left side view of an example hardware configuration of an eyewear device 100 of FIG. 1A, which shows a left visible light camera 114A of the depth-capturing camera. FIG. 1D is a top cross-sectional view of a left chunk 110A of the eyewear device of FIG. 1C depicting the left visible light camera 114A of the depth-capturing camera, and a circuit board 140A. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 226B connects the right chunk 110B to a right temple 125B of the eyewear device 100. Similarly, the left hinge 226A connects the left chunk 110A to a left temple 125A of the eyewear device 100. In some examples, components of the right visible light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible light camera 114B, microphone(s) 130, speaker(s) 132, low-power wireless circuitry (e.g., for wireless short range network communication via Bluetooth™), high-speed wireless circuitry (e.g., for wireless local area network communication via WiFi).

The right visible light camera 114B is coupled to or disposed on the flexible PCB 140B and covered by a visible light camera cover lens, which is aimed through opening(s) formed in the frame 105. For example, the right rim 107B of the frame 105 is connected to the right chunk 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing field of view 111B with a line of sight or perspective of the right eye of the user of the eyewear device 100. The visible light camera cover lens can also be adhered to an outward facing surface of the right chunk 110B in which an opening is formed with an outward facing angle of coverage, but in a different outwards direction. The coupling can also be indirect via intervening components.

Left (first) visible light camera 114A is connected to a left image display of left optical assembly 180A to capture a left eye viewed scene observed by a wearer of the eyewear device 100 in a left raw image. Right (second) visible light camera 114B is connected to a right image display of right optical assembly 180B to capture a right eye viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible light camera 114B can be formed on the circuit boards of the left chunk 110A, the temples 125A-B, or frame 105.

Figure 2A:
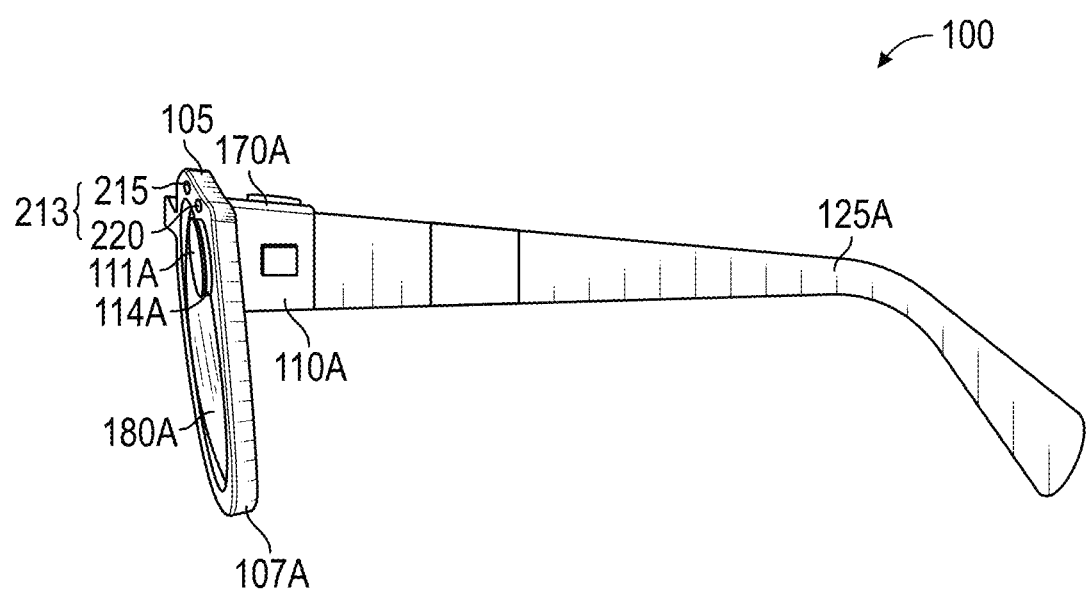
FIG. 2A is a right side view of another example hardware configuration of an eyewear device utilized in the wallpaper system, which shows the right visible light camera and a depth sensor of the depth-capturing camera to generate a depth image.

FIG. 2A is a right side view of another example hardware configuration of an eyewear device 100 utilized in the wallpaper system. As shown, the depth-capturing camera includes a left visible light camera 114A and a depth sensor 213 on a frame 105 to generate a depth image. Instead of utilizing at least two visible light cameras 114A-B to generate the depth image, here a single visible light camera 114A and the depth sensor 213 are utilized to generate depth images, such as the depth image. As in the example of FIGS. 1A-D, a spatial user input selection from a user can be applied to a depth image, which is a 3D model of an original image, to create a wallpaper image based on the spatial user input selection, and then present the wallpaper image. The infrared camera 220 of the depth sensor 213 has an outward facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A-B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared in the light of sight of the eye of the user. Similarly, the infrared camera 220 can be connected essentially anywhere on the frame 105, left chunk 110A, or right chunk 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the chunks 110A-B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the wallpaper system. Eyewear device 100 or the wallpaper system can subsequently process the captured infrared image during generation of three-dimensional depth images, such as the depth image.

Figure 2B:
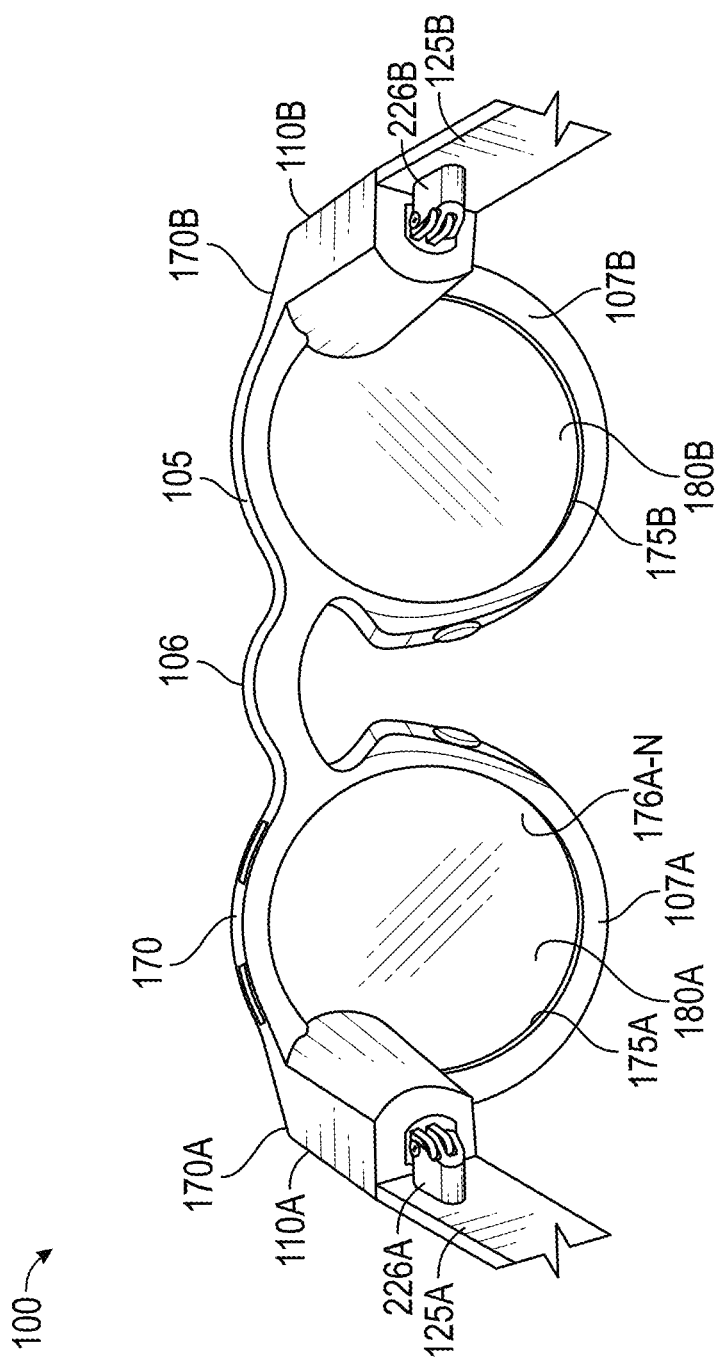
FIGS. 2B and 2C are rear views of example hardware configurations of the eyewear device, including two different types of image displays.
Figure 2C:
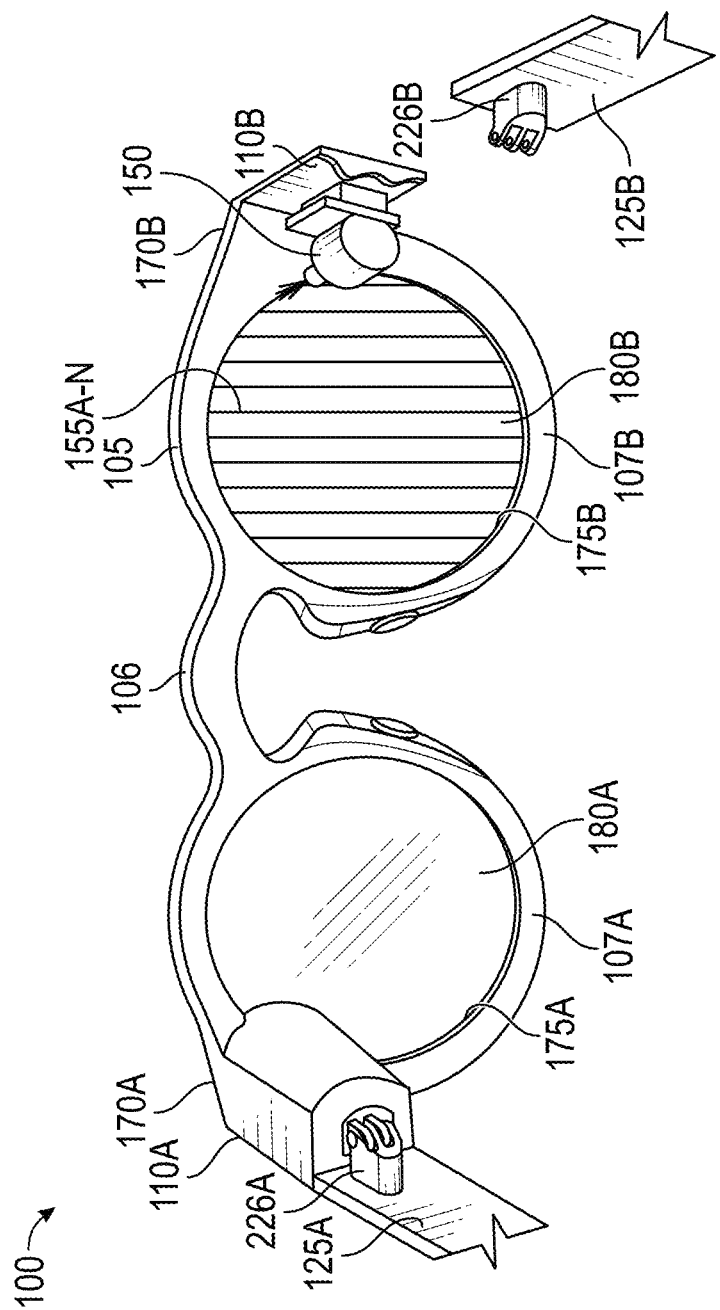

FIGS. 2B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B, which hold a respective optical element 180A-B, such as a lens and a display device. As used herein, the term "lens" is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 2B, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 2C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2B-C, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105. As used herein, the chunks 110A-B can include an enclosure that encloses a collection of processing units, camera, sensors, etc. (e.g., different for the right and left side) that are encompassed in an enclosure.

In one example, the image display includes a first (left) image display and a second (right) image display. Eyewear device 100 includes first and second apertures 175A-B, which hold a respective first and second optical assembly 180A-B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
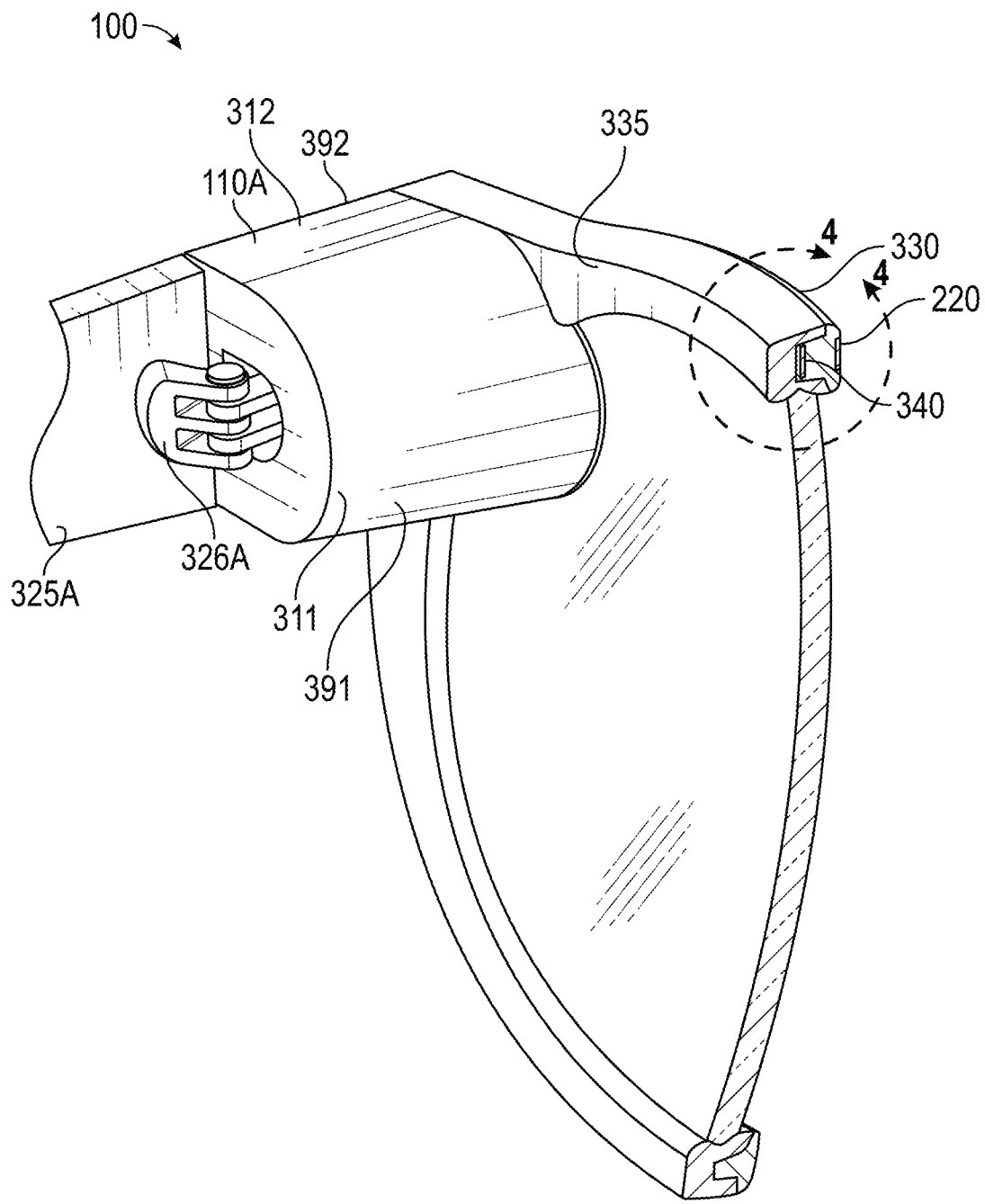
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. It can be seen that the upper portion of the left rim 107A of the frame 105 of the eyewear device 100 includes a frame front 330 and a frame back 335. The frame front 330 includes a front-facing side configured to face outwards away from the eye of the user. The frame back 335 includes a rear-facing side configured to face inwards towards the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left chunk 110A to the left temple 325A via a left hinge 326A. In some examples, components of the depth sensor 213, including the infrared camera 220, the flexible PCB 340, or other electrical connectors or contacts may be located on the left temple 325A or the left hinge 326A.

In an example, the left chunk 110A includes a chunk body 311, a chunk cap 312, an inward facing surface 391 and an outward facing surface 392 (labeled, but not visible). Disposed inside the left chunk 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images, for example, in combination with right visible light camera 114B.

Figure 4:
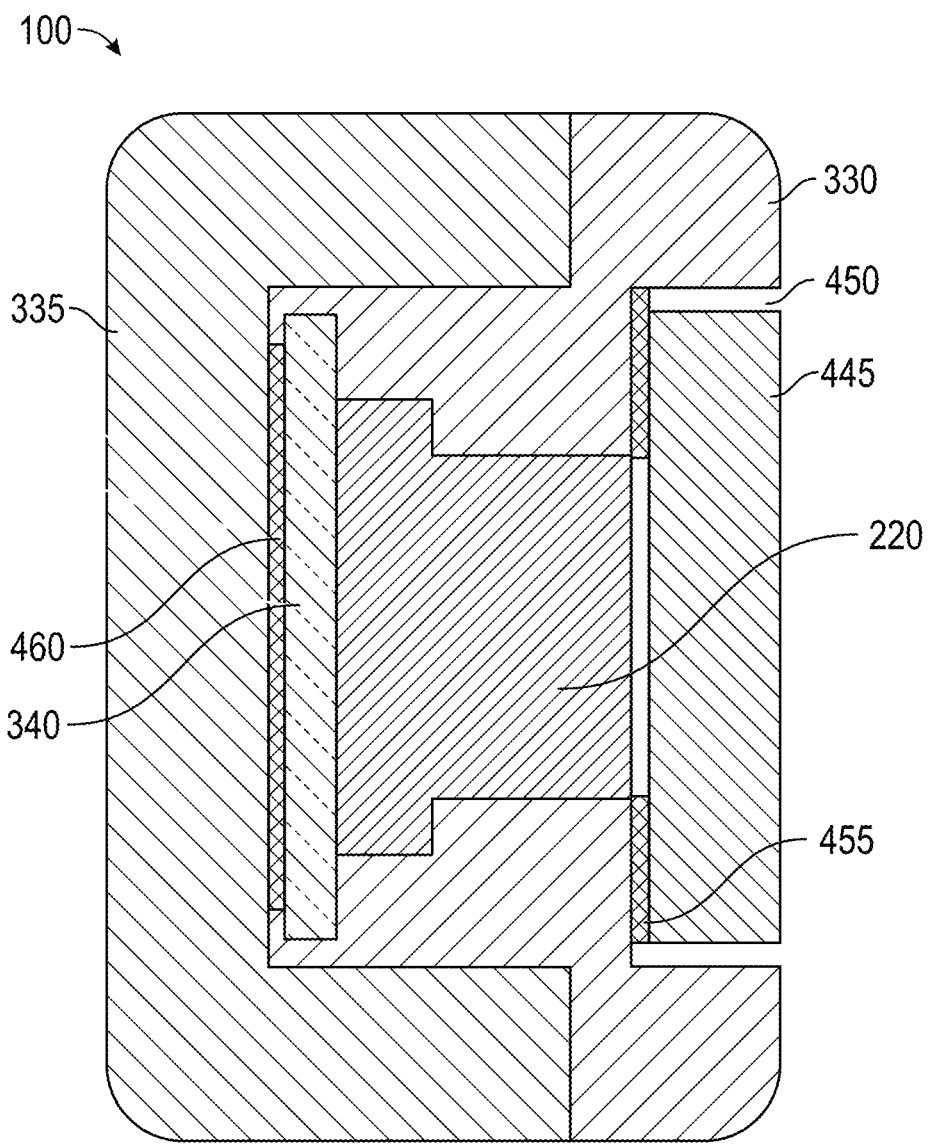
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat, which melts a solder paste to connect the two components. In one example, reflowing is used to surface mount the infrared camera 220 on the flexible PCB 340 and electrically connect the two components. However, it should be understood that through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
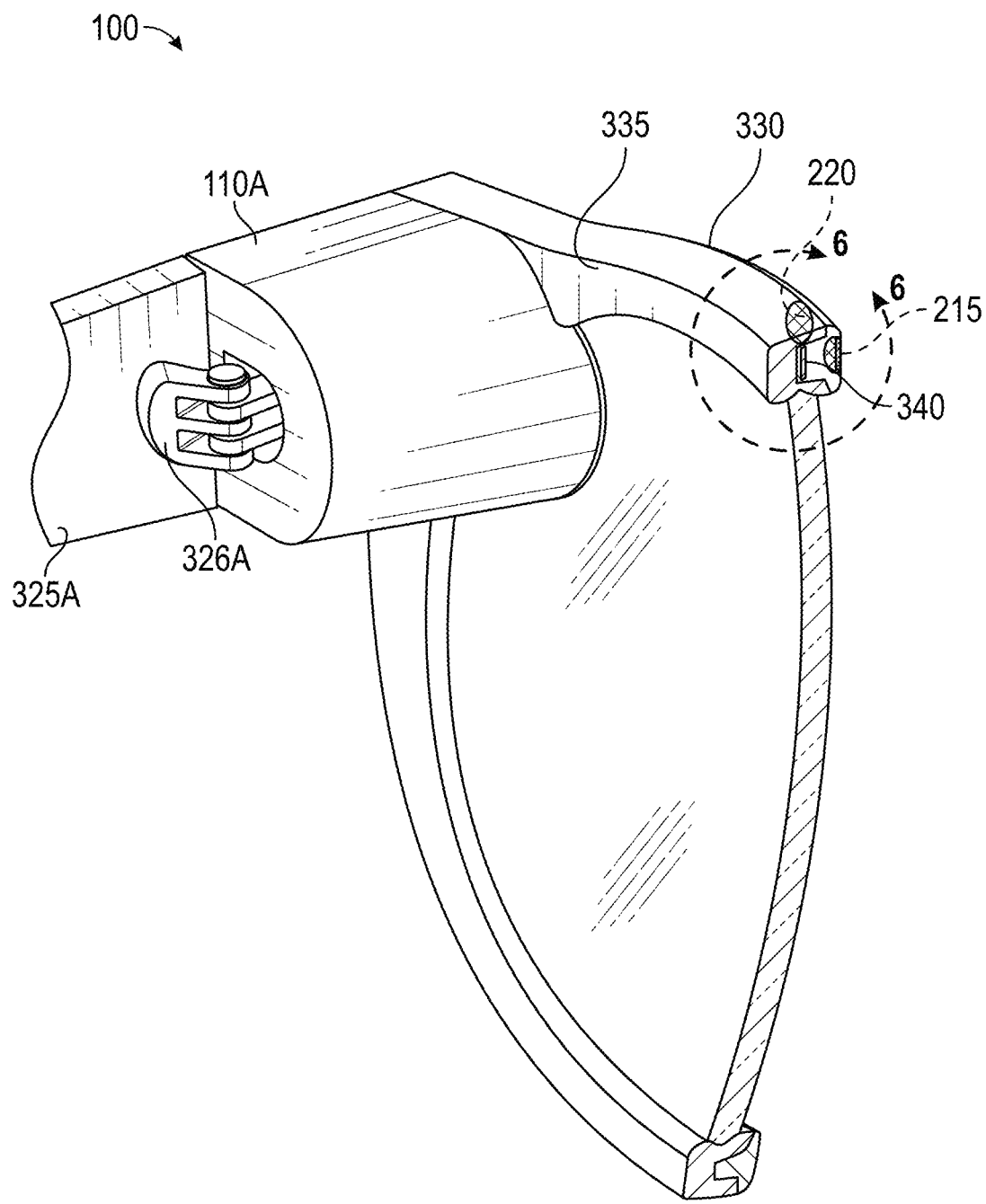
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left chunk 110A to the left temple 325A via the left hinge 326A. In some examples, components of the depth sensor 213, including the infrared emitter 215, the flexible PCB 340, or other electrical connectors or contacts may be located on the left temple 325A or the left hinge 326A.

Figure 6:
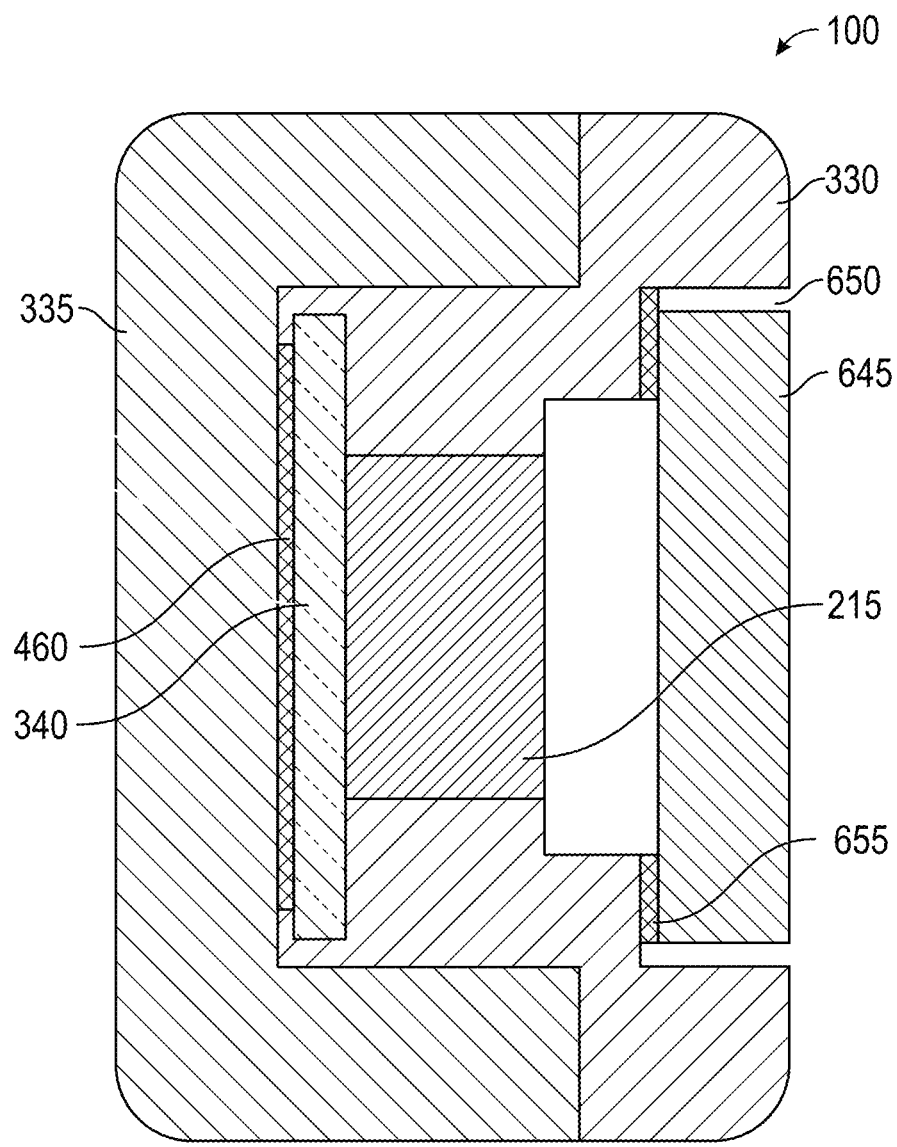
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat, which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

Figure 7:
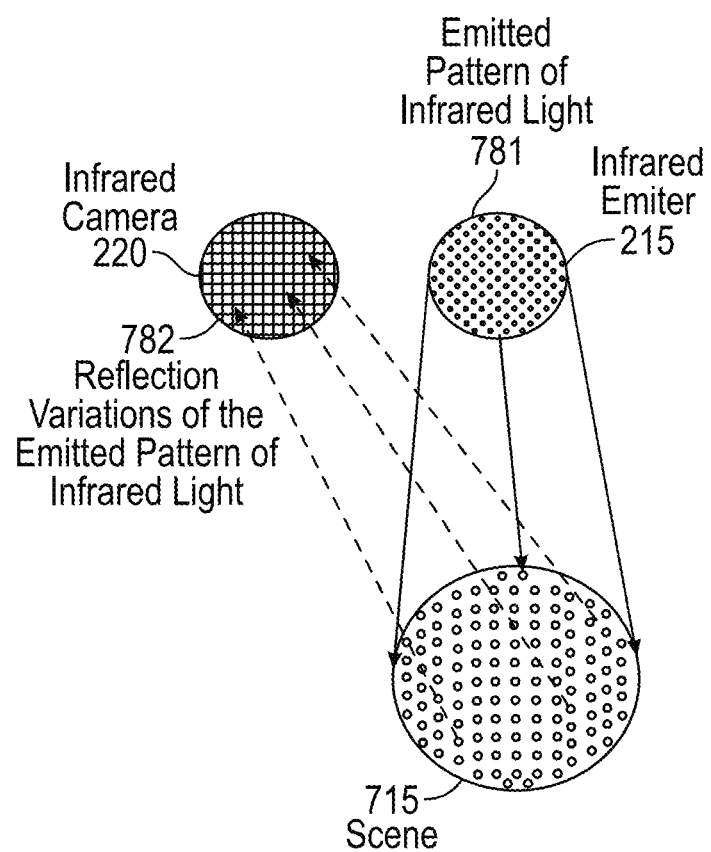
FIG. 7 depicts an example of a pattern of infrared light emitted by the infrared emitter of the depth sensor and reflection variations of the emitted pattern of infrared light captured by the infrared camera of the depth sensor of the eyewear device to measure depth of pixels in a raw image to generate the depth image.

FIG. 7 depicts an example of an emitted pattern of infrared light 781 emitted by an infrared emitter 215 of the depth sensor 213. As shown, reflection variations of the emitted pattern of infrared light 782 are captured by the infrared camera 220 of the depth sensor 213 of the eyewear device 100 as an infrared image. The reflection variations of the emitted pattern of infrared light 782 is utilized to measure depth of pixels in a raw image (e.g., left raw image) to generate a three-dimensional depth image, such as the depth image.

Depth sensor 213 in the example includes the infrared emitter 215 to project a pattern of infrared light and the infrared camera 220 to capture infrared images of distortions of the projected infrared light by objects or object features in a space, shown as scene 715 being observed by the wearer of the eyewear device 100. The infrared emitter 215, for example, may blast infrared light 781, which falls on objects, or object features within the scene 715 like a sea of dots. In some examples, the infrared light is emitted as a line pattern, a spiral, or a pattern of concentric rings or the like. Infrared light is typically not visible to the human eye. The infrared camera 220 is similar to a standard red, green, and blue (RGB) camera but receives and captures images of light in the infrared wavelength range. For depth sensing, the infrared camera 220 is coupled to an image processor (element 912 of FIG. 9) and the wallpaper programming (element 945) that judge time of flight based on the captured infrared image of the infrared light. For example, the distorted dot pattern 782 in the captured infrared image can then be processed by an image processor to determine depth from the displacement of dots. Typically, nearby objects or object features have a pattern with dots spread further apart and far away objects have a denser dot pattern. It should be understood that the foregoing functionality can be embodied in programming instructions of wallpaper programming or application (element 945) found in one or more components of the system.

Figure 8A:
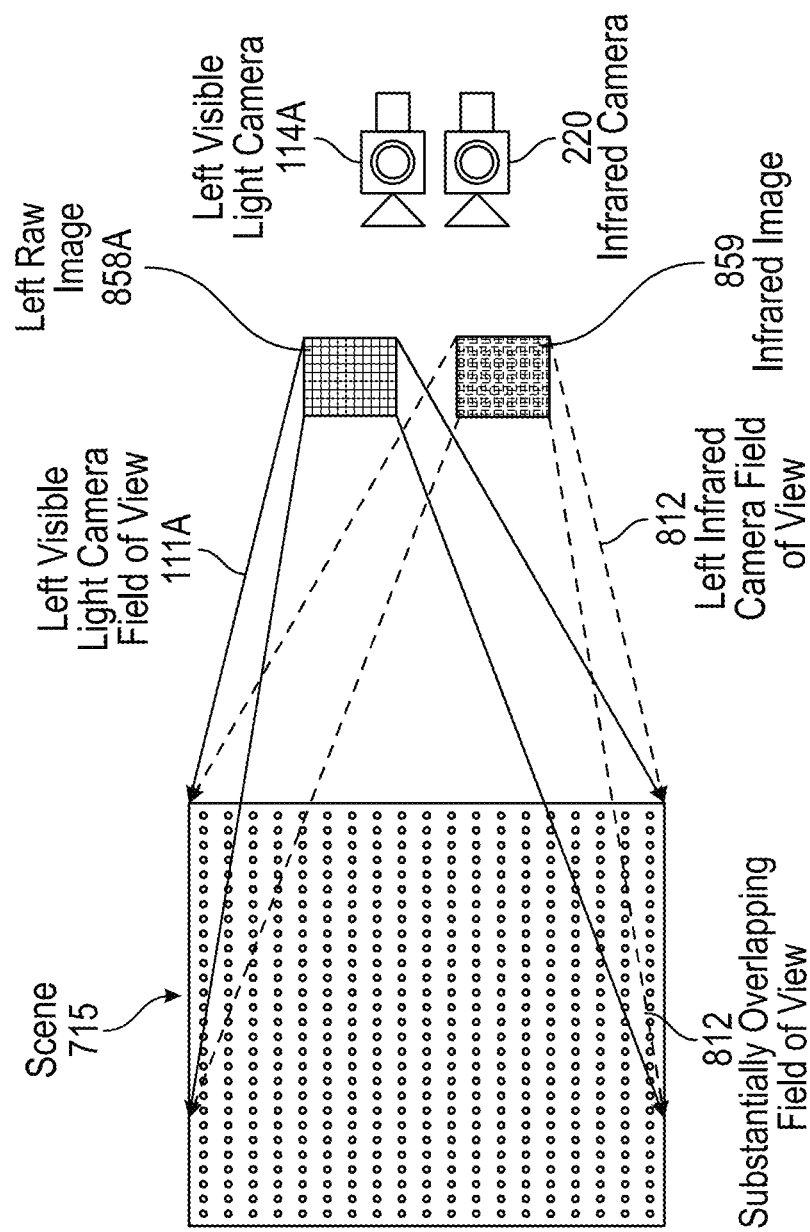
FIG. 8A depicts an example of infrared light captured by the infrared camera of the depth sensor as an infrared image and visible light captured by a visible light camera as a raw image to generate the initial depth image of a three-dimensional scene.

FIG. 8A depicts an example of infrared light captured by the infrared camera 220 of the depth sensor 213 with a left infrared camera field of view 812. Infrared camera 220 captures reflection variations in the emitted pattern of infrared light 782 in the three-dimensional scene 715 as an infrared image 859. As further shown, visible light is captured by the left visible light camera 114A with a left visible light camera field of view 111A as a left raw image 858A. Based on the infrared image 859 and left raw image 858A, the three-dimensional depth image of the three-dimensional scene 715 is generated.

Figure 8B:
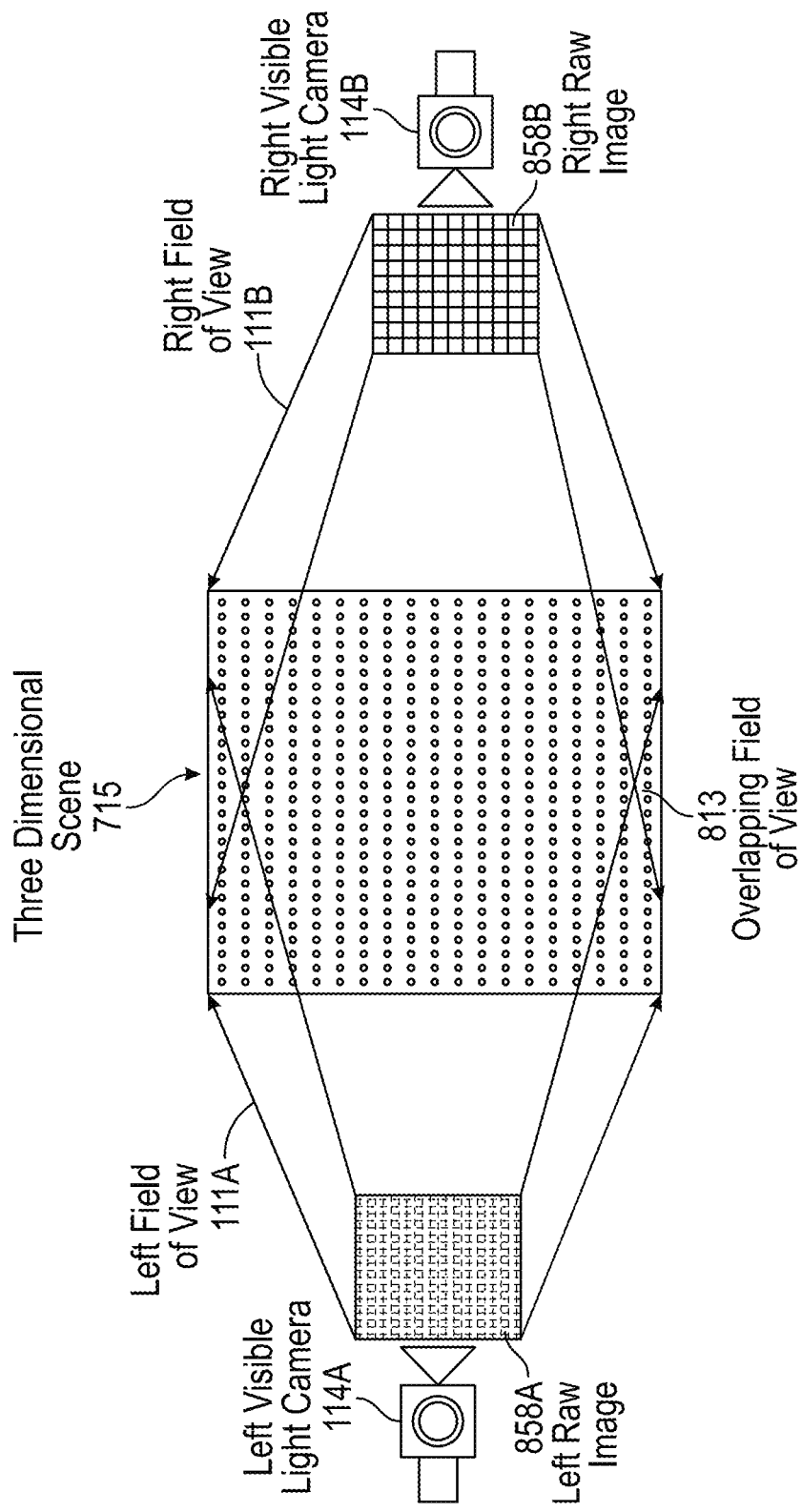
FIG. 8B depicts an example of visible light captured by the left visible light camera as left raw image and visible light captured by the right visible light camera as a right raw image to generate the initial depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional depth image of the three-dimensional scene 715 is generated.

Figure 9:
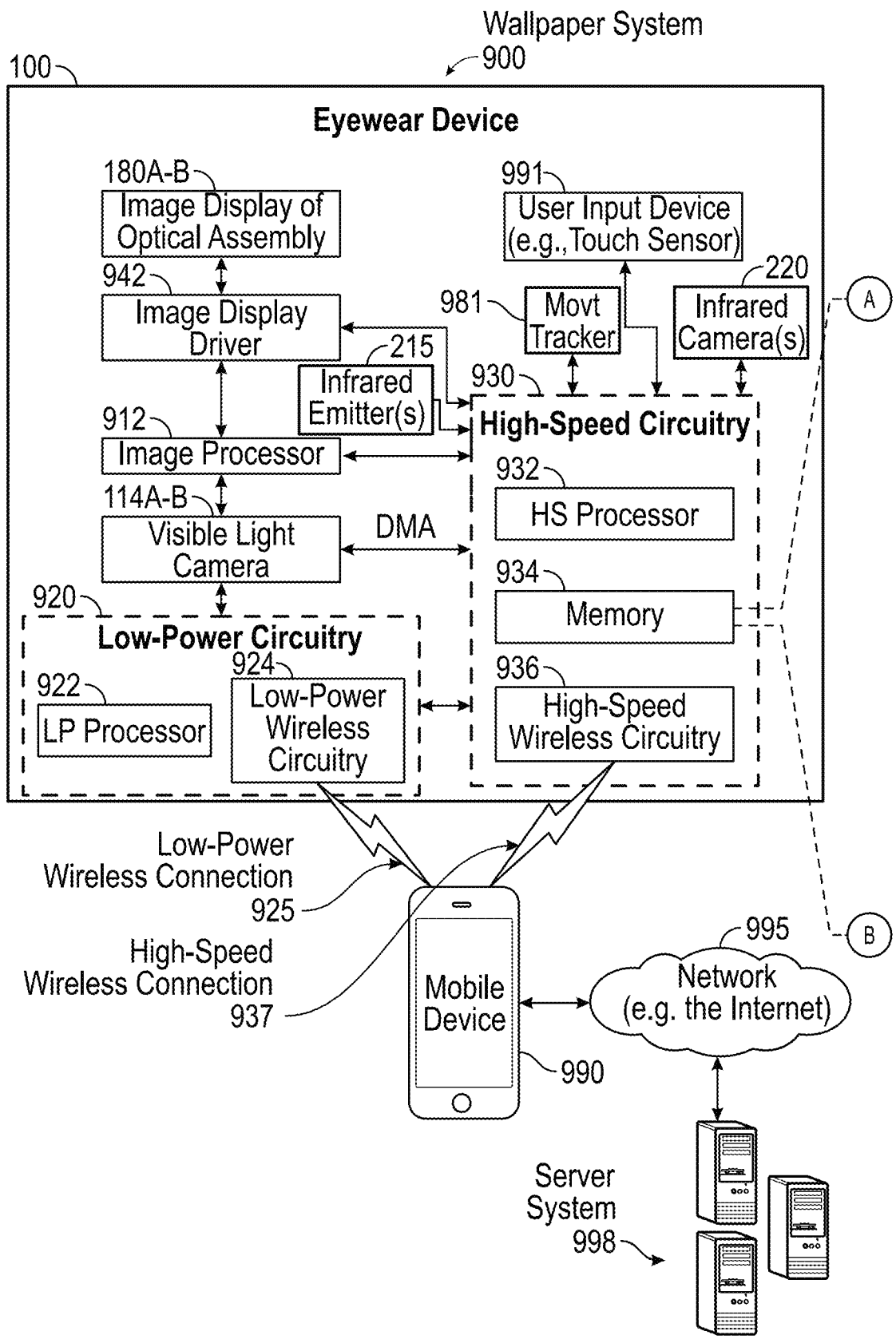
FIG. 9 is a high-level functional block diagram of an example wallpaper system including the eyewear device with a depth-capturing camera to capture an original video that include original images, a mobile device, and a server system connected via various networks.
Figure 9:
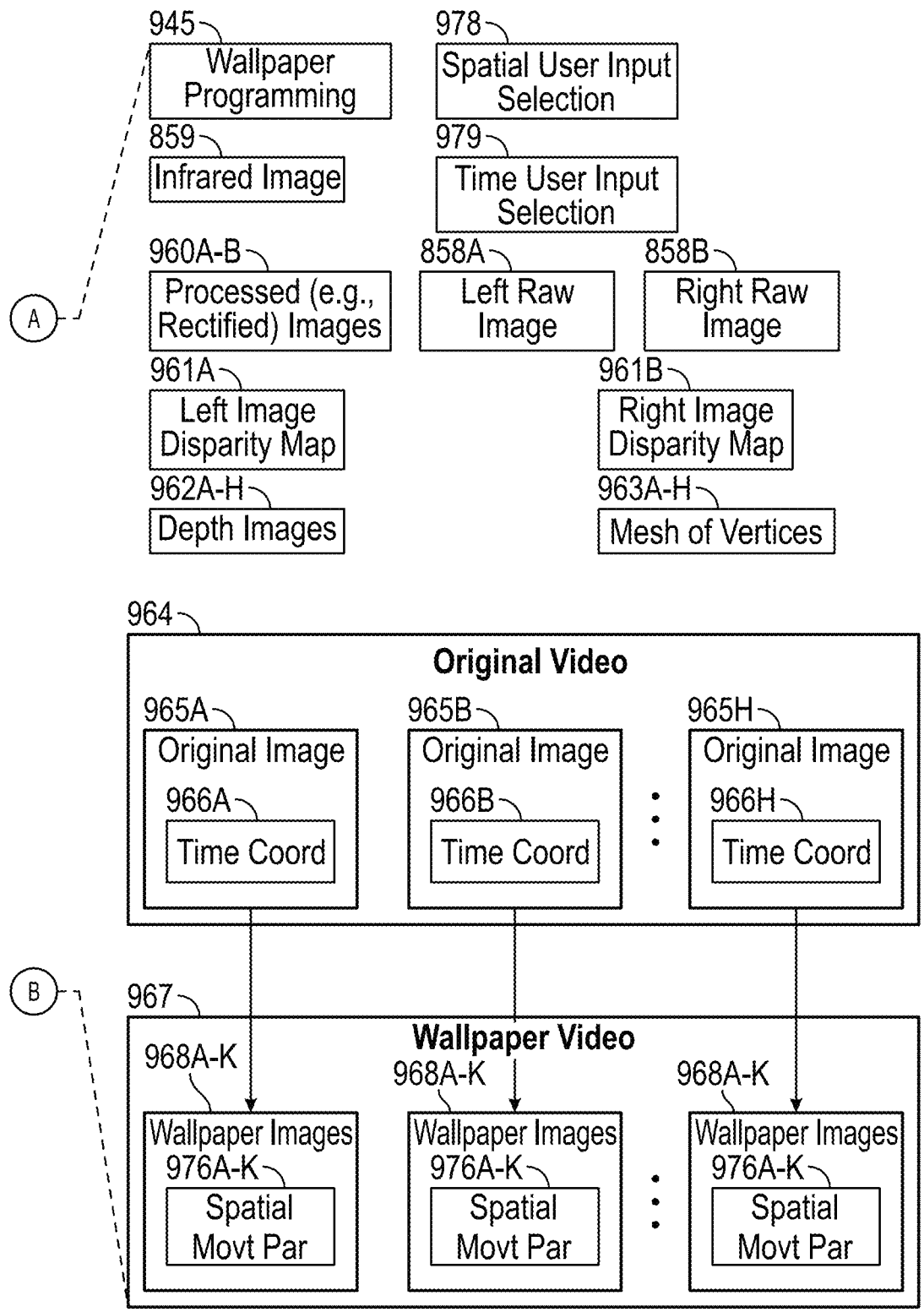

FIG. 9 is a high-level functional block diagram of an example wallpaper system 900, which includes a wearable device (e.g., the eyewear device 100), a mobile device 990, and a server system 998 connected via various networks. Eyewear device 100 includes a depth-capturing camera, such as at least one of the visible light cameras 114A-B; and the depth sensor 213, shown as infrared emitter 215 and infrared camera 220. The depth-capturing camera can alternatively include at least two visible light cameras 114A-B (one associated with the left lateral side 170A and one associated with the right lateral side 170B). Depth-capturing camera generates depth images 962A-H, which are rendered three-dimensional (3D) models that are texture mapped images of a red, green, and blue (RGB) imaged scene, e.g., derived from the raw images 858A-N and processed (e.g., rectified) images 960A-N.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180A-B are for presenting images and videos, including eight original images 965A-H (e.g., raw images 858A-N and processed images 960A-B) of the original video 964 and eight sets of wallpaper images 968A-K, 969A-K, ... 975A-K of the wallpaper video 967 associated with a respective one of the eight original images 965A-H. Each of the sets of wallpaper images 968A-K, 969A-K, ... 975A-K has eleven wallpaper images (e.g., 968A-K) to provide a total of eleven fields of view as represented by the spatial movement parameter 976A-K (e.g., 0.0, 0.1, ... 1.0) of the respective original image 965A-H. The middle wallpaper image (e.g., 968F) may correspond to the field of view of the original image (e.g., 965A). Image display driver 942 is coupled to the image display of optical assembly 180A-B to control the image display of optical assembly 180A-B to present the images and videos, such as selective images of the original video 964 and the wallpaper video 967. Eyewear device 100 further includes a user input device 991 (e.g., touch sensor) to receive a spatial user input selection 978 and a time user input selection 979 from a user. In some examples, the user input device 991 includes a movement tracker 981 (e.g., an inertial measurement unit).

The components shown in FIG. 9 for the eyewear device 100 are located on one or more circuit boards, for example a PCB or flexible PCB, in the rims or temples. Alternatively, or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device includes 100 includes a memory 934 which includes wallpaper programming 945 to perform a subset or all of the functions described herein for wallpaper effects, in which one or both of: (i) a spatial user input selection 978, and (ii) a time user input selection 979 from a user are applied to interact with wallpaper images 968A-K, 969A-K, 975A-K. As shown, memory 934 further includes a left raw image 858A captured by left visible light camera 114A, a right raw image 858B captured by right visible light camera 114B, and an infrared image 859 captured by infrared camera 220 of the depth sensor 213. Memory 934 further includes multiple depth images 962A-H, one for each of the eight original images 965A-H. Depth images 962A-H are generated, via the depth-capturing camera, and each of the depth images 962A-H includes a respective mesh of vertices 963A-H.

Figure 11:
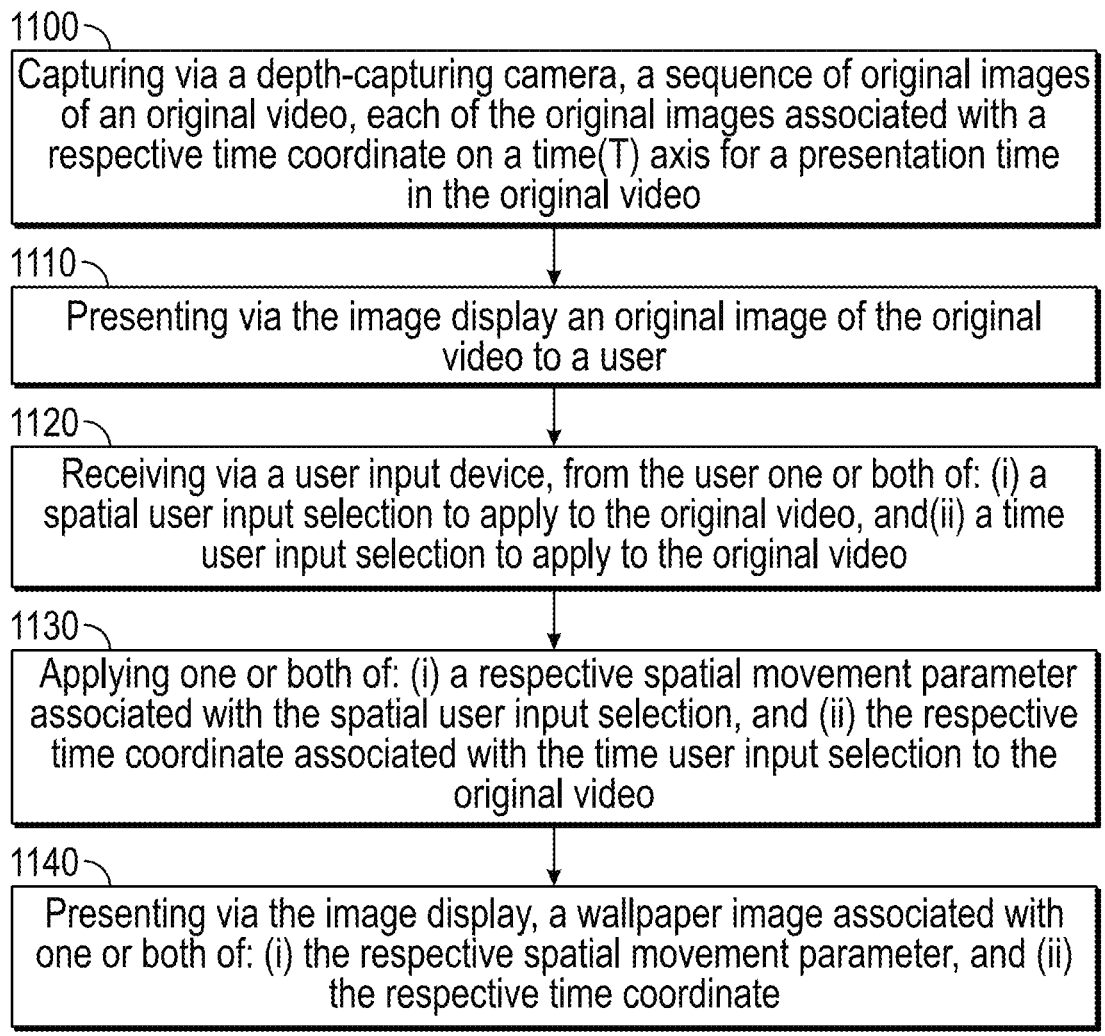
FIG. 11 is a flowchart of a method that can be implemented in the wallpaper system to apply to the original video to create and present a wallpaper image.

A flowchart outlining functions which can be implemented in the wallpaper programming 945 is shown in FIG. 11. Memory 934 further includes the spatial user input selection 978 (e.g., tilt of the eyewear device 100 or the mobile device 990) and the time user input selection 979 (e.g., an initial touch point and a final touch point), which are received by the user input device 991. Memory 934 further includes: a left image disparity map 961A, a right image disparity map 961B, a left processed (e.g., rectified) image 960A and a right processed (e.g., rectified) image 960B (e.g., to remove vignetting towards the end of the lens). As further shown, memory 934 includes the respective mesh of vertices 963A-H for each of the depth images 962A-H; and an original video 964 that includes a sequence of original images 965A-H and respective time coordinates 966A-H associated with each of the original images 965A-H. Memory further includes a wallpaper video 967 that includes eight sets of eleven wallpaper images 968A-K, 969A-K, ... 975A-K for each of the eight respective original images 965A-H. A respective set of the eleven wallpaper images 968A-K, 969A-K, ... 975A-K is associated with the respective time coordinate 966A-H of the respective original image 965A-H. Some or all of the stored information in the memory 934 can be generated during image processing of the raw images 858A-B to generate wallpaper images 968A-K, 969A-K, 975A-K.

For example, K fields of view (or viewpoints), 0.1, 0.2, until 1 are created to generate eleven views corresponding to eleven wallpaper images 968A-K, such that each wallpaper image 968A-K is seen at a different angular orientation. When the user tilts (e.g., rotates) the mobile device 990, the eleven different wallpaper images 968A-K are rotated between. By having several (eleven) wallpaper images 968A-K, a 3D appearance is created. Moving the mobile device 990 provides an effect of different viewpoints, which provides a short video animation even when based on just a single original image 965A set as wallpaper.

In the generation of the sets of wallpaper images 968A-K, 969A-K, 975A-K based on 3D image processing, actual distance or depth can be used to rotate around the 3D mesh of vertices 963A-H. In the 2D light field effect image processing version, disparity is used, which is related to depth, but disparity is not directly depth. Rather, disparity is just a movement of pixels, which means the image processing can be done in the 2D space to speed up runtime and reduce memory requirements. There need not be any transformation into 3D, rather there are corresponding pixels and interpolation between the corresponding pixels. While the correspondence (disparity), can translate into depth (distance), depth is not needed for this spatial movement wallpaper effect. Whether the depth on the Z axis is 10 meters or 20 meters does not matter, the pixel can be moved to a different X axis location coordinate depending on the spatial movement input selection 978.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain embodiments, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain embodiments, high-speed wireless circuitry 936 is configured to implement Institute of Electrical and Electronic Engineers (IEEE) 802.11 communication standards, also referred to herein as Wi-Fi. In other embodiments, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B, infrared camera 220, and the image processor 912, as well as images generated for display by the image display driver 942 on the image displays of the optical assembly 180A-B. While memory 934 is shown as integrated with high-speed circuitry 930, in other embodiments, memory 934 may be an independent standalone element of the eyewear device 100. In certain such embodiments, electrical routing lines may provide a connection through a chip that includes the high-speed processor 932 from the image processor 912 or low-power processor 922 to the memory 934. In other embodiments, the high-speed processor 932 may manage addressing of memory 934 such that the low-power processor 922 will boot the high-speed processor 932 any time that a read or write operation involving memory 934 is needed.

Figure 10:
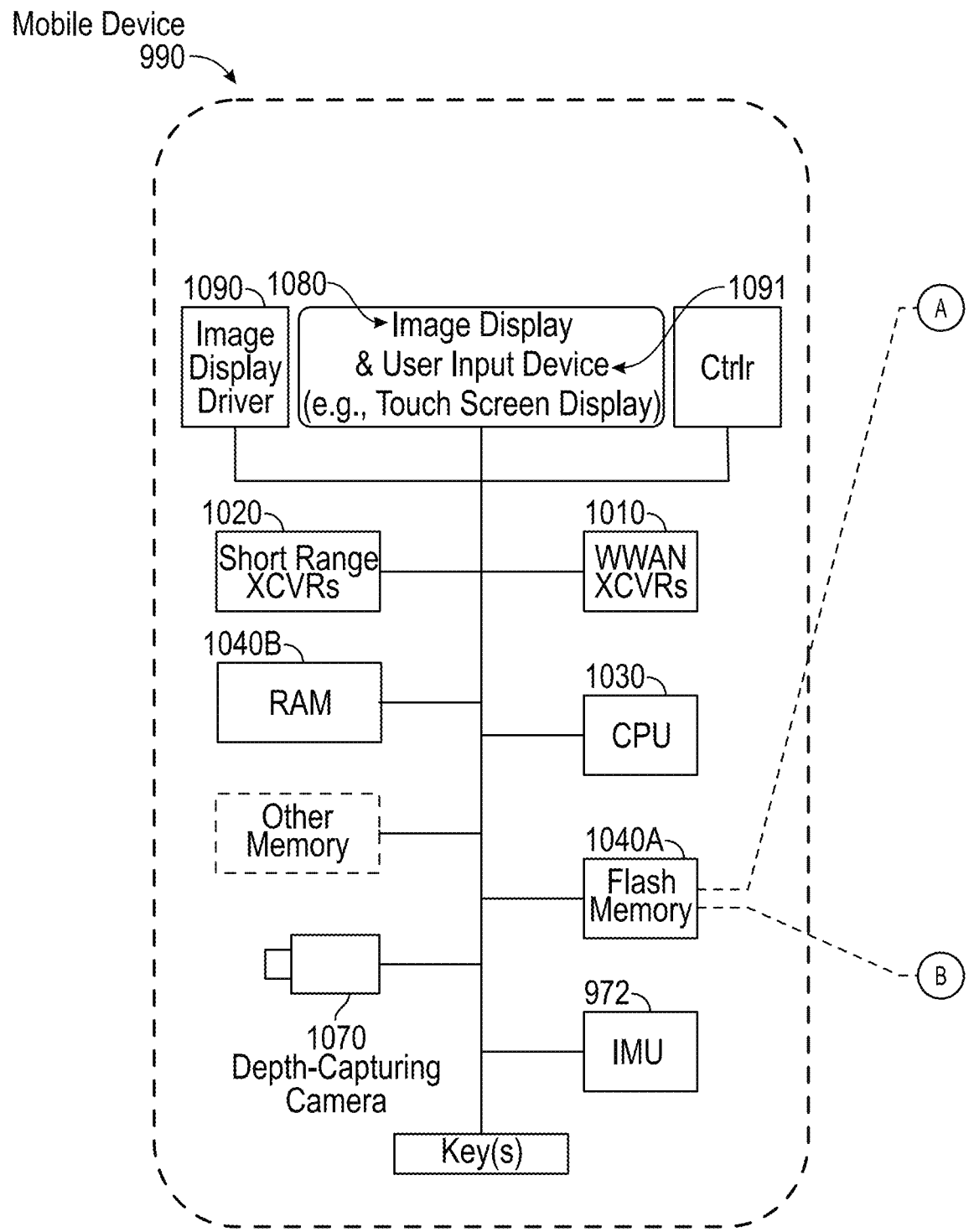
FIG. 10 shows an example of a hardware configuration for the mobile device of the wallpaper system of FIG. 9 to create and interact with a wallpaper video that includes multiple wallpaper images.
Figure 10:
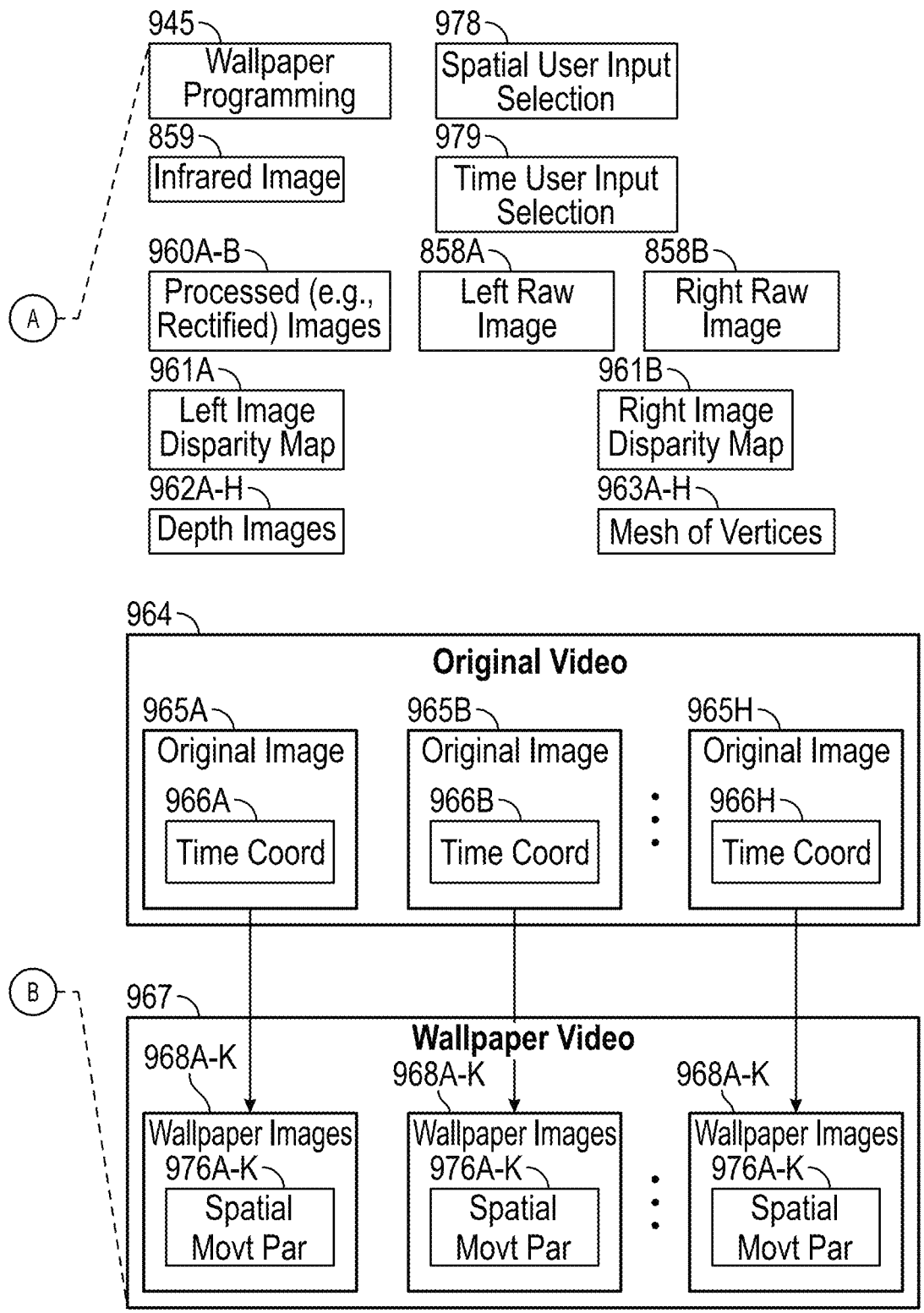

As shown in FIG. 9, the processor 932 of the eyewear device 100 can be coupled to the depth-capturing camera (visible light cameras 114A-B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the wallpaper programming 945 in the memory 934 by the processor 932 of the eyewear device 100. Mobile device 990 can perform all or a subset of any of the following functions described below as a result of the execution of the wallpaper programming 945 in the memory 1040A by the processor 1030 of the mobile device 990. Functions can be divided in the wallpaper system 900, such that the eyewear device 100 generates the raw images 858A-B, but the mobile device 990 performs the remainder of the image processing on the raw images 858A-B to generate the original video, including the eight original images 965A-H, and the wallpaper video 967, including the eight sets of wallpaper images 968A-K, 969A-K, . . . 975A-K.

An example wallpaper system 900 includes an image display 180A-B, 1080 for presenting a wallpaper video 967 including a sequence of wallpaper images 968A-K, 969A-K, . . . 975A-K. The wallpaper images 968A-K, 969A-K, . . . 975A-K are two-dimensional (2D) and based on raw images 858A-B or processed raw images 960A-B captured via the depth-capturing camera. Each of the wallpaper images 968A-K, 969A-K, . . . 975A-K is associated with a respective time coordinate 966A-H on a time (T) axis for a presentation time and a respective spatial movement parameter 976A-K. Wallpaper system 900 further includes an image display driver 942, 1090 coupled to the image display 180A-B, 1080 to control the image display 180A-B, 1080 to present the wallpaper video 967.

Wallpaper system 900 further includes a user input device 991, 1091, 981 to receive from a user one or both of: (i) a spatial user input selection 978, and (ii) a time user input selection 979 to apply to the wallpaper video 967. Wallpaper system 900 further includes a memory 934, 1040A; and a processor 932, 1030 coupled to the image display driver 942, 1090 the user input device 991, 1091 and the memory 934, 1040A. Wallpaper system 900 further includes wallpaper programming 945, 1045 in the memory 934, 1040A.

Execution of the wallpaper programming 945 by the processor 932, 1030 configures the wallpaper system 900 to perform functions, including functions to present, via the image display 180A-B, 1080, a first wallpaper image of the wallpaper video 967 to the user. Let's assume in the example that the first wallpaper image is 968A that is associated with the spatial movement parameter 976A. Wallpaper system 900 receives, via the user input device 991, 1091 from the user one or both of: (i) the spatial user input selection 978, and (ii) the time user input selection 979 to apply to the wallpaper video 967.

Wallpaper system 900 determines one or both of: (i) the respective spatial movement parameter 976A-K associated with the spatial user input selection 978, and (ii) the respective time coordinate 966A-H associated with the time user input selection 979. Wallpaper system 900 presents, via the image display 180A-B, 1080, a second wallpaper image associated with one or both of: (i) the respective spatial movement parameter 976A-K, and (ii) the respective time coordinate 966A-H. Continuing with the example where the first wallpaper image is 968A, assume that the spatial movement parameter is 976B and the time coordinate is 966B. If there is only the spatial user input selection 978 for just spatial movement, then the second wallpaper image is 968B to just present spatial movement of the wallpaper video 967. If there is only the time user input selection 979 for just time movement, then the second wallpaper image is 969A to present just time movement of the wallpaper video 967. However, if there is both the spatial user input selection 978 and the time user input selection 979, the second wallpaper image is 969B to present both spatial movement and time movement of the wallpaper video 967.

Either the mobile device 990 or eyewear device 100 can include the user input device 991, 1091. In the touch based user input device 991, 1091, the time user input selection 979 may be detected as vertical scrolling (swiping) type of finger gesture on the touch sensor (e.g., upwards scrolling to advance (forward) the time coordinate 966A-H or downwards scrolling to rewind the time coordinate 966A-H. A touch-based user input device 1091 can be integrated into the mobile device 990 as a touch screen display. In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 1091 from the user one or both of: (i) the spatial user input selection 978, and (ii) the time user input selection 979 to apply to the wallpaper video 967 includes the following functions. First, receiving on the input surface of the touch sensor the at least one finger contact inputted from the user. Second, tracking, via the sensing circuit, the at least one finger contact on the input surface. Third, detecting one or both of: (i) the spatial user input selection 978, and (ii) the time user input selection 979 to apply to the wallpaper video 967 on the input surface of the touch sensor based on the at least one finger contact from the user.

A touch-based user input device 991 can be integrated into the eyewear device 100. As noted above, eyewear device 100 includes a chunk 110A-B integrated into or connected to the frame 105 on the lateral side 170A-B of the eyewear device 100. The frame 105, the temple 125A-B, or the chunk 110A-B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

User input device 991, 1091 of the mobile device 990 or eyewear device 100 can include the movement tracker 981. In the movement tracker 981 of the user input device 991, 1091, the spatial user input selection 978 may be detected as left or right horizontal titling (change of tilt angle or rotation angle), for example, of the mobile device 990 or eyewear device 100. Movement (movt) tracker 981 is an electronic device, such as an inertial measurement unit (IMU), that measures and reports a body's specific force, angular rate, and sometimes the magnetic field surrounding the body, using a combination of accelerometers and gyroscopes, sometimes also magnetometers. If a magnetometer is present, the magnetic field can be used as input to detect specific gestures that are dependent on Earth's or an artificial magnetic field. In this example, the inertial measurement unit determines a rotation acceleration of the eyewear device 100 or a host computer, such as the mobile device 990. The movement tracker 981 works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y)

for top-bottom movement, and depth or distance axis for up-down movement (Z). The gyroscope detects the rate of rotation around 3 axes (X, Y, and Z). The magnetometer detects the magnetic field (e.g., facing south, north, etc.) like a compass which generates a heading reference, which is a mixture of Earth's magnetic field and other artificial magnetic field (such as ones generated by power lines). The three accelerometers detect acceleration along the horizontal (X), vertical (Y), and depth or distance (Z) axes defined above, which can be defined relative to the ground, the eyewear device 100 or the mobile device 990, the depth-capturing camera, or the user wearing the eyewear device 100 or holding (or carrying) the mobile device 990. Thus, the accelerometer detects a 3-axis acceleration vector, which then can be used to detect Earth's gravity vector.

In one example, the mobile device 990 includes the user input device 1091. The user input device 1091 includes the movement tracker 981 coupled to the processor 1030 to track movement of the mobile device 990. Movement tracker 981 includes: (i) at least one accelerometer to measure acceleration of the mobile device, (ii) at least one gyroscope to measure rotation of the mobile device, or (iii) an inertial measurement unit (IMU) having the at least one accelerometer and the at least one gyroscope. The function of receiving, via the user input device 1091 from the user one or both of: (i) the spatial user input selection 978, and (ii) the time user input selection 979 from the user to apply to the wallpaper video 967 includes the following functions. First, tracking, via the movement tracker 981, movement of the mobile device 990 by: (i) measuring, via the at least one accelerometer, the acceleration of the mobile device 990, (ii) measuring, via the at least one gyroscope, the rotation of the mobile device 990, or (iii) measuring, via the inertial measurement unit, both the acceleration and the rotation of the mobile device 990. Second, detecting one or both of: (i) the spatial user input selection 978, and (ii) the time user input selection 979 to apply to the wallpaper video 967 by detecting at least one variation of the tracked movement over a time period.

As noted above, eyewear device 100 includes a frame 105, a temple 125A-B connected to a lateral side 170A-B of the frame 105, and the depth-capturing camera. The depth-capturing camera is supported by at least one of the frame 105 or the temple 125A-B. The depth-capturing camera includes: (i) at least two visible light cameras 114A-B with overlapping fields of view 111A-B, or (ii) a least one visible light camera 114A or 114B and a depth sensor 213. The depth-capturing camera 1070 of the mobile device 990 can be similarly structured.

In one example, the depth-capturing camera includes the at least two visible light cameras 114A-B comprised of a left visible light camera 114A with a left field of view 111A to capture a left raw image 858A and a right visible light camera 114B with a right field of view 111B to capture a right raw image 858B. The left field of view 111A and the right field of view 111B have an overlapping field of view 813 (see FIG. 8B).

In a 2D image processing light field effects example, execution of the wallpaper programming 945 by the processor 932, 1030 configures the wallpaper system 900 to perform functions, including functions to generate, the second wallpaper image by implementing the following functions. First, calculating: (i) a left image disparity map 961A between a left pixel matrix of pixels and a right pixel matrix of pixels, and (ii) a right image disparity map 961B between the right pixel matrix and the left pixel matrix. The left raw image 858A or a left processed image 960A include the left pixel matrix. The right raw image 858B or a right processed image 960B include the right pixel matrix. Second, determining the respective spatial movement parameter 976A-K of the left pixel matrix and the right pixel matrix along at least one of: (i) an X axis for horizontal position movement, and (ii) a Y axis for vertical position movement. In one example, the movement is made along only one single X axis that is parallel to the baseline (an imaginary line connecting the visible light cameras 114A-B). Third, filling up a left interpolated pixel matrix by moving pixels in the left pixel matrix along at least one of: (i) the X axis, and (ii) the Y axis based on the respective spatial movement parameter 976A-K. Fourth, filling up a right interpolated pixel matrix by moving pixels in the right pixel matrix along at least one of: (i) the X axis, and (ii) the Y axis based on the spatial movement parameter 976A-K. Fifth, blending together the left interpolated pixel matrix and the right interpolated pixel matrix to create the second wallpaper image.

In the 2D image processing example, assume that the first wallpaper image is 968F, which is associated with the spatial movement parameter of 976F. The first wallpaper image 968F has the same field of view of the original image 965A and essentially mimics the original image 965A. Thus, the raw images 858A-B as captured by the left and right visible light cameras 114A-B correspond to the original image 965A before processing and the processed images 960A-B correspond to the original image 965A after rectification. Assuming that the received spatial user input selection 978 is for just spatial movement and is associated with the spatial movement parameter is 976B, then the presented second wallpaper image is 968B. The second wallpaper image 968B is blended together based on the left interpolated pixel matrix and the right interpolated pixel matrix to present an appearance of spatial movement or rotation around the first wallpaper image 968F (i.e., original image 965A). Blending together the left interpolated pixel matrix and the right interpolated pixel matrix is based on disparity confidence levels, gradients, or combination thereof in the left image disparity map 961A and the right image disparity map 961B. The disparity confidence level value is based, for instance, on the magnitude of correlation between the left and the right pixels.

Continuing with the 2D example, the spatial movement parameter 976A-K is for horizontal position movement along the X axis. The left interpolated pixel matrix is filled up by moving pixels in the left pixel matrix along the X axis. The right interpolated pixel matrix is filled up by moving pixels in the right pixel matrix along the X axis further based on a complement of the spatial movement parameter 976A-K (i.e., 1 minus the spatial movement parameter 976A-K).

In some examples, it may be advantageous to pre-process the original images 965A-H to create a wallpaper image matrix. Creating the wallpaper image matrix improves processing time of the wallpaper system 900 to respond to the spatial user input selection 978 and the time user input selection 979 by pre-generating and persistently storing as an archive eight sets of wallpaper images 968A-K, 969A-K, ... 975A-K. On the other hand, pre-generating the wallpaper image matrix imposes additional memory 932, 1040A storage requirements on the wallpaper system 900, but does provide the benefit of faster response time to user interactions to manipulate the wallpaper video 967. Hence, execution of the wallpaper programming 945 by the processor 932, 1030 configures the wallpaper system 900 to upon selection of the original video 964 as wallpaper by the user, create and persistently store in the memory 934, 1040A a wallpaper image matrix. Each respective set of wallpaper images 968A-K, 969A-K, . . . 975A-K corresponds to the respective time coordinate 966A-H of a respective original image 965A-H of the original video 964. Each respective set of wallpaper images 968A-K, 969A-K, . . . 975A-K provides an appearance of a spatial movement or rotation around the respective original image 965A-H of the original video 964. Each wallpaper image 968A-K within the respective set of wallpaper images 968A-K, 969A-K, . . . 975A-K corresponds to a different spatial movement parameter 976A-K (e.g., there are eleven fields of view) within the respective original image 965A-H.

In the 2D image processing light field effects example, the function of creating, the wallpaper image matrix, including the sets of wallpaper images 968A-K, 969A-K, . . . 975A-K of the wallpaper video 967 includes the following functions. First, capturing, via the depth-capturing camera, the left raw image 858A and the right raw image 858B corresponding to the respective original image 965A-H. Second, calculating: (i) a left image disparity map 961A between a left pixel matrix of pixels and a right pixel matrix of pixels, and (ii) a right image disparity map 961B between the right pixel matrix and the left pixel matrix. The left raw image 858A or a left processed image 960A include the left pixel matrix. The right raw image 858B or a right processed image 960B include the right pixel matrix. Then for each wallpaper image 968A-K, 969A-K, . . . 975A-K of the respective set of wallpaper images 968A-K, 969A-K, . . . 975A-K implement the following functions. First, determining the respective spatial movement parameter 976A-K of the left pixel matrix and the right pixel matrix of the respective original image 965A-H along at least one of: (i) an X axis for horizontal position movement, and (ii) a Y axis for vertical position movement. Second, filling up a left interpolated pixel matrix by moving pixels in the left pixel matrix along at least one of: (i) the X axis, and (ii) the Y axis based on the respective spatial movement parameter 976A-K for the respective original image 965A-H. Third, filling up a right interpolated pixel matrix by moving pixels in the right pixel matrix along at least one of: (i) the X axis, and (ii) the Y axis based on the respective spatial movement parameter 976A-K of the respective original image 965A-H. Fourth, blending together the left interpolated pixel matrix and the right interpolated pixel matrix to create the respective wallpaper image 968A-K, 969A-K, . . . 975A-K.

In the 3D image processing example, execution of the wallpaper programming 945 by the processor 932, 1030 configures the wallpaper system 900 to perform the following functions. First, create, via the depth-capturing camera, a respective depth image 962A-H corresponding to the first wallpaper image. The respective depth image 962A-H is formed of a respective mesh of vertices 963A-H. Each vertex represents a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for depth (distance). Each vertex further includes one or more of a color attribute, a texture attribute, or a reflectance attribute. The function of generating, the presented second wallpaper image is implemented by rotating the respective depth image 962A-H based on the respective spatial movement parameter 976A-K. The respective spatial movement parameter 976A-K is along at least one of: (i) the X axis for horizontal position movement, (ii) the Y axis for vertical position movement, and (iii) the Z axis for depth (distance) movement.

In one example of the wallpaper system 900, the processor comprises a first processor 932 and a second processor 1030. The memory comprises a first memory 934 and a second memory 1040A. The eyewear device 100 includes a first network communication 924 or 936 interface for communication over a network 925 or 937 (e.g., a wireless short-range network or a wireless local area network), the first processor 932 coupled to the first network communication interface 924 or 936, and the first memory 934 accessible to the first processor 932. Eyewear device 100 further includes wallpaper programming 945 in the first memory 934. Execution of first wallpaper programming 945 by the first processor 932 configures the eyewear device 100 to perform functions to capture, via the depth-capturing camera, the original images 965A-H (e.g., raw images 858A-B or the processed raw images 960A-B).

The wallpaper system 900 further comprises a host computer, such as the mobile device 990, coupled to the eyewear device 100 over the network 925 or 937. The host computer includes a second network communication interface 1010 or 1020 for communication over the network 925 or 937. The second processor 1030 is coupled to the second network communication interface 1010 or 1020. The second memory 1040A is accessible to the second processor 1030. Host computer further includes second wallpaper programming 945 in the second memory 1040A.

Execution of the second wallpaper programming 945 by the second processor 1030 configures the host computer 990, 998 to perform the following functions. First, present, via the image display 1080, the first wallpaper image of the wallpaper video 967 to the user. Second, receive, via the user input device 1091, 981 (e.g., touch screen, a computer mouse, movement tracker) from the user one or both of: (i) the spatial user input selection 978, and (ii) the time user input selection 979 to apply to the wallpaper video 967. Third, in response to receiving one or both of: (i) the spatial user input selection 978, and (ii) the time user input selection 979: determine one or both of: (i) the respective spatial movement parameter 976A-K associated with the spatial user input selection 978, and (ii) the respective time coordinate 966A-H associated with the time user input selection 979. Fifth, present, via the image display 180A-B, 1080, the second wallpaper image associated with one or both of: (i) the respective spatial movement parameter 976A-K, and (ii) the respective time coordinate 966A-H.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 2B-C (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990 that communicates via the wallpaper system 900 of FIG. 9. Mobile device 990 includes a user input device 1091 (e.g., a touch screen display or a movement tracker 981) to receive a spatial user input selection 978 or a time user input selection 979 to apply to an original image 965A-H in real-time, or a wallpaper video 967 that can comprise an archived wallpaper image matrix. Mobile device 990 responsively presents a respective wallpaper image 968A-K, 969A-K, . . . 975A-K based on a respective spatial movement parameter 976A-K associated with the spatial user input selection 978 or a respective time coordinate 966A-H associated with the time user input selection 979.

Mobile device 990 includes a flash memory 1040A which includes wallpaper programming 945 to perform all or a subset of the functions described herein for producing wallpaper effects, in which one or both of: (i) the spatial user input selection 978, and (ii) the time user input selection 979 from a user are applied to interact with wallpaper images 968A-K, 969A-K, . . . 975A-K.

As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990.

Memory 1040A further includes multiple depth images 962A-H (including respective meshes of vertices 963A-H), which are generated, via the depth-capturing camera of the eyewear device 100 or via the depth-capturing camera 1070 of the mobile device 990 itself. A flowchart outlining functions which can be implemented in the wallpaper programming 945 is shown in FIG. 11. Memory 1040A further includes the spatial user input selection 978 and the time user input selection 979 (e.g., such as an initial touch point and a final touch point) received by the user input device 1091. Memory 1040A further includes: a left image disparity map 961A, a right image disparity map 961B, and left processed (e.g., rectified) and right processed (e.g., rectified) images 960A-B (e.g., to remove vignetting towards the end of the lens). As further shown, memory 1040A includes the original video 964 with original images 965A-H and an associated respective time coordinate 966A-H. Memory 1040A further includes wallpaper video 967 with sets of wallpaper images 968A-K, 969A-K, . . . 975A-K and associated respective spatial movement parameters 976A-K. Some or all of the stored information in the memory 1040A can be generated during image processing of the raw images 858A-B to generate the wallpaper images 968A-K, 969A-K, 975A-K.

As shown, the mobile device 990 includes an image display 1080, an image display driver 1090 to control the image display, and a user input device 1091 similar to the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

The activities that are the focus of discussions here typically involve data communications related to receiving one or both of: (i) a spatial user input selection 978, and (ii) a time user input selection 979 from a user to present a high degree of user interaction with an original image 965A-H or an original video 964 selected as wallpaper in the portable eyewear device 100 or the mobile device 990. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interfaced) conform to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for wallpaper effects.

Several of these types of communications through the transceivers 1010, 1020 and a network, as discussed previously, relate to protocols and procedures in support of communications with the eyewear device 100 or the server system 998 for generating original images 965A-H and sets of wallpaper images 968A-K, 969A-K, ... 975A-K, such as transmitting left raw image 858A, right raw image 858B, infrared image 859, depth images 962A-H, and processed (e.g., rectified) images 960A-B. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the wallpaper programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g., as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including wallpaper programming 945, are executed. Applications, such as the wallpaper programming 945, may be a native application, a hybrid application, or a web application (e.g., a dynamic web page executed by a web browser) that runs on mobile device 990 to generate sets of wallpaper images 968A-K, 969A-K, ... 975A-K based on one or both of: (i) the spatial user input selection 978, and (ii) the time user input selection 979. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the wallpaper system 900 and that other arrangements may be utilized. For example, a server system 998, such as that shown in FIG. 9, may generate the sets of wallpaper images 968A-K, 969A-K, ... 975A-K after generation of the raw images 858A-B, via the depth-capturing camera of the eyewear device 100.

FIG. 11 is a flowchart of a method with steps that can be implemented in the wallpaper system 900 to apply to the original video 964 to create and present a wallpaper image 968A-K, 969A-K, ... 975A-K. Beginning in block 1100, the method includes capturing, via a depth-capturing camera, a sequence of original images 965A-H of an original video 964. Each of the original images 965A-H is associated with a respective time coordinate 966A-H on a time (T) axis for a presentation time in the original video 964.

Proceeding now to block 1110, the method further includes presenting, via an image display 180A-B, 1080, an original image 965A-H of the original video 964 to a user. Continuing to block 1120, the method further includes receiving, via a user input device 991, 1091 from the user one or both of: (i) a spatial user input selection 978 to apply to the original video 964, and (ii) a time user input selection 979 to apply to the original video 964.

In a first example, the step of receiving, via the user input device 991, 1091 from the user one or both of: (i) the spatial user input selection 978, and (ii) the time user input selection 979 to apply to the original video 964 includes the following steps. First, receiving on an input surface of a touch sensor at least one finger contact inputted from the user. Second, tracking, via a sensing circuit, the at least one finger contact on the input surface. Third, detecting one or both of: (i) the spatial user input selection 978, and (ii) the time user input selection 979 to apply to the original video 964 on the input surface of the touch sensor based on the at least one finger contact from the user. For example, the time user input selection 979 is detected by receiving a vertical scrolling (swiping) type of finger gesture on the touch sensor.

In a second example, the step of receiving, via the user input device 991, 1091 from the user one or both of: (i) the spatial user input selection 978, and (ii) the time user input selection 979 to apply to the original video 964 includes first, tracking, via a movement tracker 981, movement of a mobile device 990. Movement tracking is achieved by: (i) measuring, via at least one accelerometer of the movement tracker 981, the acceleration of the mobile device 990, (ii) measuring, via at least one gyroscope of the movement tracker 981, the rotation of the mobile device 990, or (iii) measuring, via an inertial measurement unit of the movement tracker 981, both the acceleration and the rotation of the mobile device 990. Second, detecting one or both of: (i) the spatial user input selection 978, and (ii) the time user input selection 979 to apply to the original video 964 by detecting at least one variation of the tracked movement over a time period. For example, the spatial user input selection 978 is detected by sensing horizontal tilting of the mobile device 990 via the movement tracker 981 that includes an inertial measurement unit.

In response to receiving one or both of: (i) the spatial user input selection 978, and (ii) the time user input selection 979, blocks 1130 and 1140 are executed. Moving to block 1130, the method further includes applying one or both of: (i) a respective spatial movement parameter 976A-K associated with the spatial user input selection 978, and (ii) the respective time coordinate 966A-H associated with the time user input selection 979 to the original video 964. Finishing now in block 1140, the method further includes presenting, via the image display 180A-B, 1080, a wallpaper image associated with one or both of: (i) the respective spatial movement parameter 976A-K, and (ii) the respective time coordinate 966A-H.

In the 2D image processing example, the wallpaper image is generated from the original image 965A-H by the following steps. First, calculating: (i) a left image disparity map 961A between a left pixel matrix of pixels and a right pixel matrix of pixels, and (ii) a right image disparity map 961B between the right pixel matrix and the left pixel matrix. Second, determining the respective spatial movement parameter 976A-K of the left pixel matrix and the right pixel matrix along at least one of: (i) an X axis for horizontal position movement, and (ii) a Y axis for vertical position movement. Third, filling up a left interpolated pixel matrix by moving pixels in the left pixel matrix along at least one of: (i) the X axis, and (ii) the Y axis based on the respective spatial movement parameter 976A-K. Fourth, filling up a right interpolated pixel matrix by moving pixels in the right pixel matrix along at least one of: (i) the X axis, and (ii) the Y axis based on the respective spatial movement parameter 976A-K. Fifth, blending together the left interpolated pixel matrix and the right interpolated pixel matrix to create the wallpaper image.

For example, once two disparity maps are created (one left image disparity map 961A and one right image disparity map 961B), the spatial movement parameter 976A-K moves between 0 and 1 to set or skew the spatial movement or rotation of the generated wallpaper image. Suppose the spatial movement parameter 976A-K skews horizontally and when set to 0.0 (e.g., 976A) skews to the left image completely and horizontal movement parameter 966 set to 1.0 (e.g., 976K) skews to the right image completely. If the spatial movement parameter 976A is set to 0.0, then the weight is set to output the left image. For example, wallpaper images 968A, 969A, and 975A are generated for original images 965A, 965B, and 965H, respectively. If the spatial movement parameter 976K is set to 1.0, then the weight is set to output the right image as the wallpaper image 968K. For example, wallpaper images 968K, 969K, and 975K are generated for original images 965A, 965B, and 965H, respectively. When spatial movement parameter 976B-J is not equal to 0.0 or 1.0 (at intermediate values), the spatial movement or rotation is somewhat in between the left and right images. Setting the spatial movement parameter 976B-J to 0.1-0.9, fills up empty interpolated pixel matrices 967A-B with RGB values to derive intermediate wallpaper images 968B-J, 969B-J, . . . 975B-J, respectively from the original images 965A-H. For example, setting the spatial movement parameter 976F to 0.5, the pixels in the left image are moved halfway to the corresponding pixel in the right image according to the respective disparity value from the left image disparity map 961A. For example, the respective disparity value from the left image disparity map 961A is multiplied by 0.5 and added to the X axis location coordinate to derive the left moved X axis location coordinate 968A. The right interpolated pixel matrix is filled up in the same manner by moving the pixels in the right image halfway to the corresponding pixel in the left image according to the respective disparity value from the right image disparity map 961B. For example, the respective disparity value from the right image disparity map 961B is multiplied by 0.5 and added to the X axis location coordinate to derive the right moved X axis location coordinate. So, for each pixel, the color value stays the same, but the X axis location coordinate is moved on the X axis by half of the disparity value. If a pixel has no value (occluded), but neighbor pixels have values, a pixel value is calculated for the occluded pixel based on the weighted neighbor pixels together with a disparity confidence level. In this example, setting the spatial movement parameter 976F to 0.5, creates a field of view mimicking each of the original images 965A-H.

In another example, assume the spatial movement parameter 976B is set to 0.1 To fill up the left interpolated pixel matrix the following calculation is used: for each left pixel in the left image, the respective disparity value from the left image disparity map 961A is multiplied by 0.1 to derive the respective left moved X axis location coordinate. To fill up the right interpolated pixel matrix the following calculation is used: for each right pixel in the right image, the respective disparity value from the right image disparity map 961B is multiplied by 0.9 derive the respective right moved X axis location coordinate. This creates a novel view in between the left and right images.

The step of generating the wallpaper image 968A-K, 969A-K, . . . 975A-K is achieved by blending together the left interpolated pixel matrix and the right interpolated pixel matrix. This blending is based on disparity confidence levels (e.g., by weighing contributions of each side), gradients, or combination thereof in the left image disparity map 961A and the right image disparity map 961B. The disparity confidence level value is based, for instance, on the magnitude of correlation between the left and the right pixels. Although one might expect to obtain the same image, the wallpaper image is not the same due to reflection, illumination, etc. being different from the varying perspectives in the left image and the right image (hence, the term light field effects). This creates the wallpaper images 968A-K with the novel fields of view.

In the 3D image processing example, the wallpaper image 968A-K, 969A-K, . . . 975A-K is generated by the following steps. First, creating, via the depth-capturing camera, a respective depth image 962A-H corresponding to the original image 965A-H. The respective depth image 962A-H is formed of a respective mesh of vertices 963A-H. Each vertex representing a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for depth (distance). Each vertex further includes one or more of a color attribute, a texture attribute, or a reflectance attribute. Second, generating, the presented wallpaper image 968A-K, 969A-K, 975A-K from the original image by rotating the respective depth image 962A-H based on the respective spatial movement parameter 976A-K. The respective spatial movement parameter 976A-K is along at least one of: (i) the X axis for horizontal position movement, (ii) the Y axis for vertical position movement, and (iii) the Z axis for depth (distance) movement.

FIGS. 12-22 demonstrate user interaction with an original video 964 of a man wearing white shorts and a t-shirt. In the original video 964, the man holds and swings around a swimming noodle through space and time at different time coordinates 966A-H like a ninja, which is captured as eight original images 965A-H. The wallpaper video 967 is generated and presented based on the original video 964 and includes eight respective sets of wallpaper images 968A-K, 969A-K, 975A-K (with eleven different viewpoints) that responsively pan through space around the eight original images 965A-H based on the various spatial user input selections 978A-C of FIGS. 13-15 and forward and rewind in time based on the various time user input selections 979A-F of FIGS. 17-22.

Figure 12:
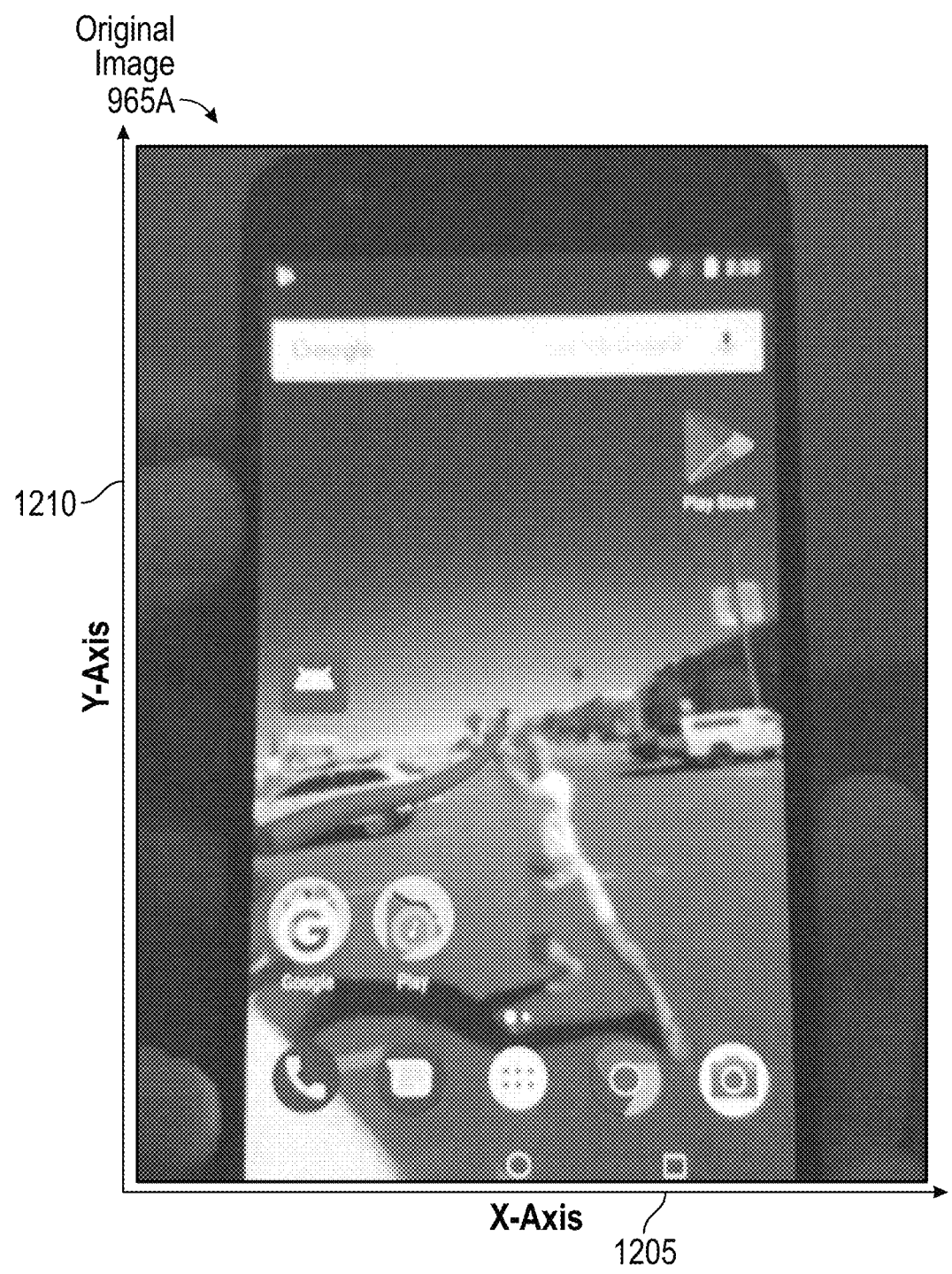
FIG. 12 illustrates an example of a first original image associated with a first time coordinate of an original video, which is a processed (e.g., rectified) image captured by one or both of the visible light cameras.

During initialization, the original video 964 is set as wallpaper on a mobile device 990. FIG. 12 illustrates an example of a first original image 965A associated with a first time coordinate 966A of the original video 964. First original image 965A is a processed (e.g., rectified) image captured by one or both of the visible light cameras 114A-B.

Figure 13:
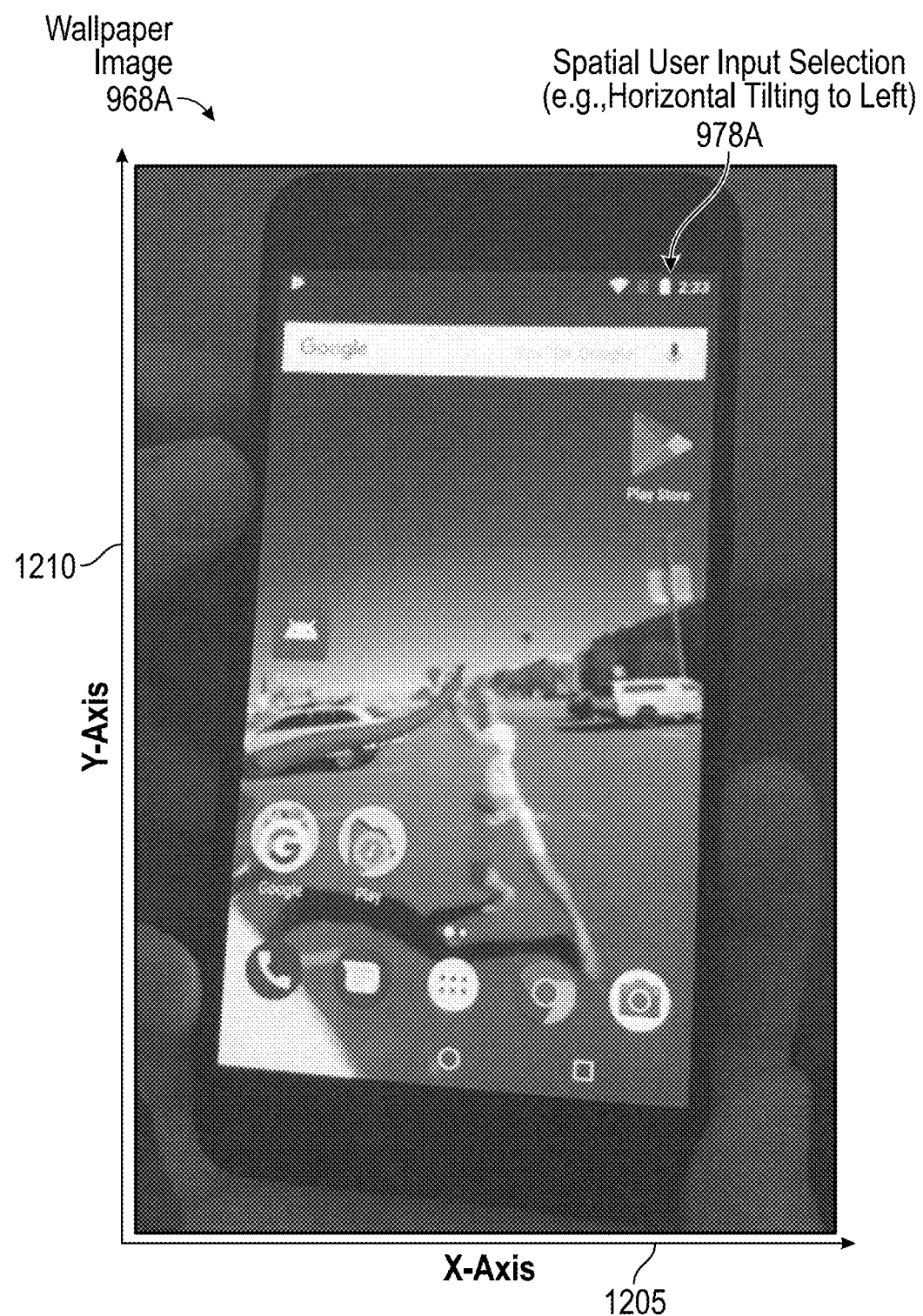
FIG. 13 illustrates receiving, via a movement tracker type of user input device, a first spatial user input selection (e.g., horizontal tilting to the left) to manipulate a spatial movement parameter (e.g., field of view) and responsively presenting a first wallpaper image.
Figure 14:
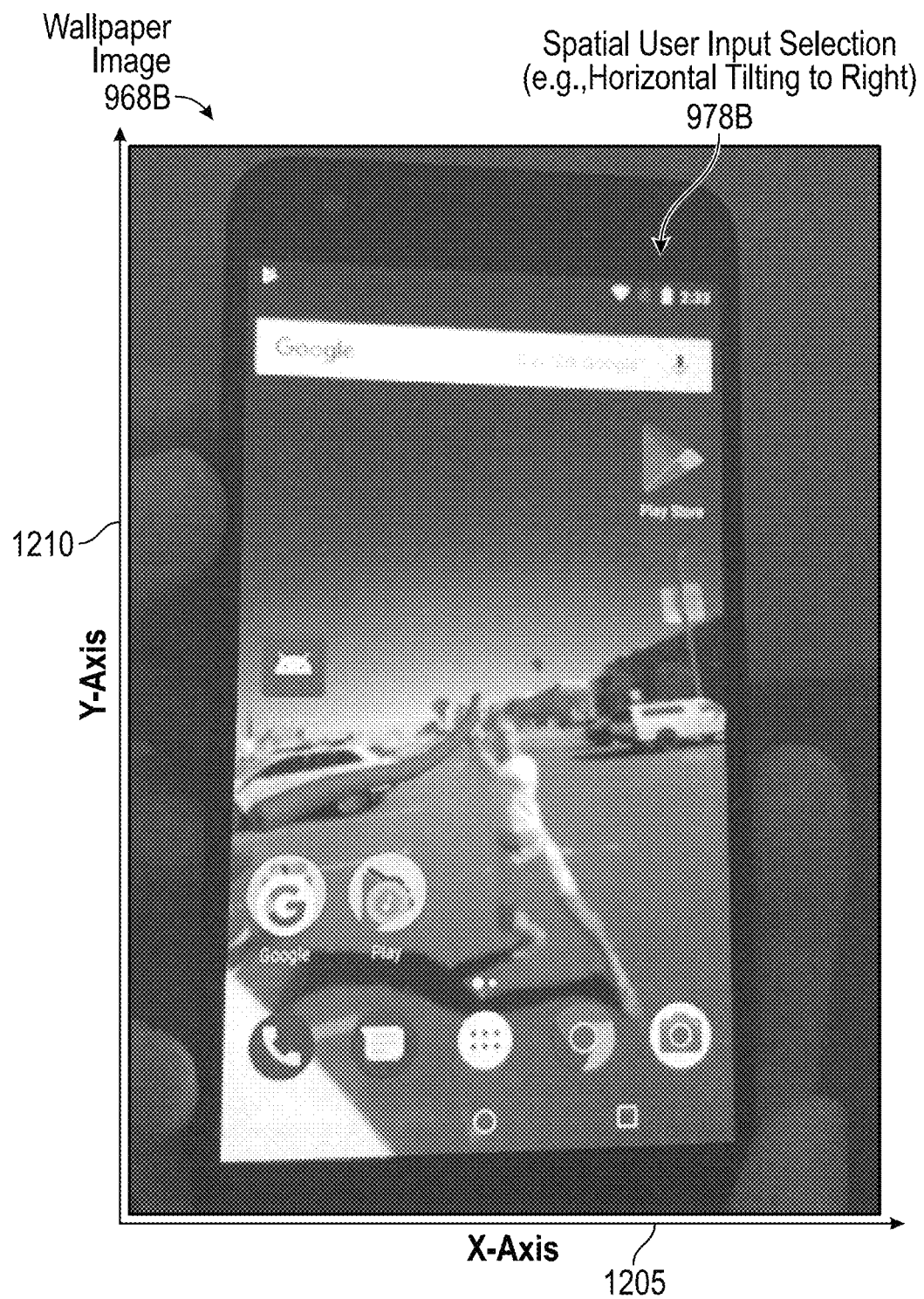
FIG. 14 illustrates receiving, via the movement tracker, a second spatial user input selection (e.g., horizontal tilting to the right) and responsively presenting a second wallpaper image.
Figure 15:
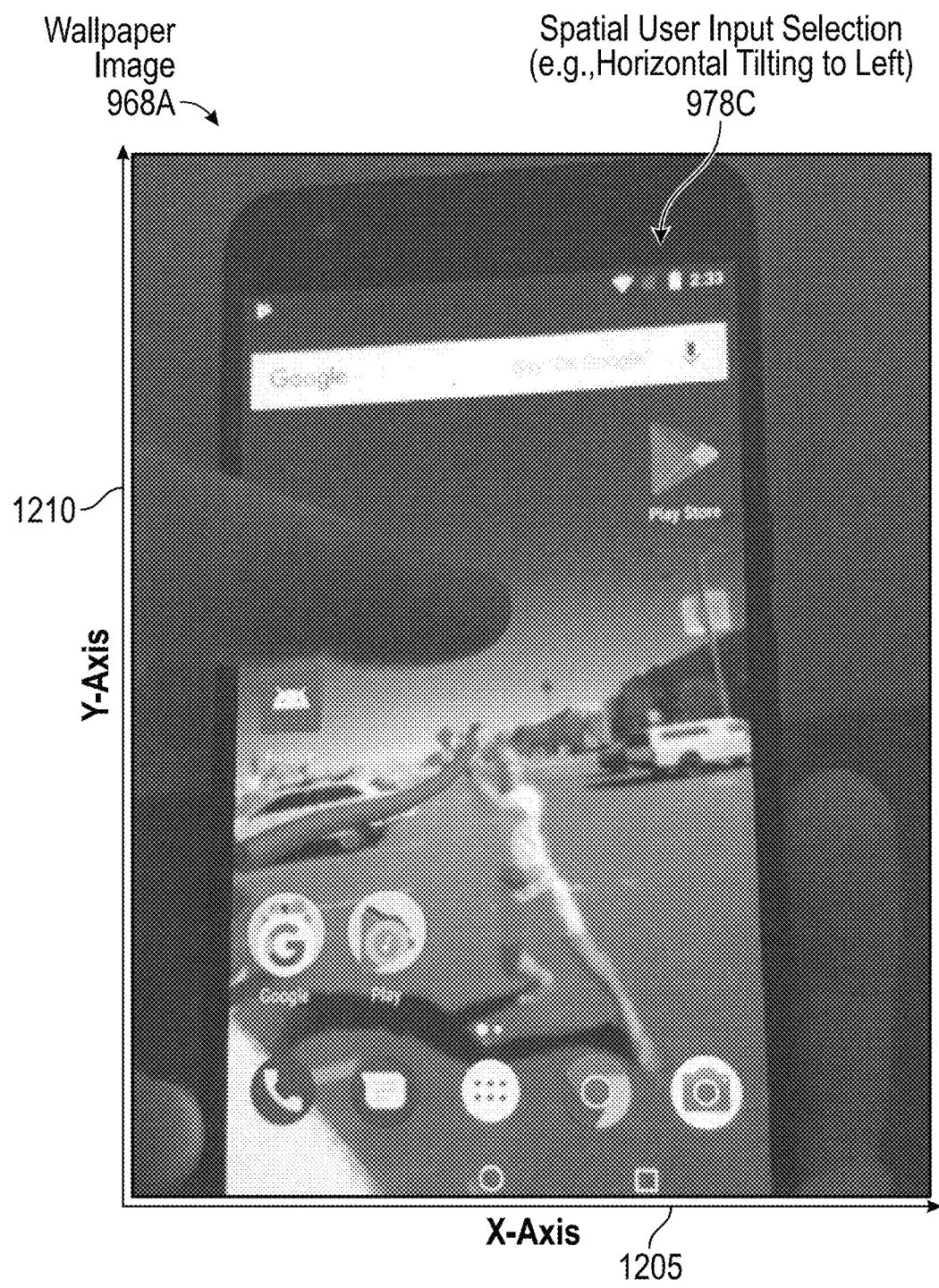
FIG. 15 illustrates receiving, via the movement tracker, a third spatial user input selection (e.g., horizontal tilting to the left) and again responsively the first wallpaper image.
Figure 16:
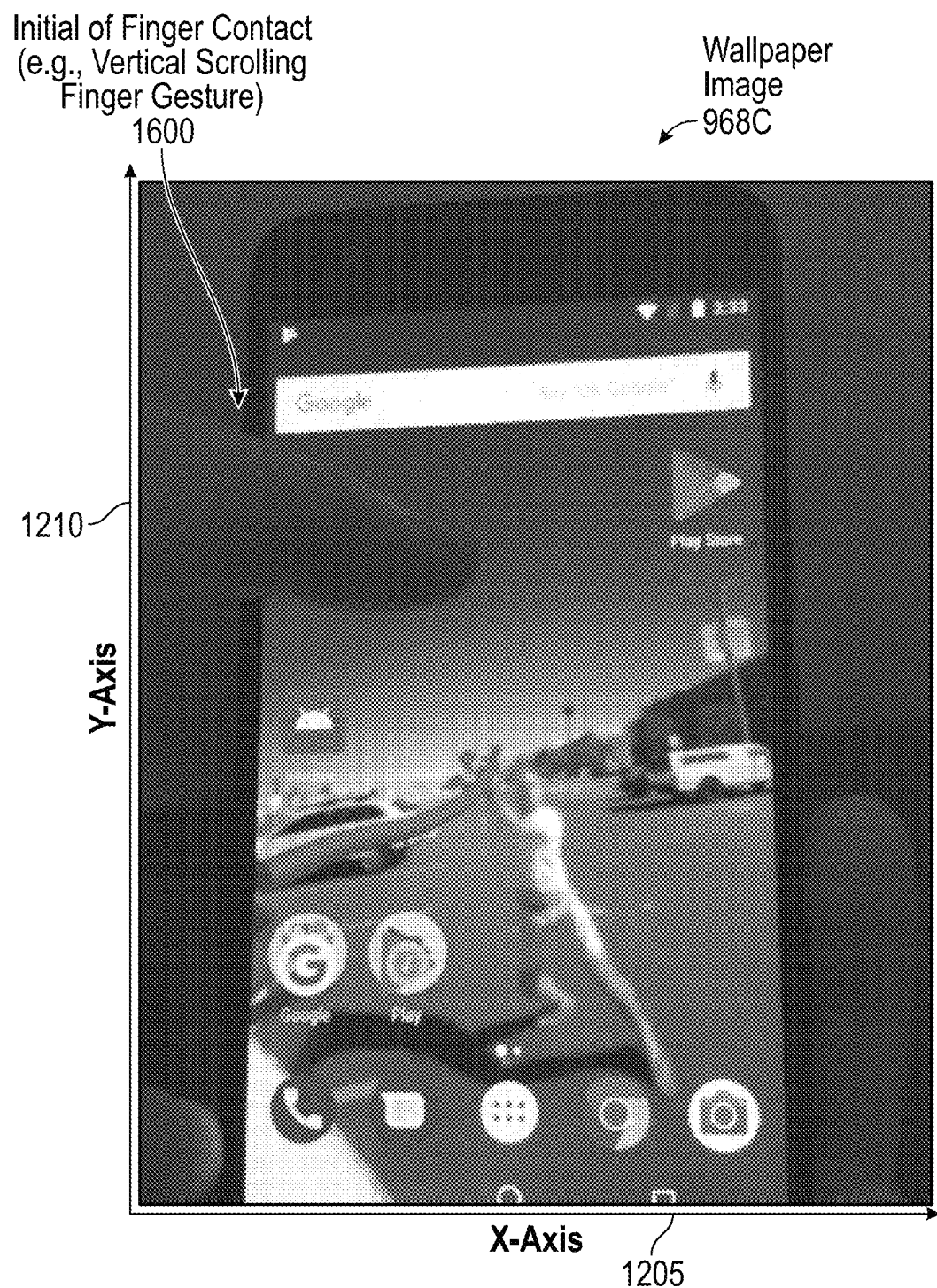
FIG. 16 again illustrates the first wallpaper image of FIG. 15 and depicts initiating of finger contact, via a touch sensor type of user input device, to manipulate a time coordinate (e.g., temporal coordinate).

In FIGS. 13-15, three spatial user input selections 978A-C are respectively received via a movement tracker 981 (e.g., IMU) type of user input device 1091 as horizontal left and right tilting for movement of the video along the x-axis 1205. FIG. 13 illustrates receiving, via a movement tracker 981, a first spatial user input selection 978A (e.g., horizontal tilting to the left) to manipulate the first original image 965A by a first spatial movement parameter 976A that is associated with the leftmost field of view (e.g., 0.0). As shown, the image display 1080 of the mobile device 990 responsively presents a first wallpaper image 968A associated with the first spatial movement parameter 976A. The first wallpaper image 968A is extracted from the first set of wallpaper images 968A-K that is generated for the first original image 965A.

FIG. 14 illustrates receiving, via the movement tracker 981, a second spatial user input selection 978B (e.g., horizontal tilting to the right) to manipulate the first original image 965A by a second spatial movement parameter 976B that is associated with a left intermediate field of view (e.g., 0.2). As shown, the image display 1080 of the mobile device 990 responsively presents a second wallpaper image 968B associated with the second spatial movement parameter 976B. The second wallpaper image 968B is extracted from the first set of wallpaper images 968A-K that is generated for the first original image 965A.

FIG. 15 illustrates receiving, via the movement tracker 981, a third spatial user input selection 978C (e.g., horizontal tilting to the left) to again manipulate the first original image 965A by the first spatial movement parameter 976A that is associated with the leftmost field of view (e.g., 0.0) as previously depicted in FIG. 13. As shown, the image display 1080 of the mobile device 990 again responsively presents the first wallpaper image 968A associated with the first spatial movement parameter 976A.

In FIGS. 16-22, six time user input selections 979A-F are respectively received via a touch screen sensor type of user input device 1091 as upwards and downwards vertical scrolling for movement of the video along the y-axis 1210. FIG. 16 again illustrates the first wallpaper image 968A of FIG. 15 and depicts initiating of finger contact 1600, via a touch sensor type of user input device 1091, to manipulate a time coordinate 966A-H (e.g., temporal coordinate). This is accomplished by receiving a time user input selection (e.g., 979A-H).

Figure 17:
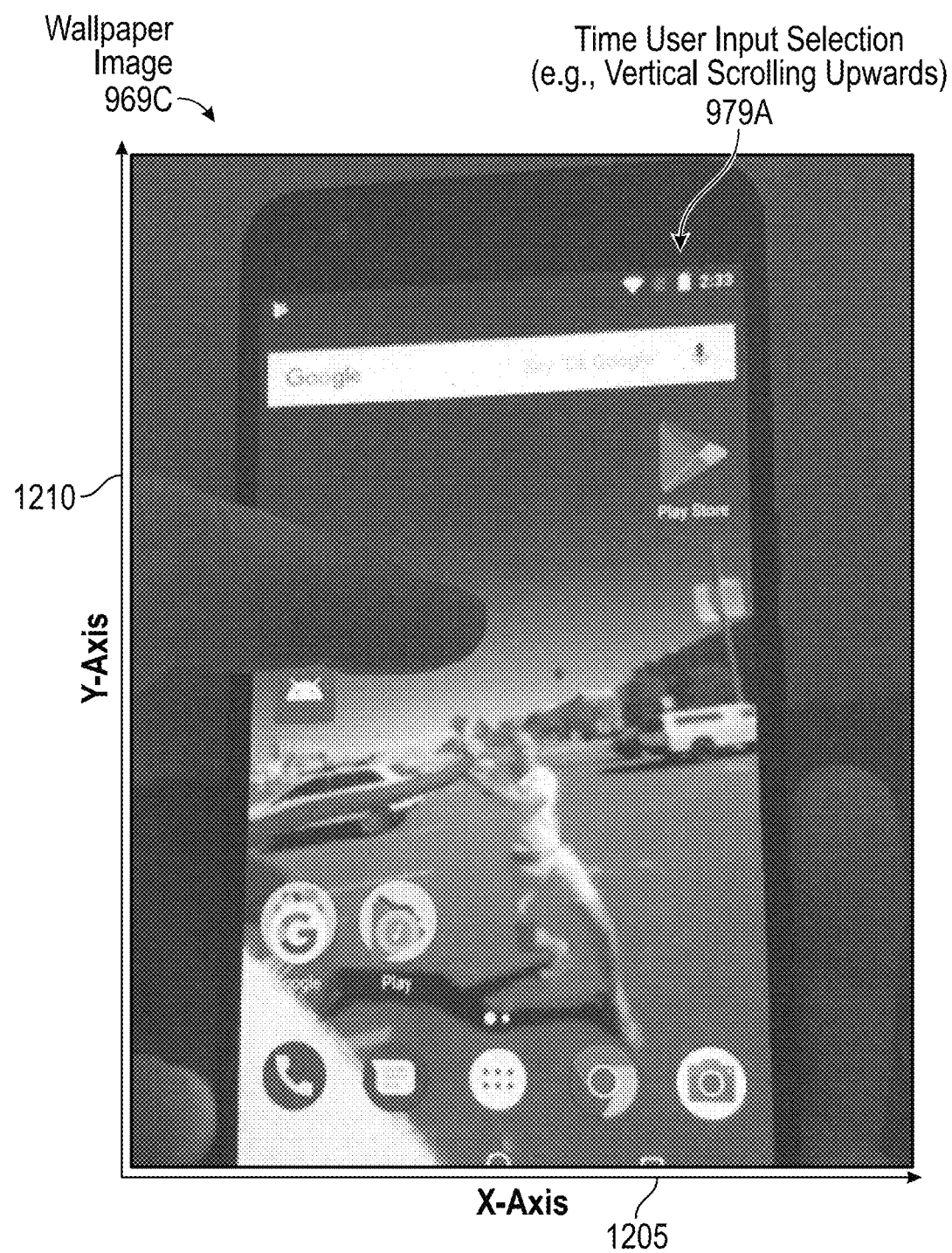
FIG. 17 illustrates receiving, via the touch sensor, a first time user input selection (e.g., vertical scrolling upwards) and responsively presenting the first wallpaper image associated with a second time coordinate.

FIG. 17 illustrates receiving, via the touch sensor type of user input device 1091, a first time user input selection 979A (e.g., vertical scrolling upwards). As shown, the image display 1080 of the mobile device 990 responsively presents a first wallpaper image 969C associated with a second time coordinate 966B. The first wallpaper image 969C is extracted from the second set of wallpaper images 969A-K that is generated for the second original image 965B.

Figure 18:
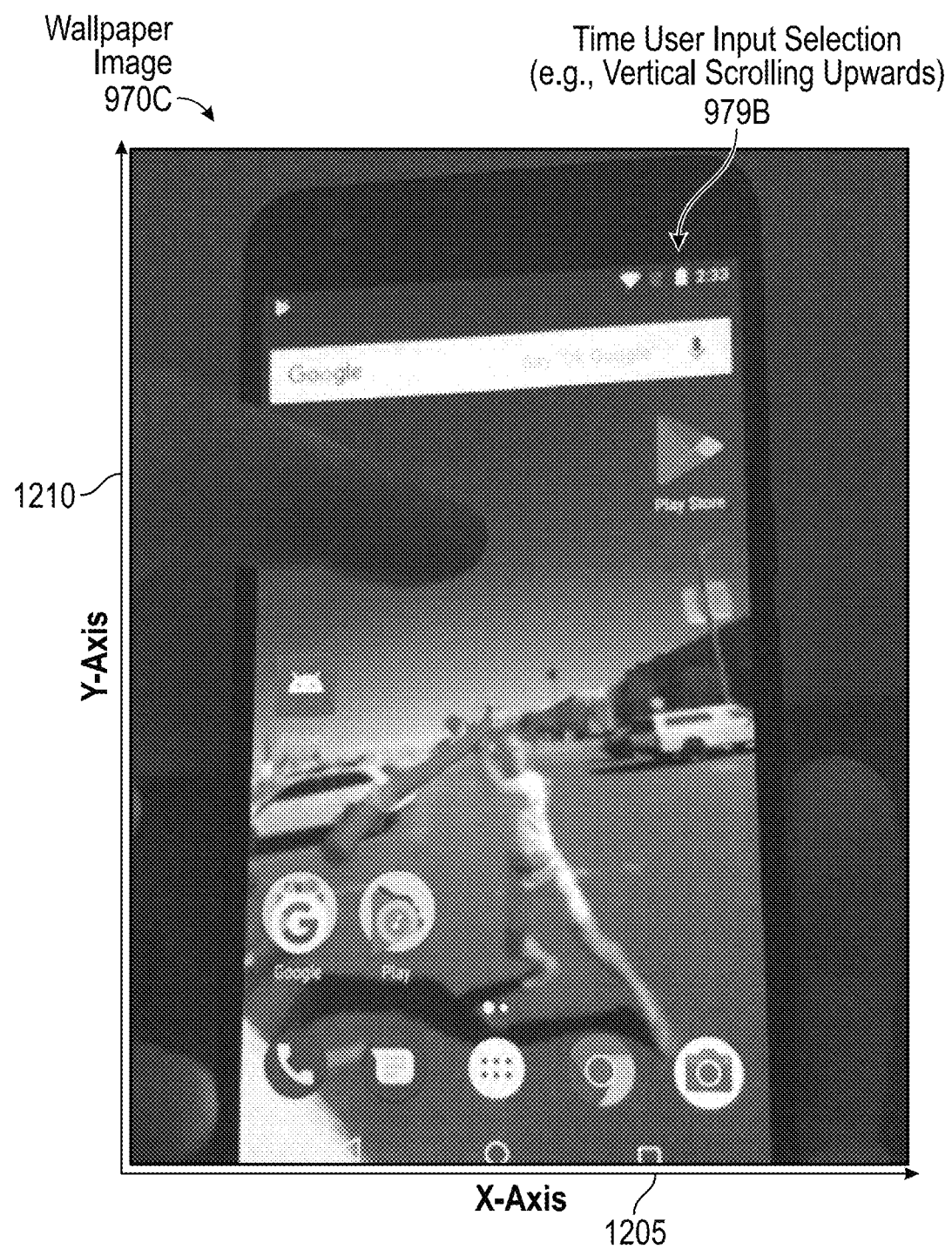
FIG. 18 illustrates receiving, via the touch sensor, a second time user input selection (e.g., vertical scrolling upwards) and responsively presenting the first wallpaper image associated with a third time coordinate.

FIG. 18 illustrates receiving, via the touch sensor type of user input device 1091, a second time user input selection 979B (e.g., vertical scrolling upwards). As shown, the image display 1080 of the mobile device 990 responsively presents a first wallpaper image 970C associated with a third time coordinate 966C. The first wallpaper image 970C is extracted from the third set of wallpaper images 970A-K that is generated for the third original image 965C.

Figure 19:
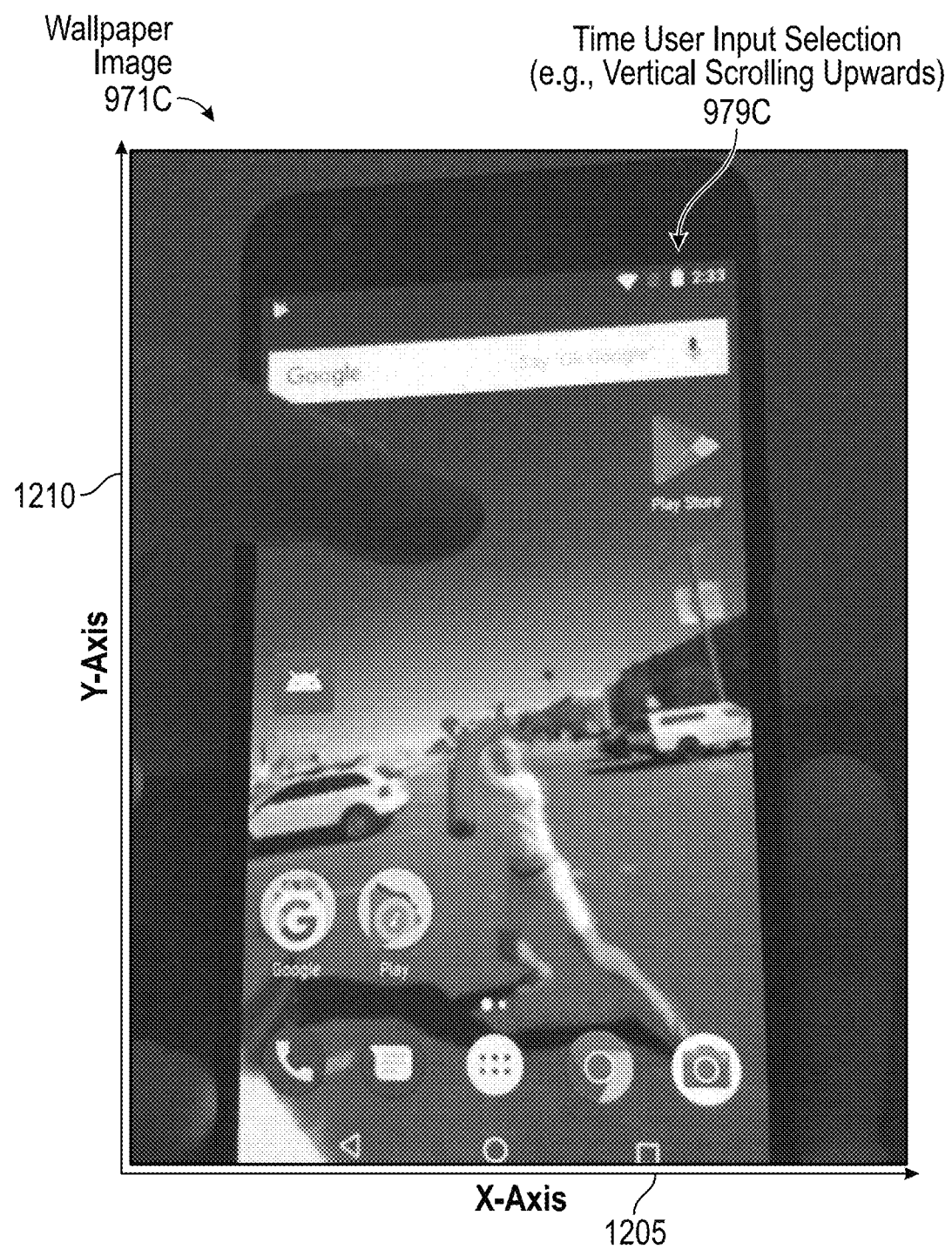
FIG. 19 illustrates receiving, via the touch sensor, a third time user input selection (e.g., vertical scrolling upwards) and responsively presenting the first wallpaper image associated with a fourth time coordinate.

FIG. 19 illustrates receiving, via the touch sensor type of user input device 1091, a third time user input selection 979C (e.g., vertical scrolling upwards). As shown, the image display 1080 of the mobile device 990 responsively presents a first wallpaper image 971C associated with a fourth time coordinate 966D. The first wallpaper image 971C is extracted from the fourth set of wallpaper images 971A-K that is generated for the fourth original image 965D.

Figure 20:
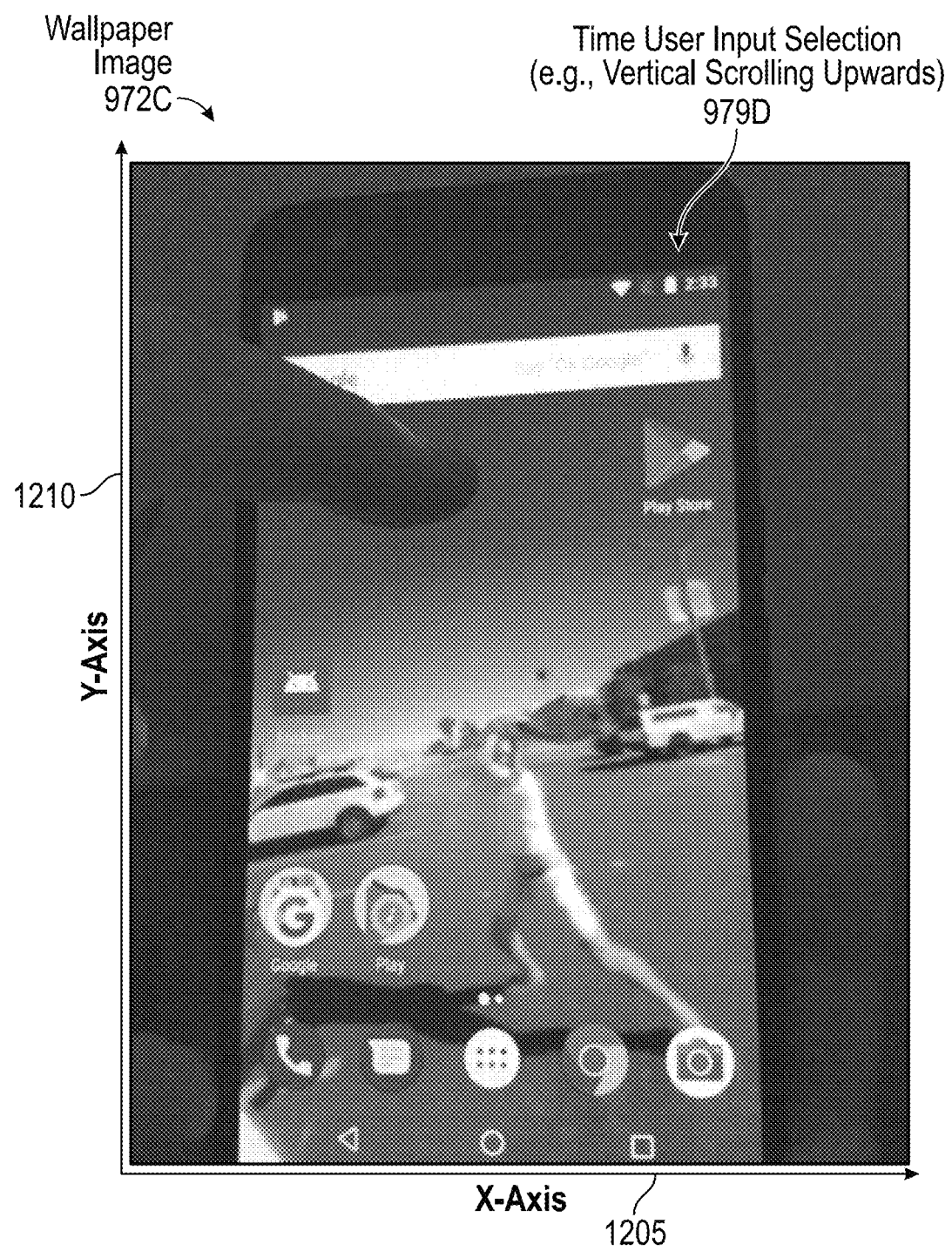
FIG. 20 illustrates receiving, via the touch sensor, a fourth time user input selection (e.g., vertical scrolling upwards) and responsively presenting the first wallpaper image associated with a fifth time coordinate.

FIG. 20 illustrates receiving, via the touch sensor type of user input device 1091, a fourth time user input selection 979D (e.g., vertical scrolling upwards). As shown, the image display 1080 of the mobile device 990 responsively presents a first wallpaper image 972C associated with a fifth time coordinate 966E. The first wallpaper image 972C is extracted from the fifth set of wallpaper images 972A-K that is generated for the fifth original image 965E.

Figure 21:
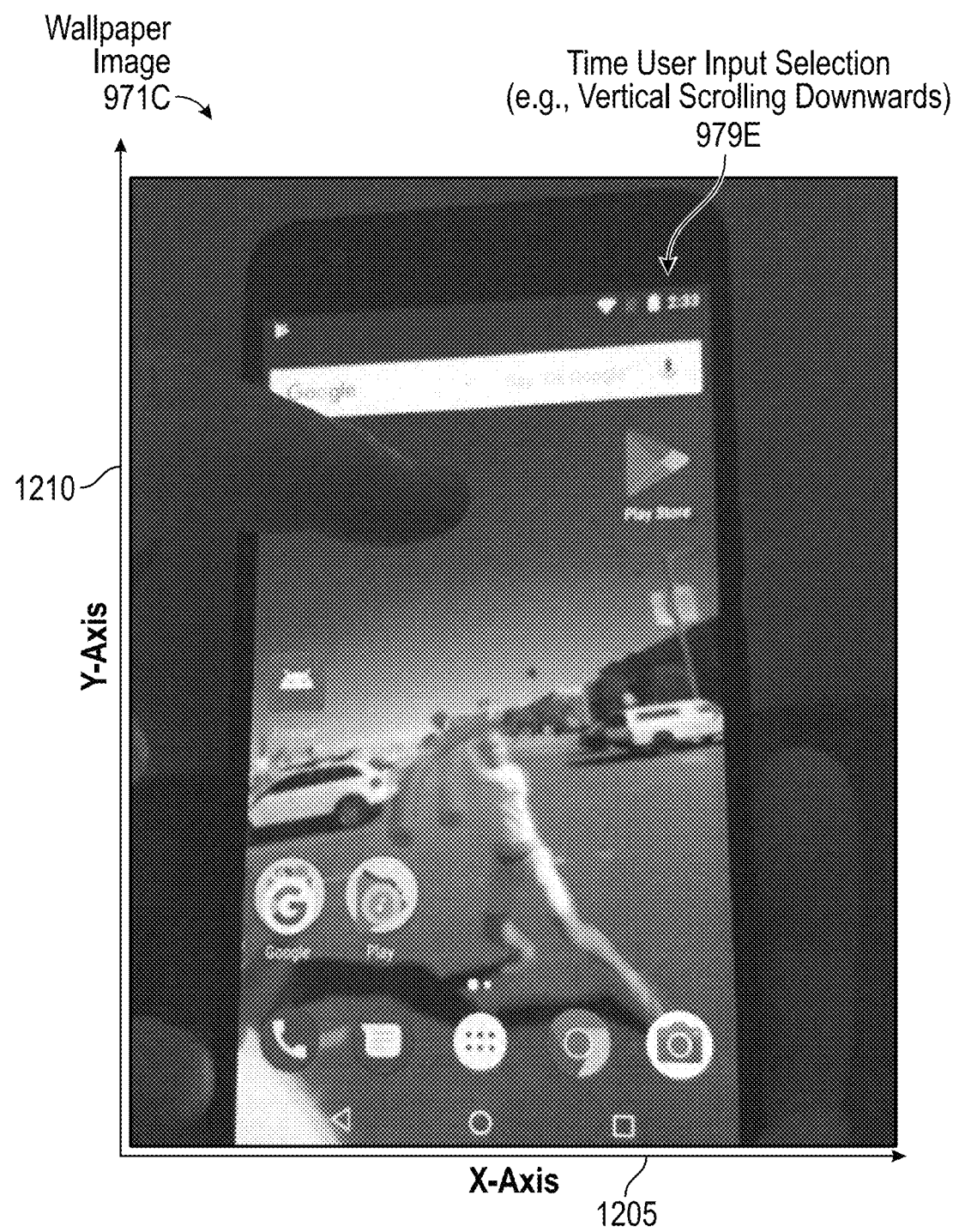
FIG. 21 illustrates receiving, via the touch sensor, a fifth time user input selection (e.g., vertical scrolling downwards) and again responsively presenting the first wallpaper image associated with the fourth time coordinate of FIG. 19.

FIG. 21 illustrates receiving, via the touch sensor type of user input device 1091, a fifth time user input selection 979E (e.g., vertical scrolling downwards). As shown, the image display 1080 of the mobile device 990 again responsively presents the first wallpaper image 971C associated with the fourth time coordinate 966D of FIG. 19. The first wallpaper image 971C is extracted from the fourth set of wallpaper images 971A-K that is generated for the fourth original image 965D.

Figure 22:
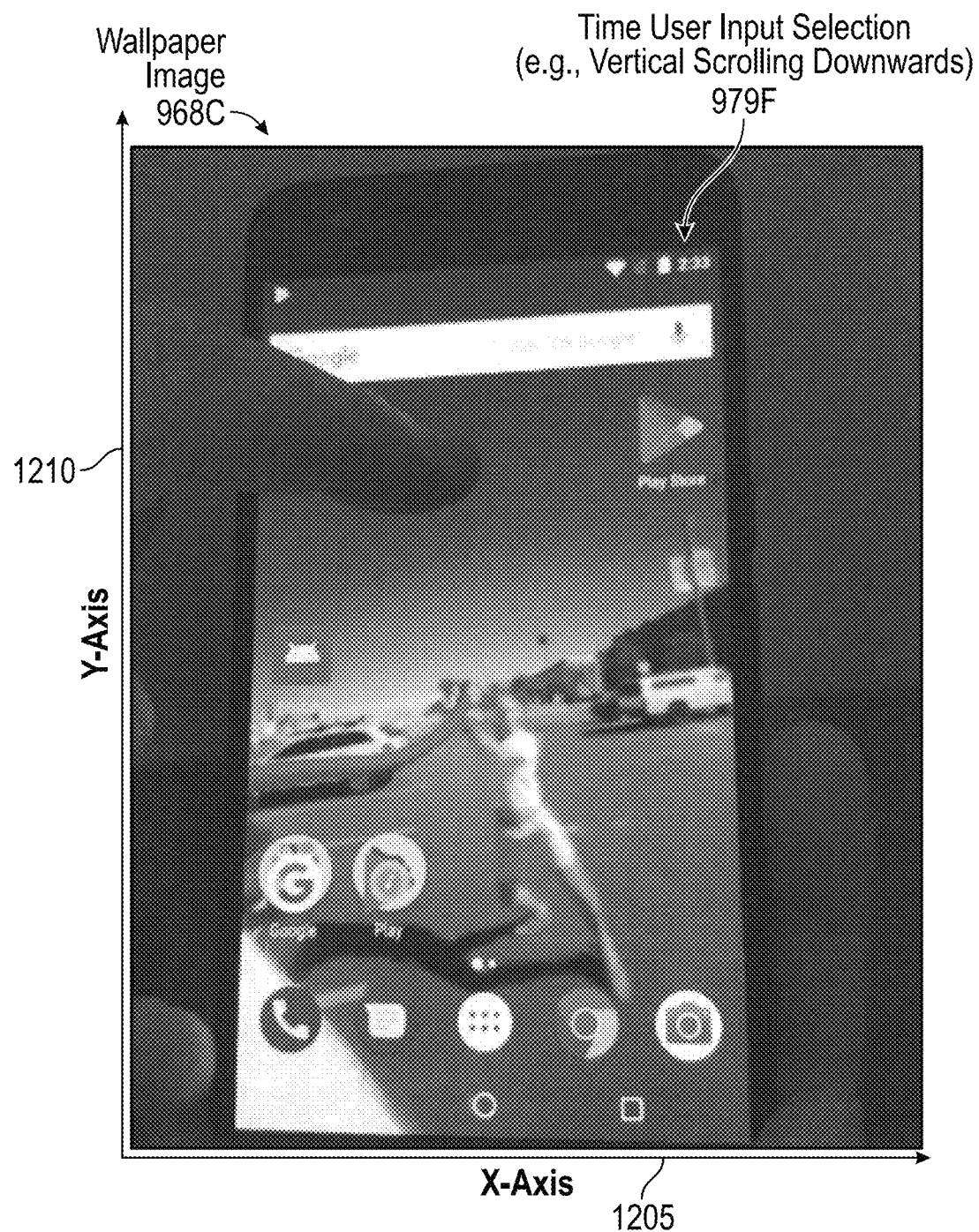
FIG. 22 illustrates receiving, via the touch sensor, a sixth time user input selection (e.g., vertical scrolling downwards) and again responsively presenting the first wallpaper image associated with the first time coordinate of FIGS. 15-16.

FIG. 22 illustrates receiving, via the touch sensor type of user input device 1091, a sixth time user input selection 979F (e.g., vertical scrolling downwards). As shown, the image display 1080 of the mobile device 990 again responsively presents the first wallpaper image 968C associated with the first time coordinate 966A of FIGS. 15-16. The first wallpaper image 968C is extracted from the first set of wallpaper images 968A-K that is generated for the first original image 965A.

Figure 23:
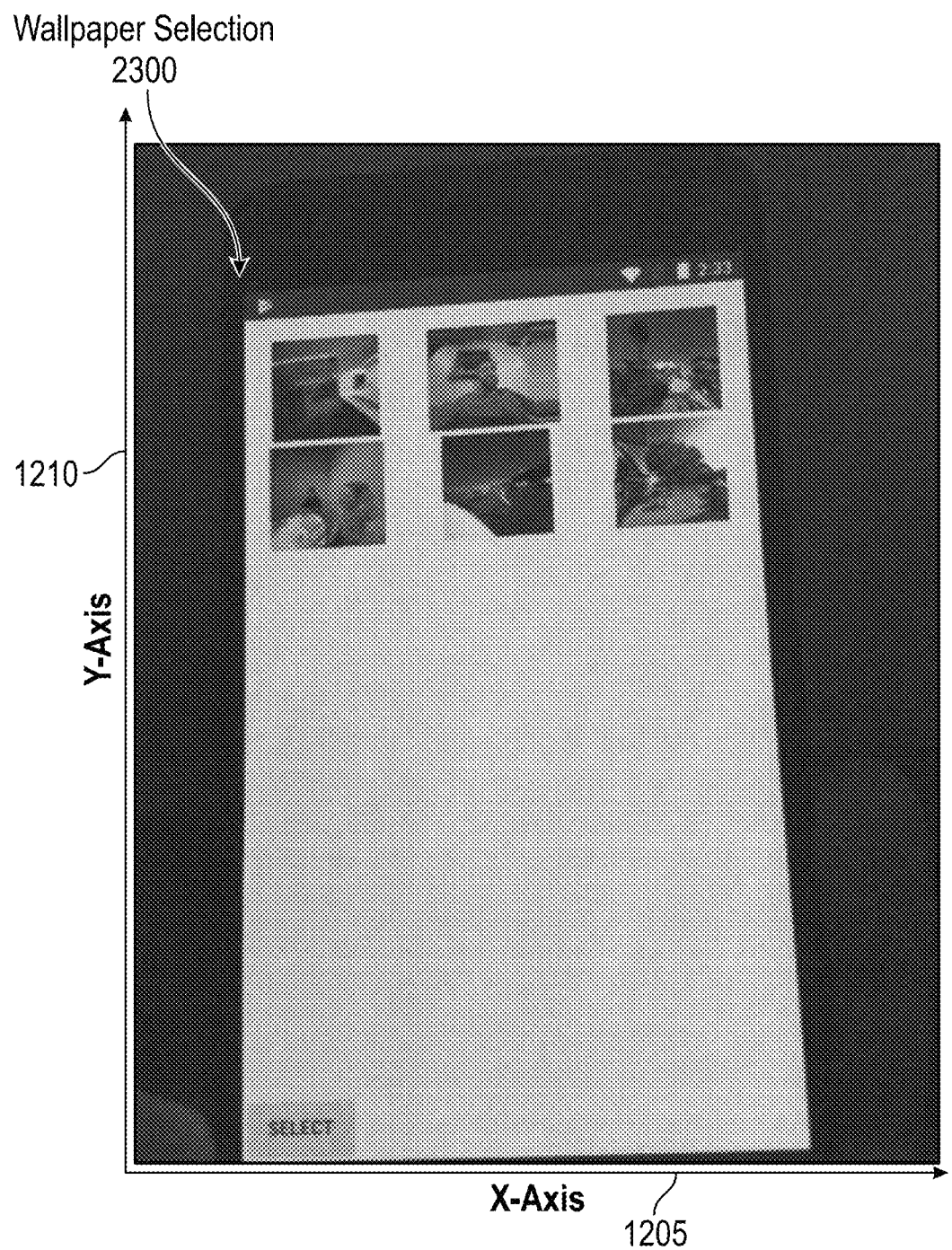
FIG. 23 illustrates wallpaper selection on the mobile device, including various types of original videos and original images that are selectable as wallpaper.
Figure 24:
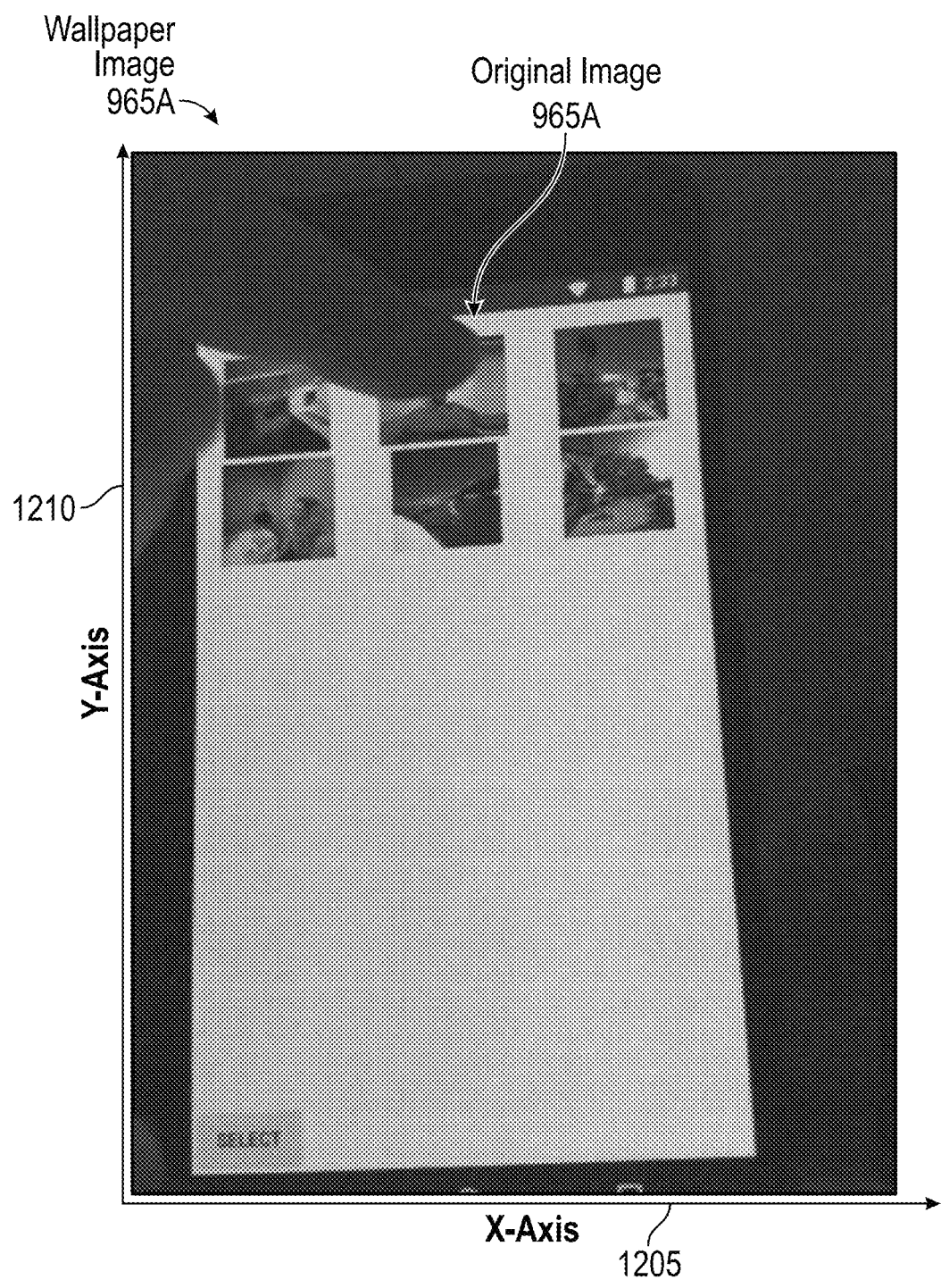
FIG. 24 illustrates selection of an original image as wallpaper on the mobile device.
Figure 25:
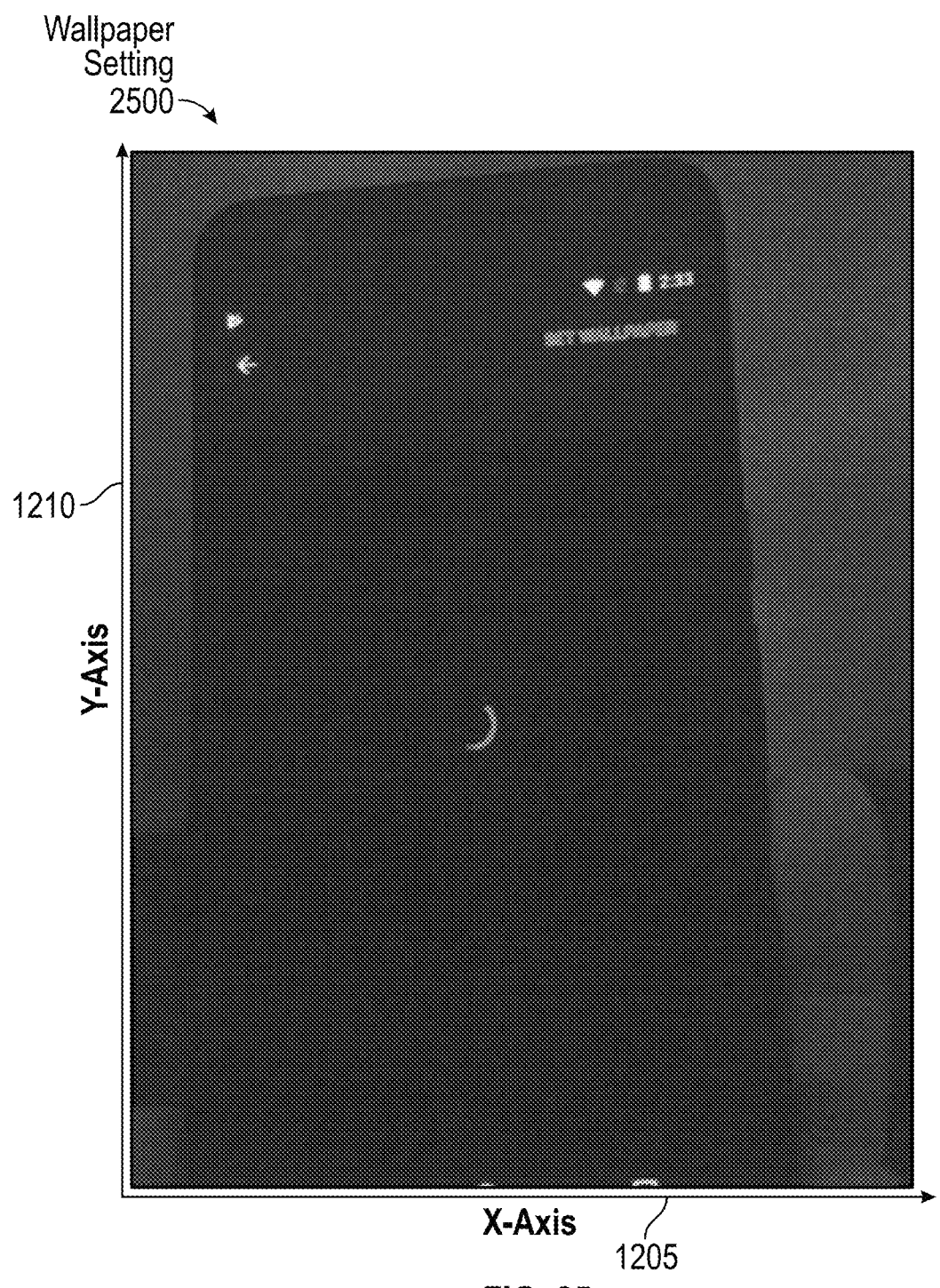
FIG. 25 illustrates setting of the original image of FIG. 24 as wallpaper on the mobile device.

FIGS. 23-25 depict the wallpaper selection and setting process by a user on a mobile device 990, in which a single original image 965A of a man with a beard wearing a red button-up shirt is smiling at a camera is set as wallpaper. FIG. 23 illustrates wallpaper selection 2300 on the mobile device 990, including various types of original videos and original images that are selectable as wallpaper. FIG. 24 illustrates selection of the original image 965A as wallpaper on the mobile device 990. FIG. 25 illustrates wallpaper setting 2500 and loading of the original image 965A of FIG. 24 as wallpaper on the mobile device 990.

Figure 26:
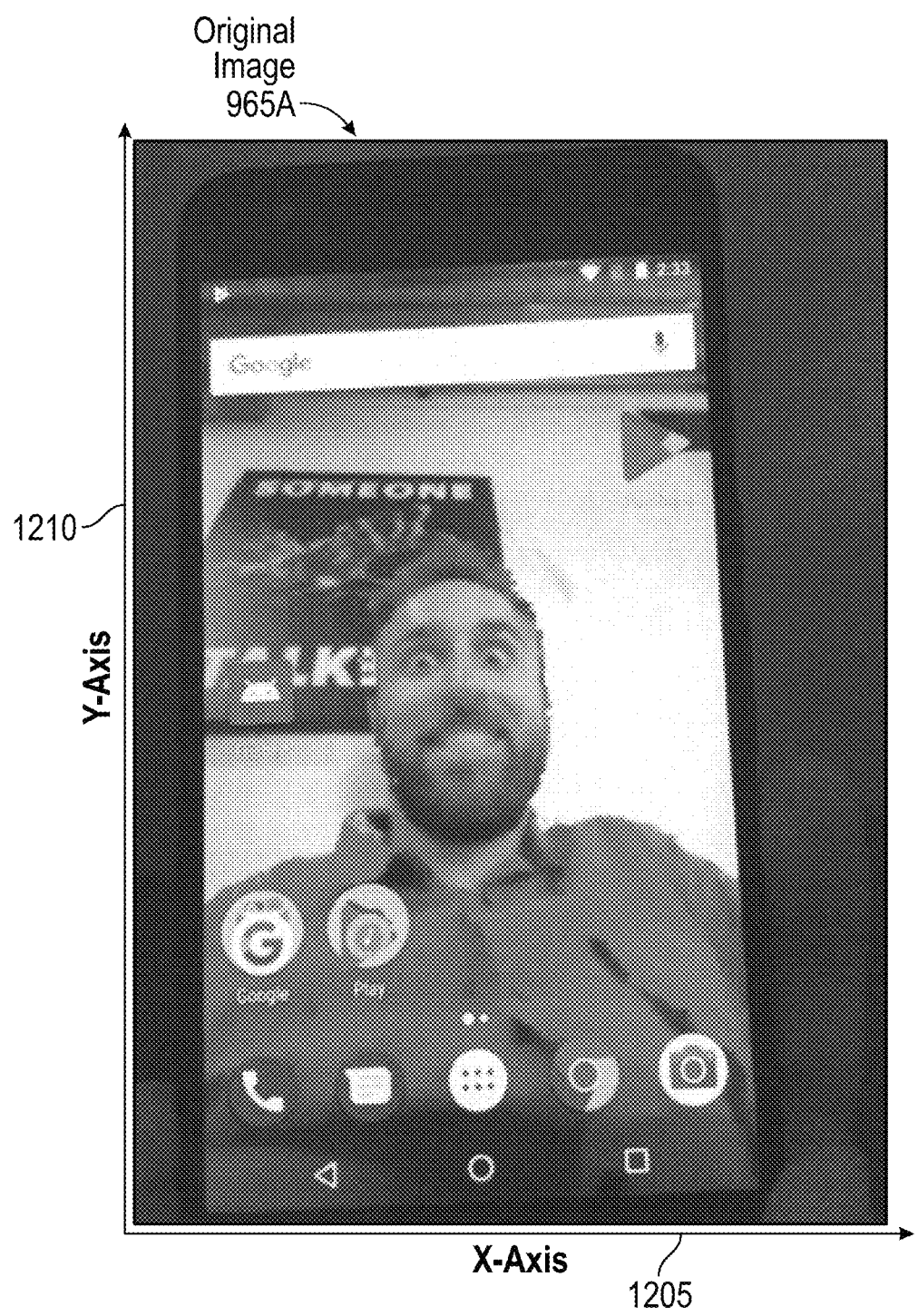
FIG. 26 illustrates the original image of FIG. 25, which is a processed (e.g., rectified) image captured by one or both of the visible light cameras.
Figure 27:
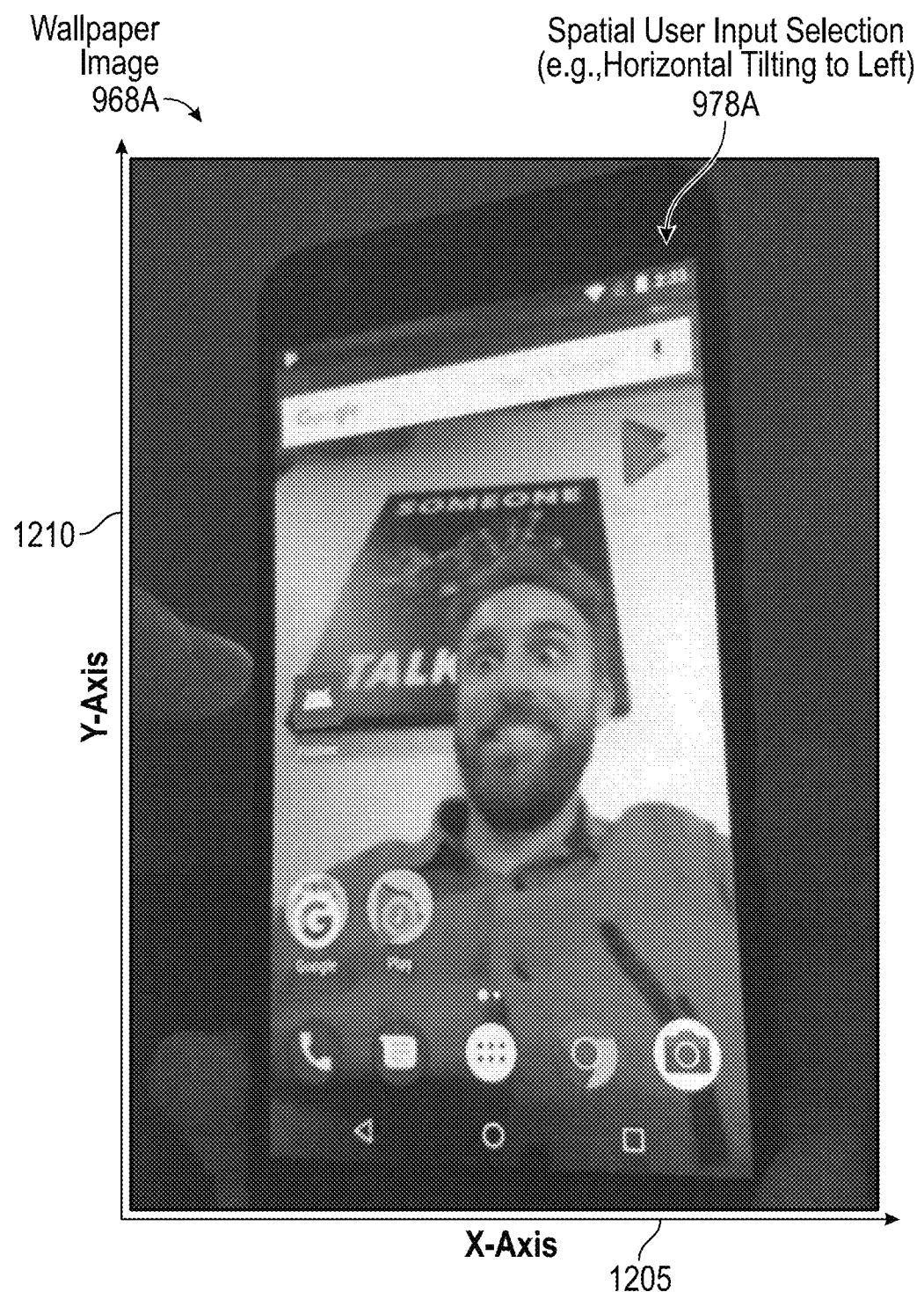
FIG. 27 illustrates receiving, via the movement tracker, a first spatial user input selection (e.g., horizontal tilting to the left) to manipulate a spatial movement parameter and responsively presenting a first wallpaper image associated with a first spatial movement parameter.
Figure 28:
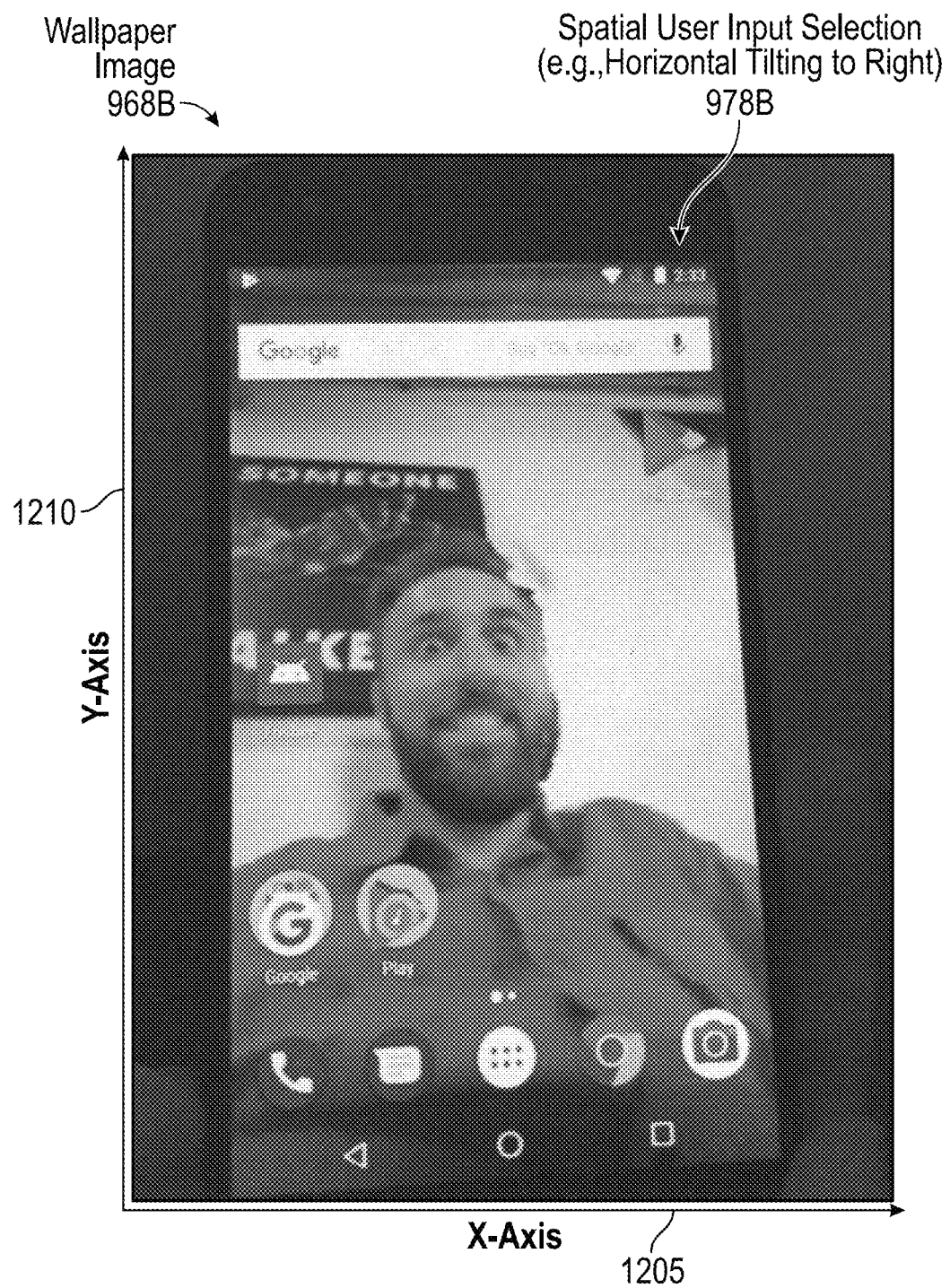
FIG. 28 illustrates receiving, via the movement tracker, a second spatial user input selection (e.g., horizontal tilting to the right) and responsively presenting a second wallpaper image associated with a second spatial movement parameter.

FIGS. 26-28 demonstrate user interaction with the single original image 965A, in which the man with the beard wearing the red button-up shirt is smiling at the camera. FIG. 26 illustrates the original image 965A of FIG. 25, which is a processed (e.g., rectified) image captured by one or both of the visible light cameras 114A-B. In FIGS. 27-28, spatial user input selections 978A-B are received via the movement tracker 981 and respective wallpaper images 968A-B are generated. FIG. 27 illustrates receiving, via the movement tracker 981 type of user input device 1091, a first spatial user input selection 978A (e.g., horizontal tilting to the left) to manipulate the first original image 965A by a first spatial movement parameter 976A that is associated with the leftmost field of view (e.g., 0.0). As shown, the image display 1080 of the mobile device 990 responsively presents a first wallpaper image 968A associated with the first spatial movement parameter 976A. The first wallpaper image 968A is generated from the first original image 965A.

FIG. 28 illustrates receiving, via the movement tracker, a second spatial user input selection 978B (e.g., horizontal tilting to the right) to manipulate the first original image 965A by a second spatial movement parameter 976B that is associated with a left intermediate field of view (e.g., 0.2). As shown, the image display 1080 of the mobile device 990 responsively presents a second wallpaper image 968B associated with the second spatial movement parameter 976B. The second wallpaper image 968B is generated from the first original image 965A.

Figure 29:
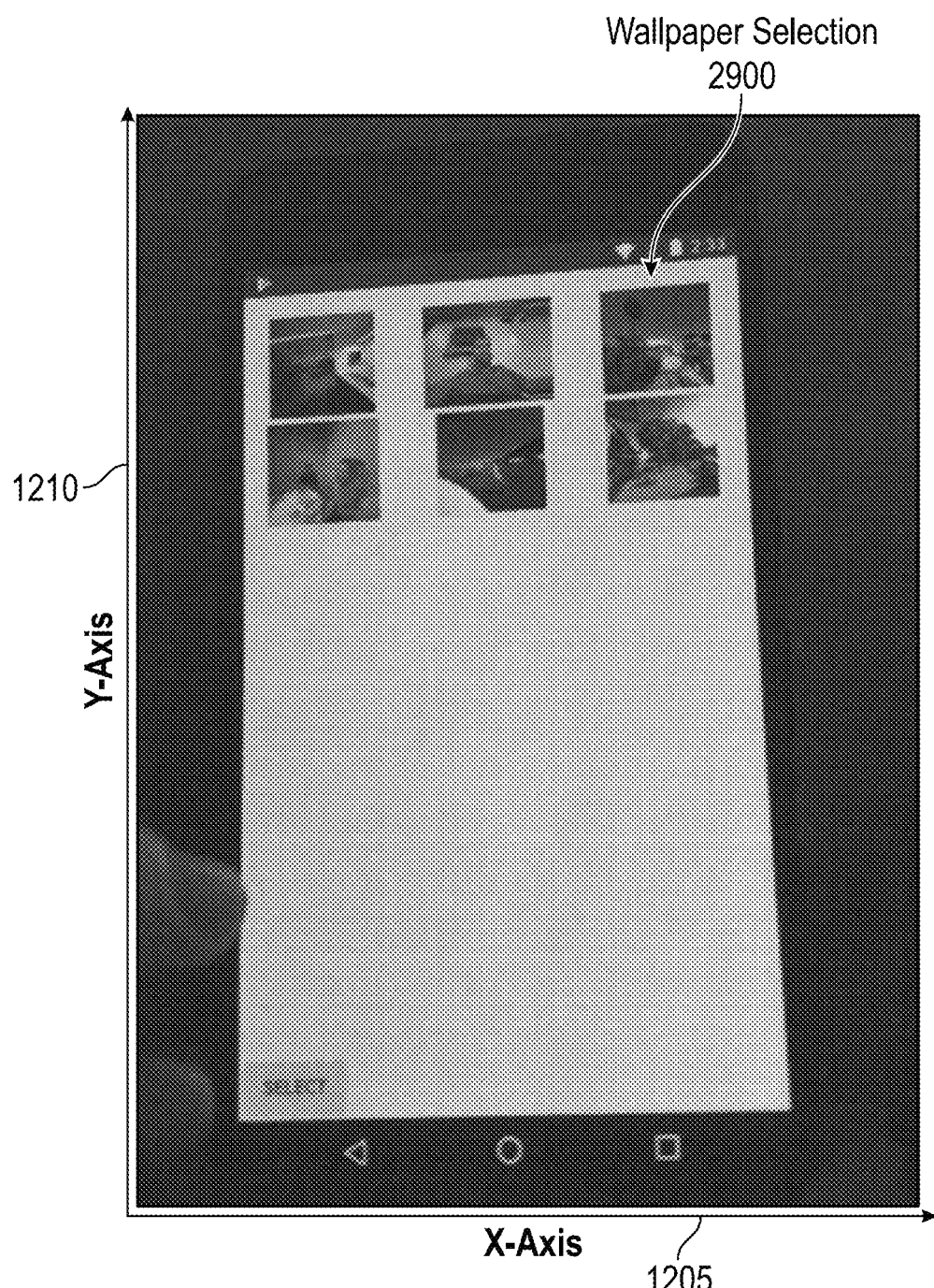
FIG. 29 again illustrates wallpaper selection on the mobile device, including various types of original videos and original images that are selectable as wallpaper.
Figure 30:
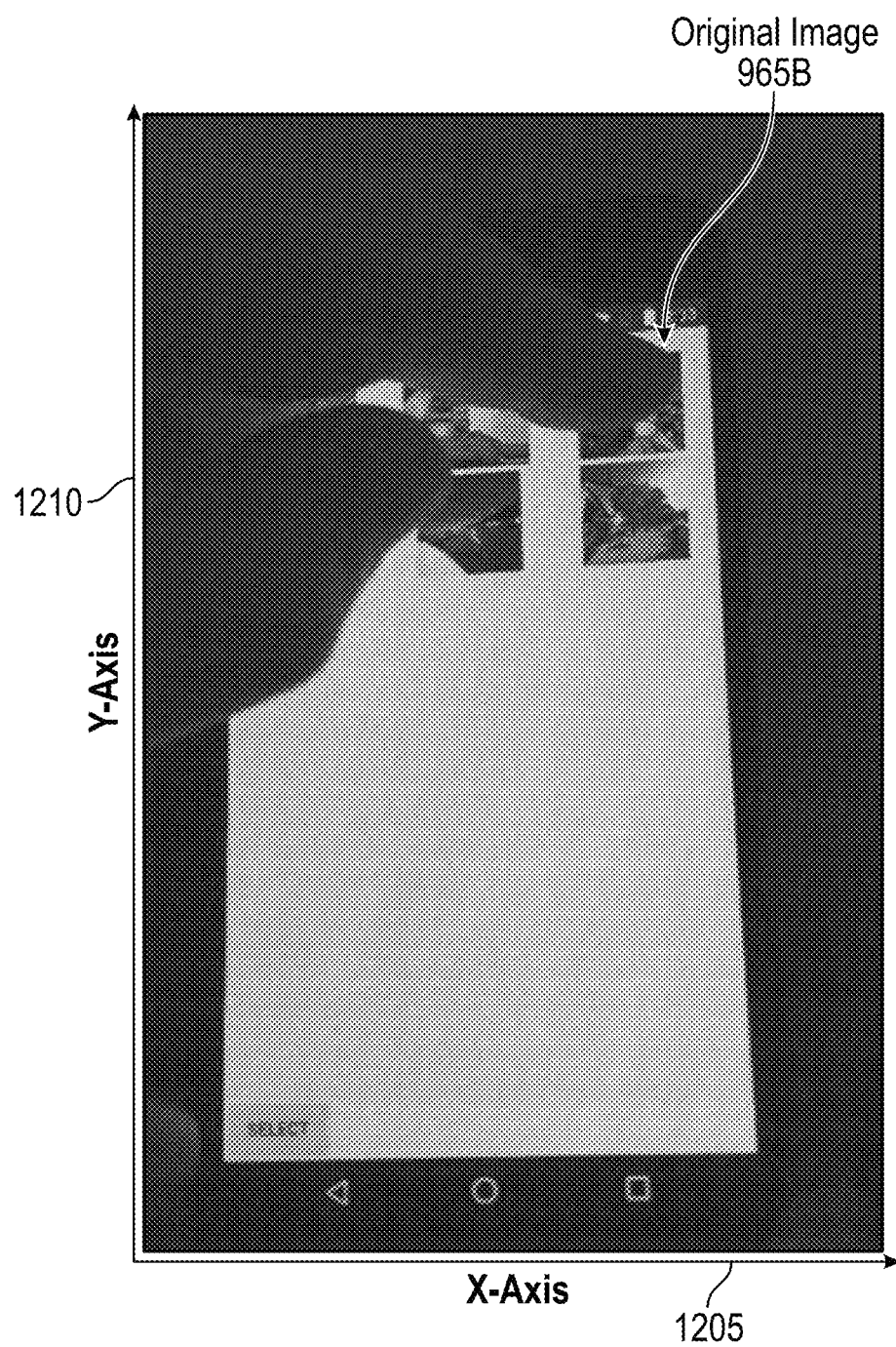
FIG. 30 illustrates selection of an original video as wallpaper on the mobile device.
Figure 31:
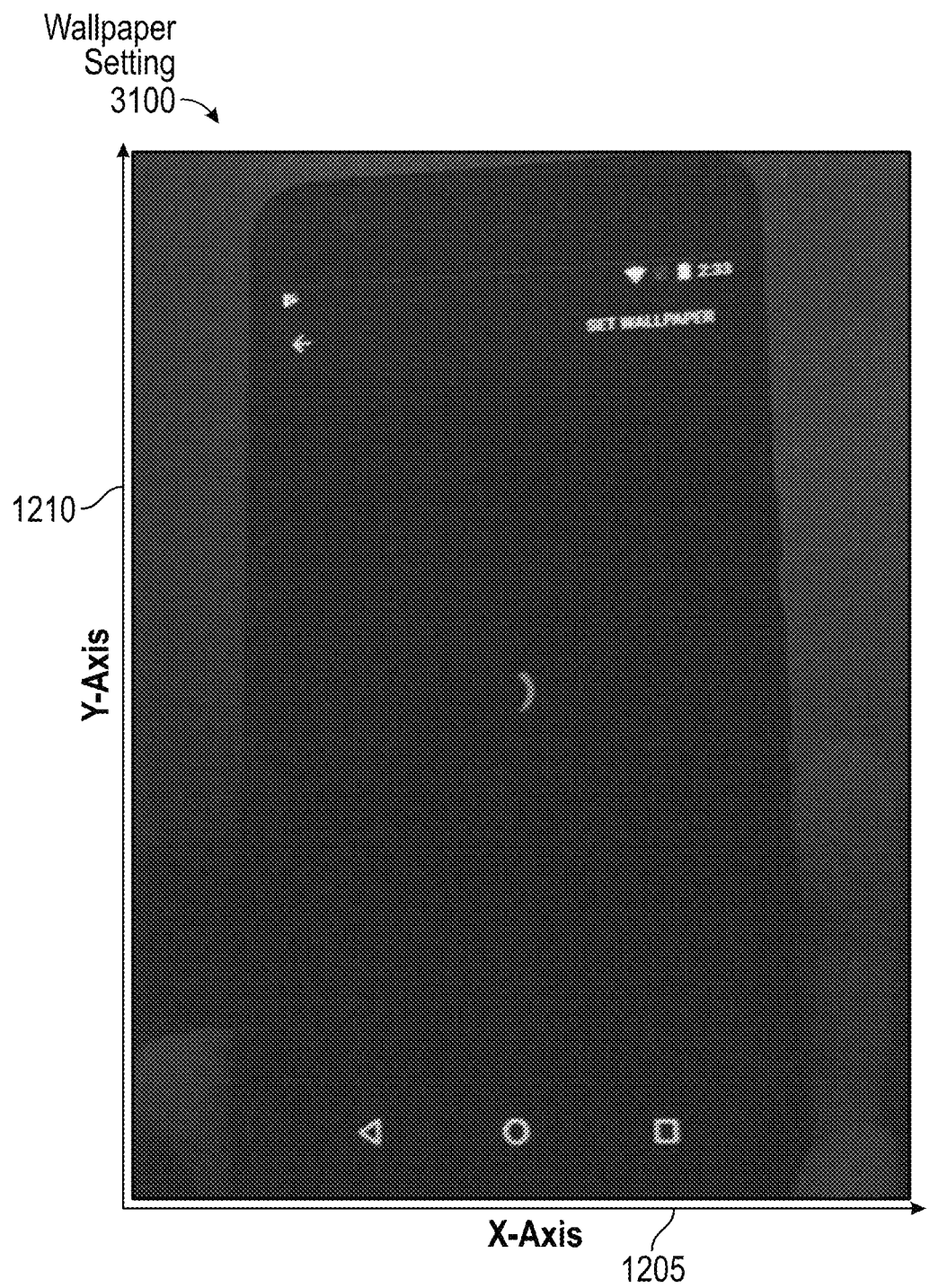
FIG. 31 illustrates setting of the original video of FIG. 30 as wallpaper on the mobile device.

FIGS. 29-31 again depict the wallpaper selection and setting process by a user on a mobile device 990, in which an original video 964 of a pink Frisbee being thrown across a boardwalk bridge is set as wallpaper. FIG. 29 illustrates wallpaper selection 2900 on the mobile device 990, including various types of original videos and original images that are selectable as wallpaper. FIG. 30 illustrates selection of the original video 964 (shown as being represented by a second original image 965B) as wallpaper on the mobile device 990. FIG. 31 illustrates wallpaper setting 3100 and loading of the original video 964 of FIG. 30 as wallpaper on the mobile device 990.

Figure 32:
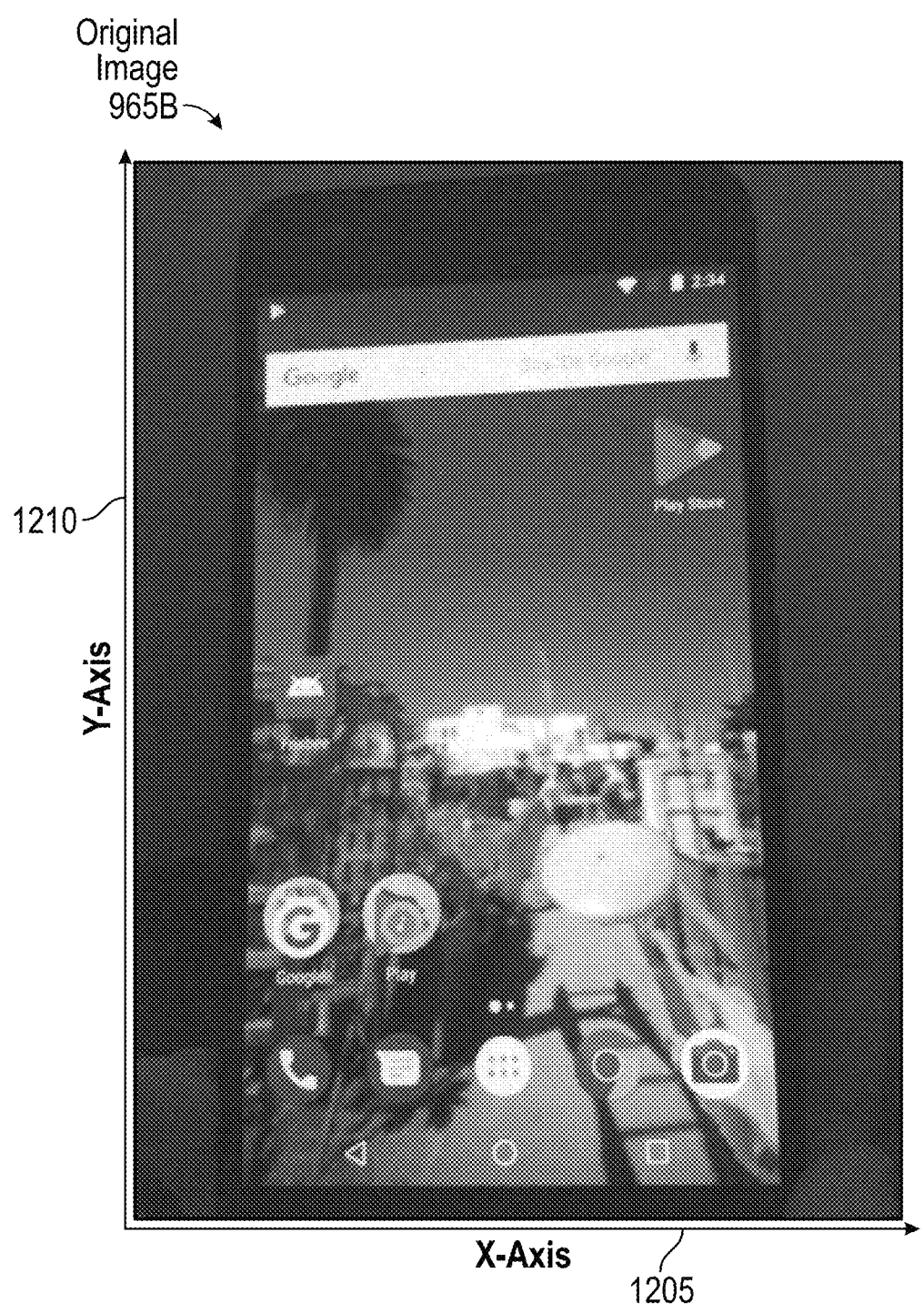
FIG. 32 illustrates an example of a second original image, which is a processed (e.g., rectified) image associated with a second time coordinate of the original video of FIG. 30.

FIGS. 32-37 demonstrate user interaction with the original video 964, in which the pink Frisbee is being thrown across a boardwalk bridge. FIG. 32 illustrates the second original image 965B, which is a processed (e.g., rectified) image captured by one or both of the visible light cameras 114A-B. Second original image 965B is associated with the second time coordinate 966B of the original video 964.

Figure 33:
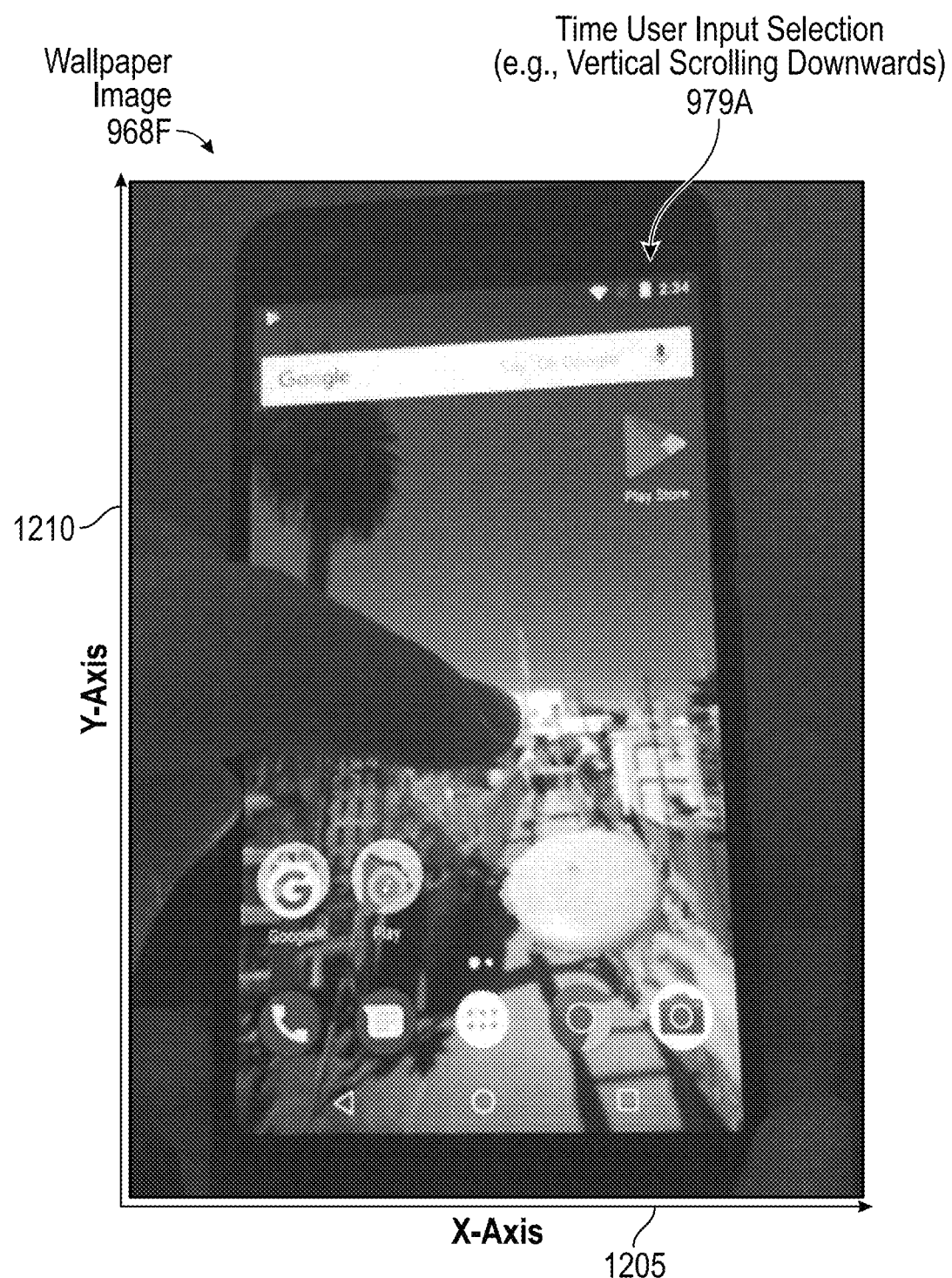
FIG. 33 illustrates receiving, via the touch sensor, a first time user input selection (e.g., vertical scrolling downwards) to manipulate a time coordinate and responsively presenting a sixth wallpaper image associated with a first time coordinate.
Figure 34:
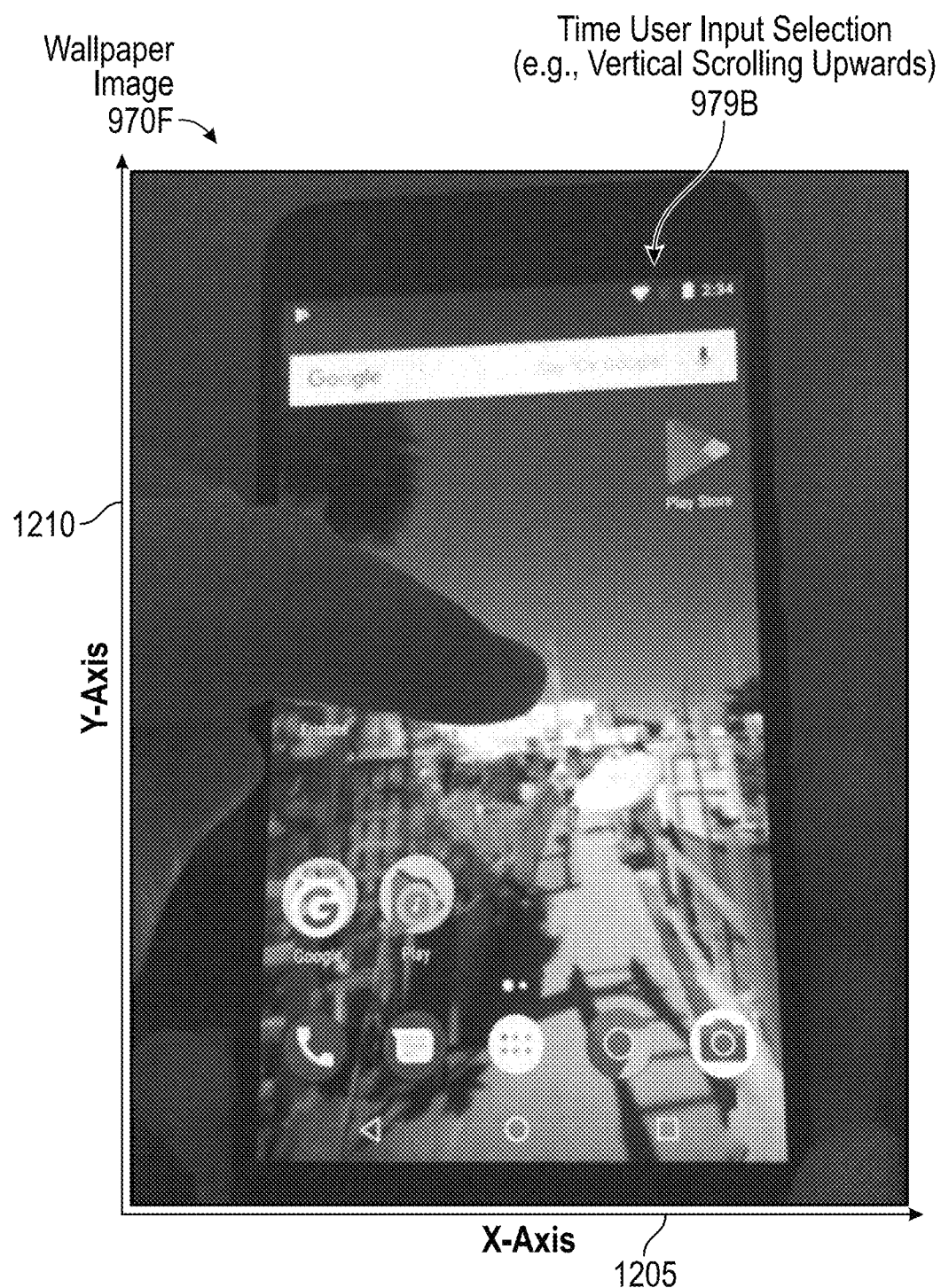
FIG. 34 illustrates receiving, via the touch sensor, a second time user input selection (e.g., vertical scrolling upwards) and responsively presenting the sixth wallpaper image associated with a third time coordinate.
Figure 35:
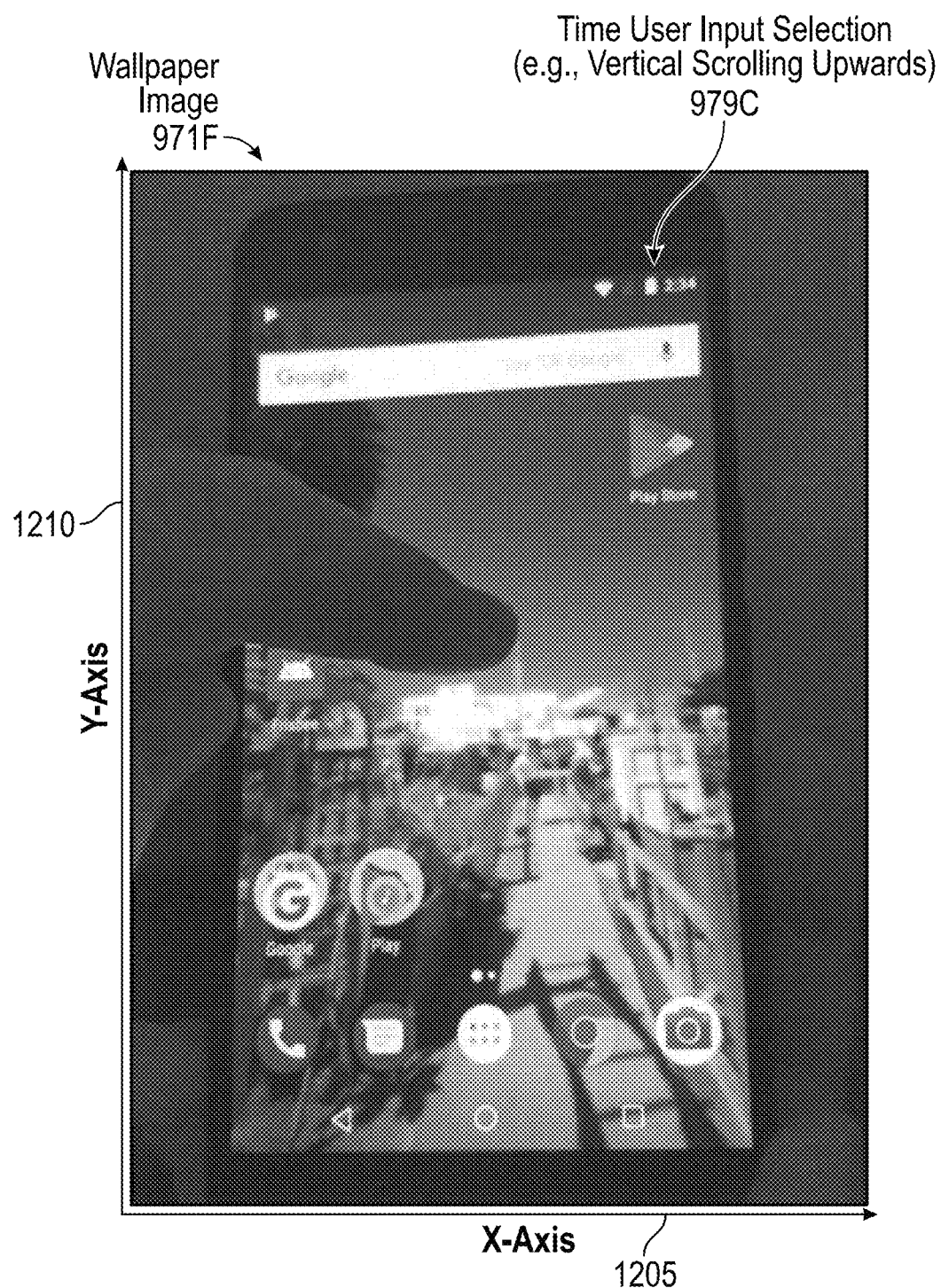
FIG. 35 illustrates receiving, via the touch sensor, a third time user input selection (e.g., vertical scrolling upwards) and responsively presenting the sixth wallpaper image associated with a fourth time coordinate.

In FIGS. 33-35, three time user input selections 979A-C are respectively received via a touch screen sensor type of user input device 1091 as upwards and downwards vertical scrolling. FIG. 33 illustrates receiving, via the touch sensor type of user input device 1091, a first time user input selection 979A (e.g., vertical scrolling downwards). As shown, the image display 1080 of the mobile device 990 responsively presents a sixth wallpaper image 968F associated with a first time coordinate 966F of the first original image 965A. Comparing FIGS. 32-33, it can be seen that the pink Frisbee is closer to the camera in FIG. 33 than FIG. 32. Hence, the wallpaper video 967 is moved backwards (rewound) in time in FIG. 33 compared to FIG. 32. Spatially, the sixth wallpaper image 968F is selected because the sixth spatial movement parameter 976F most closely mimics (resembles or maps) the field of view of the presented second original image 965B, which is halfway between the left image and the right image captured by the left and right visible light cameras 114A-B. The spatial movement parameter 976F is set to 0.5 for the sixth wallpaper image 968F. The sixth wallpaper image 968F is extracted from the first set of wallpaper images 968A-K that is generated for the first original image 965A.

FIG. 34 illustrates receiving, via the touch sensor type of user input device 1091, a second time user input selection 979B (e.g., vertical scrolling upwards). As shown, the image display 1080 of the mobile device 990 responsively presents a sixth wallpaper image 970F associated with a third time coordinate 966C of the third original image 965C. Comparing FIGS. 33-34, it can be seen that the pink Frisbee is further away from the camera in FIG. 34 than FIG. 33. Comparing FIG. 34 with FIG. 32, it can be seen that the pink Frisbee is further away from the camera in FIG. 34 than FIG. 32. Hence, the wallpaper video 967 is moved forwards in time in FIG. 34 compared to both FIGS. 32-33. The sixth wallpaper image 970F is extracted from the third set of wallpaper images 970A-K that is generated for the third original image 965C.

FIG. 35 illustrates receiving, via the touch sensor type of user input device 1091, a third time user input selection 979C (e.g., vertical scrolling upwards). As shown, the image display 1080 of the mobile device 990 responsively presents a sixth wallpaper image 971F associated with a fourth time coordinate 966D. The sixth wallpaper image 971F is extracted from the fourth set of wallpaper images 971A-K that is generated for the fourth original image 965D.

Figure 36:
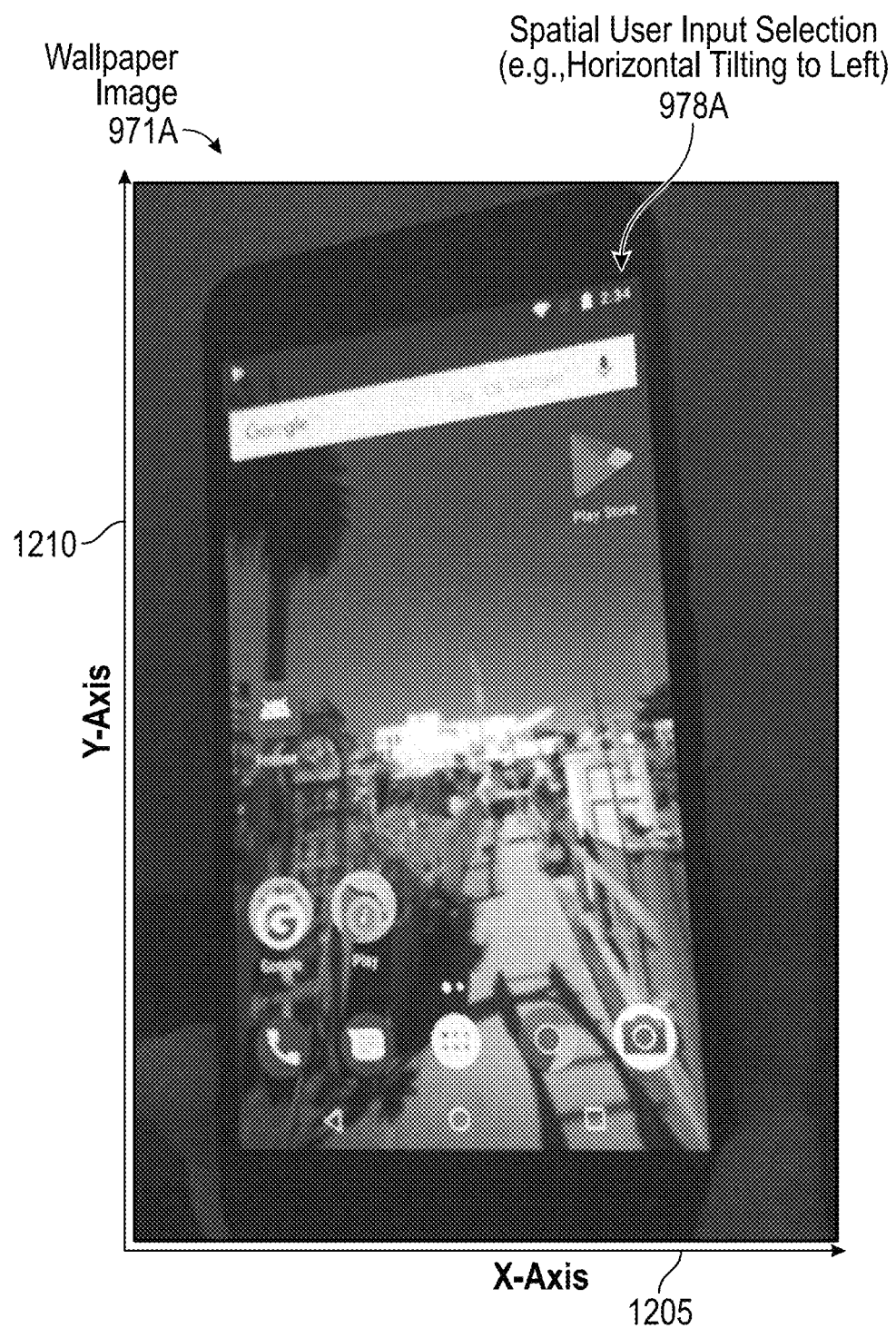
FIG. 36 illustrates receiving, via the movement tracker, a first spatial user input selection (e.g., horizontal tilting to the left) and responsively presenting the first wallpaper image associated with the fourth time coordinate of the fourth original image.
Figure 37:
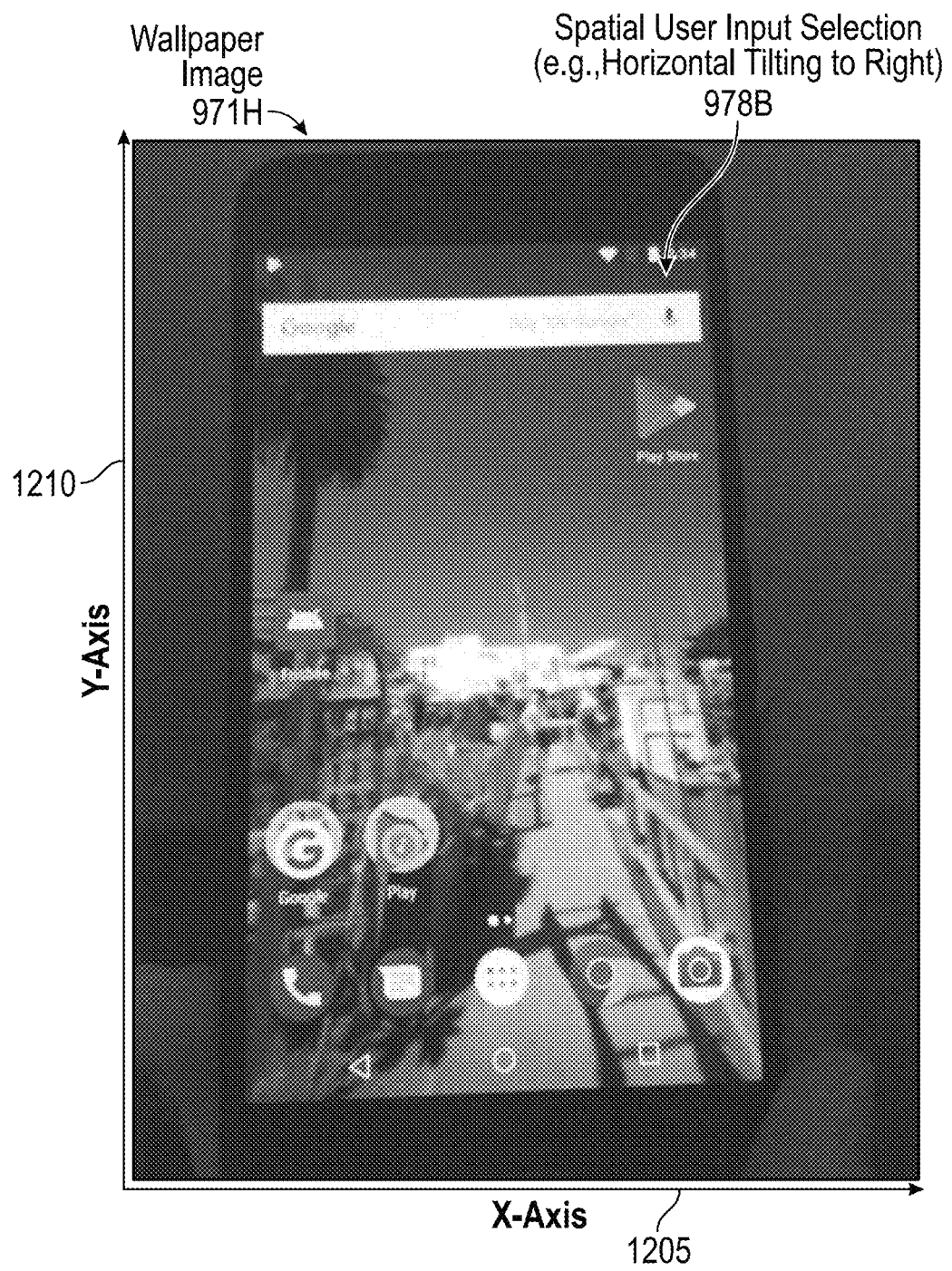
FIG. 37 illustrates receiving, via the movement tracker, a second spatial user input selection (e.g., horizontal tilting to the right) and responsively presenting the eighth wallpaper image associated with the fourth time coordinate of the fourth original image.

In FIGS. 36-37, two spatial user input selections 978A-B are respectively received via a movement tracker 981 (e.g., IMU) type of user input device 1091 as horizontal left and right tilting. FIG. 36 illustrates receiving, via a movement tracker 981, a first spatial user input selection 978A (e.g., horizontal tilting to the left) to manipulate the fourth original image 965D (or sixth wallpaper image 971F of FIG. 35) by a first spatial movement parameter 976A that is associated with the leftmost field of view (e.g., 0.0). As shown, the image display 1080 of the mobile device 990 responsively presents a first wallpaper image 971A associated with the first spatial movement parameter 976A. The first wallpaper image 971A is extracted from the fourth set of wallpaper images 971A-K that is generated for the fourth original image 965D.

FIG. 37 illustrates receiving, via the movement tracker 981, a second spatial user input selection 978B (e.g., horizontal tilting to the right) to manipulate the fourth original image 965D (or first wallpaper image 971A of FIG. 36) by an eighth spatial movement parameter 976H that is associated with a right intermediate field of view (e.g., 0.7). As shown, the image display 1080 of the mobile device 990 responsively presents an eighth wallpaper image 971H associated with the eighth spatial movement parameter 976H.

The eighth wallpaper image 971H is extracted from the fourth set of wallpaper images 971A-K that is generated for the fourth original image 965D.

Any of the wallpaper effect functionality described herein for the eyewear device 100, mobile device 990, and server system 998 can be embodied in one or more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A non-transitory processor-readable storage medium storing processor-executable instructions that, when executed by a processor of a machine, cause the machine to perform operations comprising:

capturing a sequence of original images of an original video, wherein the original images are based on raw images or processed raw images, each of the original images being associated with a respective time coordinate on a time (T) axis for a presentation time and a respective spatial movement parameter of a respective original image in the original video, wherein upon selection of the original video as wallpaper by a user, a wallpaper image matrix is created and persistently stored in a memory, the wallpaper image matrix including respective sets of wallpaper images of a wallpaper video, wherein each respective set of wallpaper images provides an appearance of a spatial movement or rotation around the respective original image of the original video, and each wallpaper image within the respective set of wallpaper corresponds to a different spatial movement parameter within the respective original image;

presenting, via an image display, the wallpaper video;

receiving, via a user input device, from the user a spatial user input selection to manipulate a spatial movement parameter of the wallpaper images and a time user input selection to apply to the wallpaper video to move the wallpaper video forwards or backwards in time; and in response to receiving the spatial user input selection and the time user input selection:

applying a respective spatial movement parameter associated with the spatial user input selection and the respective time coordinate associated with the time user input selection to the wallpaper video, and presenting, via the image display, a wallpaper image determined by the respective spatial movement parameter and at a point in time of the wallpaper video determined by the respective time coordinate.

2. The medium of claim 1, further comprising instructions that, when executed by the processor of the machine, cause the machine to perform the operation of receiving, via the user input device, from the user the spatial user input selection and the time user input selection to apply to the wallpaper video by performing the operations of:

receiving on an input surface of a touch sensor at least one finger contact inputted from the user;

tracking, via a sensing circuit, the at least one finger contact on the input surface; and detecting the spatial user input selection and the time user input selection to apply to the wallpaper video on the input surface of the touch sensor based on the at least one finger contact from the user.

3. The medium of claim 2, further comprising instructions that, when executed by the processor of the machine, cause the machine to perform the further operation of:

detecting the time user input selection by detecting a vertical swipe type of finger gesture on the touch sensor.

4. The medium of claim 1, further comprising instructions that, when executed by the processor of the machine, cause the machine to perform the operation of receiving, via the user input device, from the user the spatial user input selection and the time user input selection to apply to the wallpaper video by performing the operations of:

tracking, via a movement tracker, movement of a mobile device by:

i. measuring, via at least one accelerometer of the movement tracker, the acceleration of the mobile device, ii. measuring, via at least one gyroscope of the movement tracker, the rotation of the mobile device, or iii. measuring, via an inertial measurement unit of the movement tracker, both the acceleration and the rotation of the mobile device; and detecting the spatial user input selection and the time user input selection to apply to the wallpaper video by detecting at least one variation of the tracked movement over a time period.

5. The medium of claim 4, further comprising instructions that, when executed by the processor of the machine, cause the machine to perform the further operation of:

detecting the spatial user input selection by detecting horizontal tilting of the mobile device.

6. The medium of claim 1, further comprising instructions that, when executed by the processor of the machine, cause the machine to perform the further operations of:

creating a respective depth image corresponding to the wallpaper image, such that:

the respective depth image is formed of a respective mesh of vertices, each vertex representing a pixel in a three-dimensional scene, each vertex has a position attribute, the position attribute of each vertex is based on a three-dimensional location coordinate system and includes an X location coordinate on an X axis for horizontal position, a Y location coordinate on a Y axis for vertical position, and a Z location coordinate on a Z axis for depth, and each vertex further includes one or more of a color attribute, a texture attribute, or a reflectance attribute; and generating, the presented wallpaper image from an original image by:

rotating the respective depth image based on the respective spatial movement parameter; and the respective spatial movement parameter being along at least one of the X axis for horizontal position movement, the Y axis for vertical position movement, and the Z axis for depth movement.

7. The medium of claim 1, further comprising instructions that, when executed by the processor of the machine, cause the machine to perform the operation of presenting, via the image display, the wallpaper image at an angular orientation determined by the respective spatial movement parameter.

8. A non-transitory processor-readable storage medium storing processor-executable instructions that, when executed by a processor of a machine, cause the machine to perform operations comprising:

capturing, via a depth-capturing camera, a sequence of original images of an original video, each of the original images associated with a respective time coordinate on a time (T) axis for a presentation time in the original video;

presenting, via an image display, an original image of the original video to a user;

receiving, via a user input device, from the user one or both of: (i) a spatial user input selection to apply to the original video, and (ii) a time user input selection to apply to the original video;

in response to receiving one or both of: (i) the spatial user input selection, and (ii) the time user input selection:

applying one or both of: (i) a respective spatial movement parameter associated with the spatial user input selection, and (ii) the respective time coordinate associated with the time user input selection to the original video, generating a wallpaper image from the original image by:

calculating: (i) a left image disparity map between a left pixel matrix of pixels and a right pixel matrix of pixels, and (ii) a right image disparity map between the right pixel matrix and the left pixel matrix;

determining the respective spatial movement parameter of the left pixel matrix and the right pixel matrix along at least one of: (i) an X axis for horizontal position movement, and (ii) a Y axis for vertical position movement;

filling up a left interpolated pixel matrix by moving pixels in the left pixel matrix along at least one of: (i) the X axis, and (ii) the Y axis based on the respective spatial movement parameter;

filling up a right interpolated pixel matrix by moving pixels in the right pixel matrix along at least one of: (i) the X axis, and (ii) the Y axis based on the respective spatial movement parameter; and blending together the left interpolated pixel matrix and the right interpolated pixel matrix to create the wallpaper image; and presenting, via the image display, the wallpaper image associated with one or both of: (i) the respective spatial movement parameter, and (ii) the respective time coordinate.

9. The medium of claim 8, wherein the wallpaper image includes respective sets of wallpaper images of the original video such that each respective set of wallpaper images provides an appearance of a spatial movement or rotation around the respective original image of the original video, and each wallpaper image within the respective set of wallpaper images corresponds to a different spatial movement parameter within the respective original image.

10. The medium of claim 8, further comprising instructions that, when executed by the processor of the machine, cause the machine to perform the operation of receiving, via the user input device, from the user the spatial user input selection and the time user input selection to apply to the original video by performing the operations of:

receiving on an input surface of a touch sensor at least one finger contact inputted from the user;

tracking, via a sensing circuit, the at least one finger contact on the input surface; and detecting the spatial user input selection and the time user input selection to apply to the original video on the input surface of the touch sensor based on the at least one finger contact from the user.

11. The medium of claim 10, further comprising instructions that, when executed by the processor of the machine, cause the machine to perform the further operation of:

detecting the time user input selection by detecting a vertical swipe type of finger gesture on the touch sensor.

12. The medium of claim 8, further comprising instructions that, when executed by the processor of the machine, cause the machine to perform the operation of receiving, via the user input device, from the user the spatial user input selection and the time user input selection to apply to the original video by performing the operations of:

tracking, via a movement tracker, movement of a mobile device by:

i. measuring, via at least one accelerometer of the movement tracker, the acceleration of the mobile device, ii. measuring, via at least one gyroscope of the movement tracker, the rotation of the mobile device, or iii. measuring, via an inertial measurement unit of the movement tracker, both the acceleration and the rotation of the mobile device; and detecting the spatial user input selection and the time user input selection to apply to the original video by detecting at least one variation of the tracked movement over a time period.

13. The medium of claim 12, further comprising instructions that, when executed by the processor of the machine, cause the machine to perform the further operation of:

detecting the spatial user input selection by detecting horizontal tilting of the mobile device.

14. The medium of claim 8, further comprising instructions that, when executed by the processor of the machine, cause the machine to perform the further operations of:

creating a respective depth image corresponding to the wallpaper image, such that:

the respective depth image is formed of a respective mesh of vertices, each vertex representing a pixel in a three-dimensional scene;

each vertex has a position attribute, the position attribute of each vertex is based on a three-dimensional location coordinate system and includes an X location coordinate on the X axis for horizontal position, a Y location coordinate on the Y axis for vertical position, and a Z location coordinate on a Z axis for depth; and each vertex further includes one or more of a color attribute, a texture attribute, or a reflectance attribute; and generating, the presented wallpaper image from the original image by:

rotating the respective depth image based on the respective spatial movement parameter; and the respective spatial movement parameter being along at least one of the X axis for horizontal position movement, the Y axis for vertical position movement, and the Z axis for depth movement.

15. The medium of claim 8, further comprising instructions that, when executed by the processor of the machine, cause the machine to perform the operation of presenting, via the image display, the wallpaper image at an angular orientation determined by the respective spatial movement parameter.

* * * * *